United States Patent [19]

Kuper et al.

[11] 4,283,745
[45] Aug. 11, 1981

[54] EDITING APPARATUS

[75] Inventors: Douglas D. Kuper, Campbell; William A. Menezes, Mountain View, both of Calif.

[73] Assignee: Sony Corporation, Tokyo, Japan

[21] Appl. No.: 139,443

[22] Filed: Apr. 11, 1980

[51] Int. Cl.³ .............................................. G11B 27/02
[52] U.S. Cl. ..................................................... 360/13
[58] Field of Search ........................ 360/13, 14, 33, 61

[56] References Cited

U.S. PATENT DOCUMENTS

| | | | |
|---|---|---|---|
| 3,749,849 | 7/1973 | Kolpek et al. | 360/13 |
| 4,187,544 | 2/1980 | Larner | 360/13 |
| 4,213,163 | 7/1980 | Lemelson | 360/13 |

Primary Examiner—Vincent P. Canney
Attorney, Agent, or Firm—Lewis H. Eslinger; Alvin Sinderbrand

[57] ABSTRACT

Editing apparatus is provided for controlling the transfer of signals from a playback medium to a recording medium. The apparatus includes a console having a plurality of display registers, including a play IN register for displaying play IN position data representing an edit-in point along the playback medium, a record IN register for displaying record IN position data representing an edit-in point along the recording medium, a play OUT register for displaying play OUT position data representing an edit-out point along the playback medium and a record OUT register for displaying record OUT position data representing an edit-out point along the recording medium. The console also has a plurality of register selector switches, each associated with and adjacent a respective one of the display registers and operable to select the display register associated therewith. A manually operable enabling switch enables position data to be displayed in a selected one of the play IN, record IN, play OUT and record OUT registers as a function of the position data displayed in the remainder of these registers. The apparatus also includes a central processing unit responsive to the operation of the enabling switch and a selected one of the register selector switches to obtain data representing the duration between the edit-in and edit-out points as represented by the position data displayed in two of the registers, neither of which is associated with the selected register switch, to combine the duration data with the position data displayed in a third register, which third register is not associated with the selected register switch, to produce resultant position data, and to cause this resultant position data to be displayed in the register which is associated with the register selector switch.

9 Claims, 50 Drawing Figures

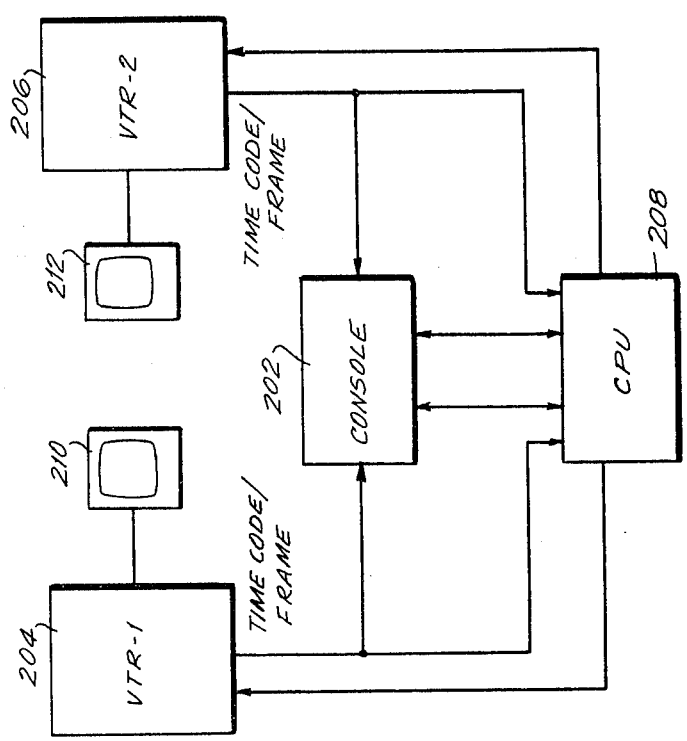
FIG. 2
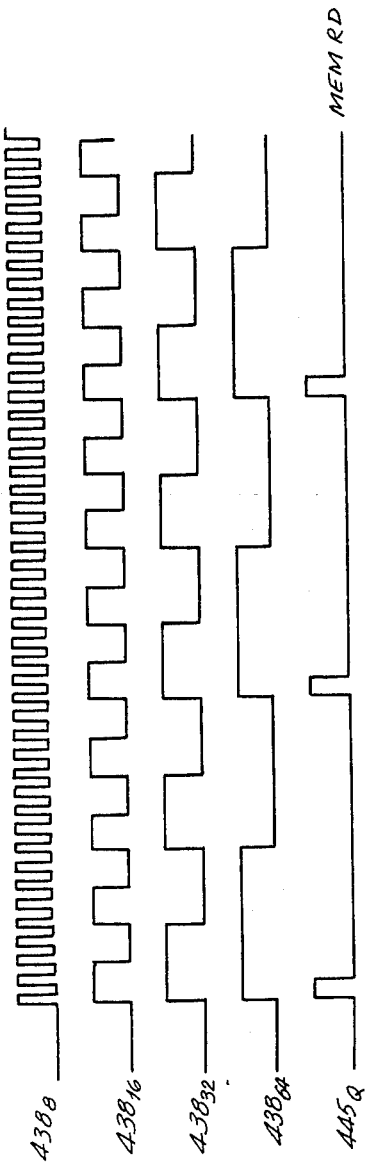
FIG.6A
FIG.6B
FIG.6C
FIG.6D
FIG.6E

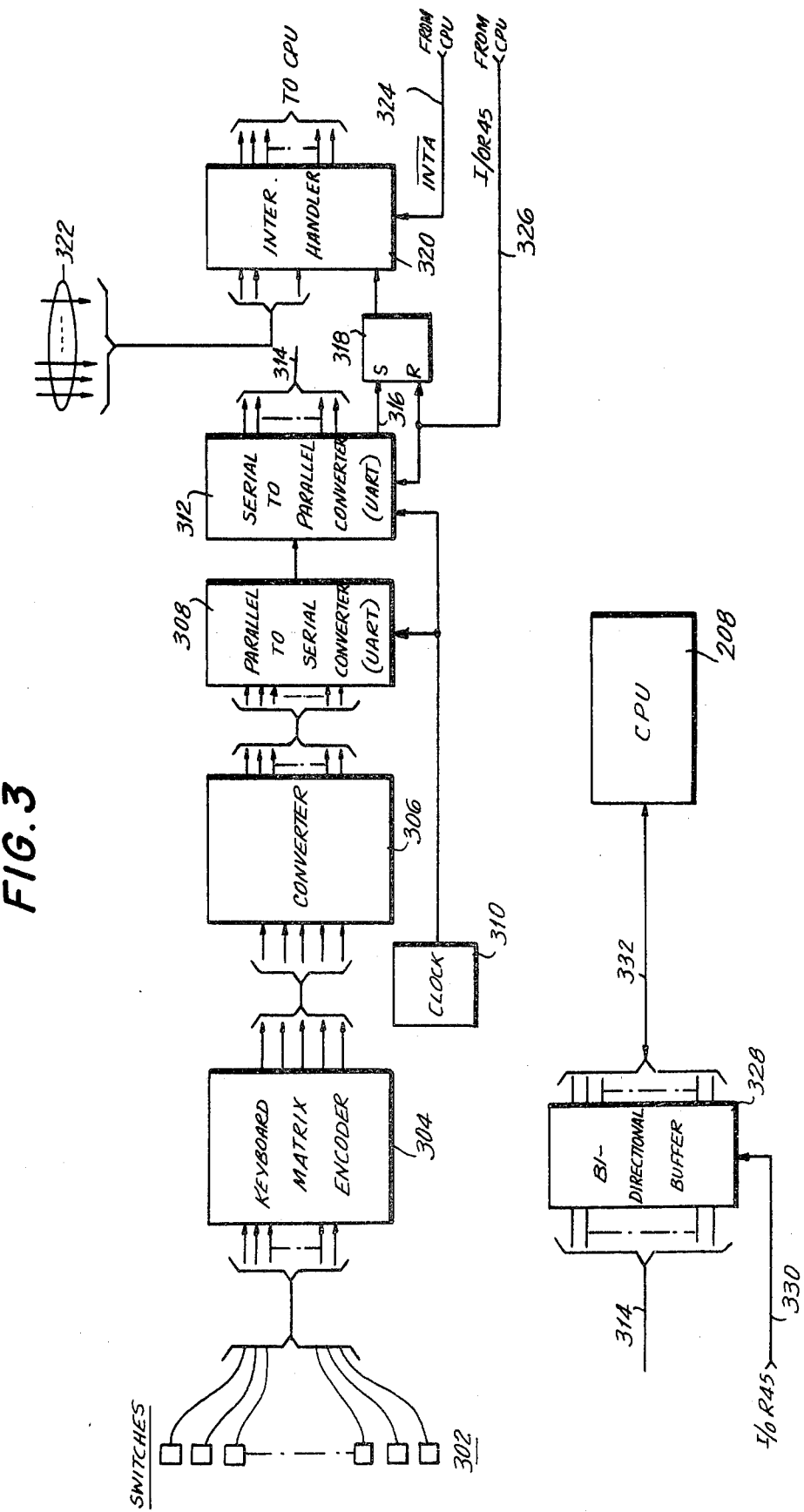

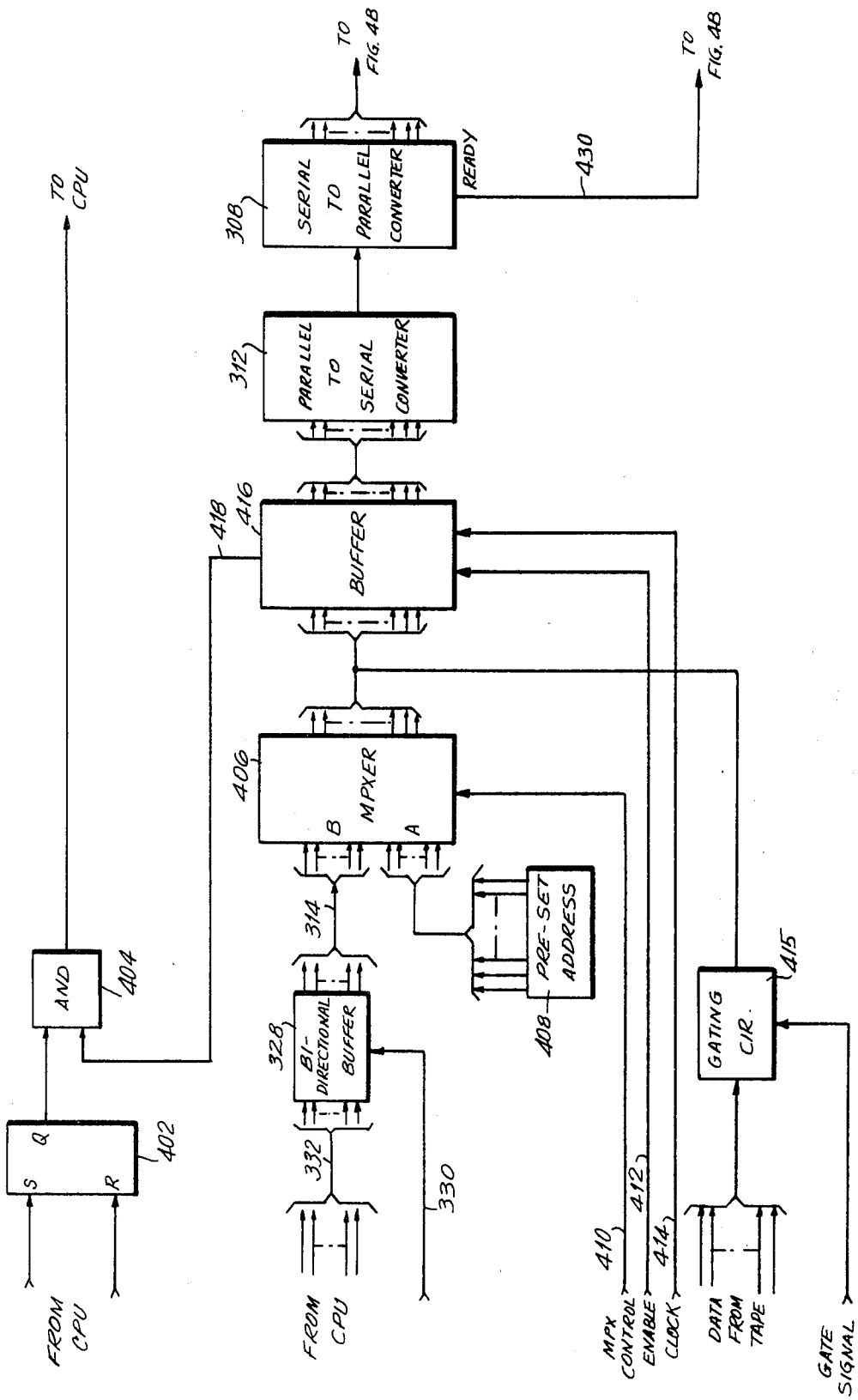

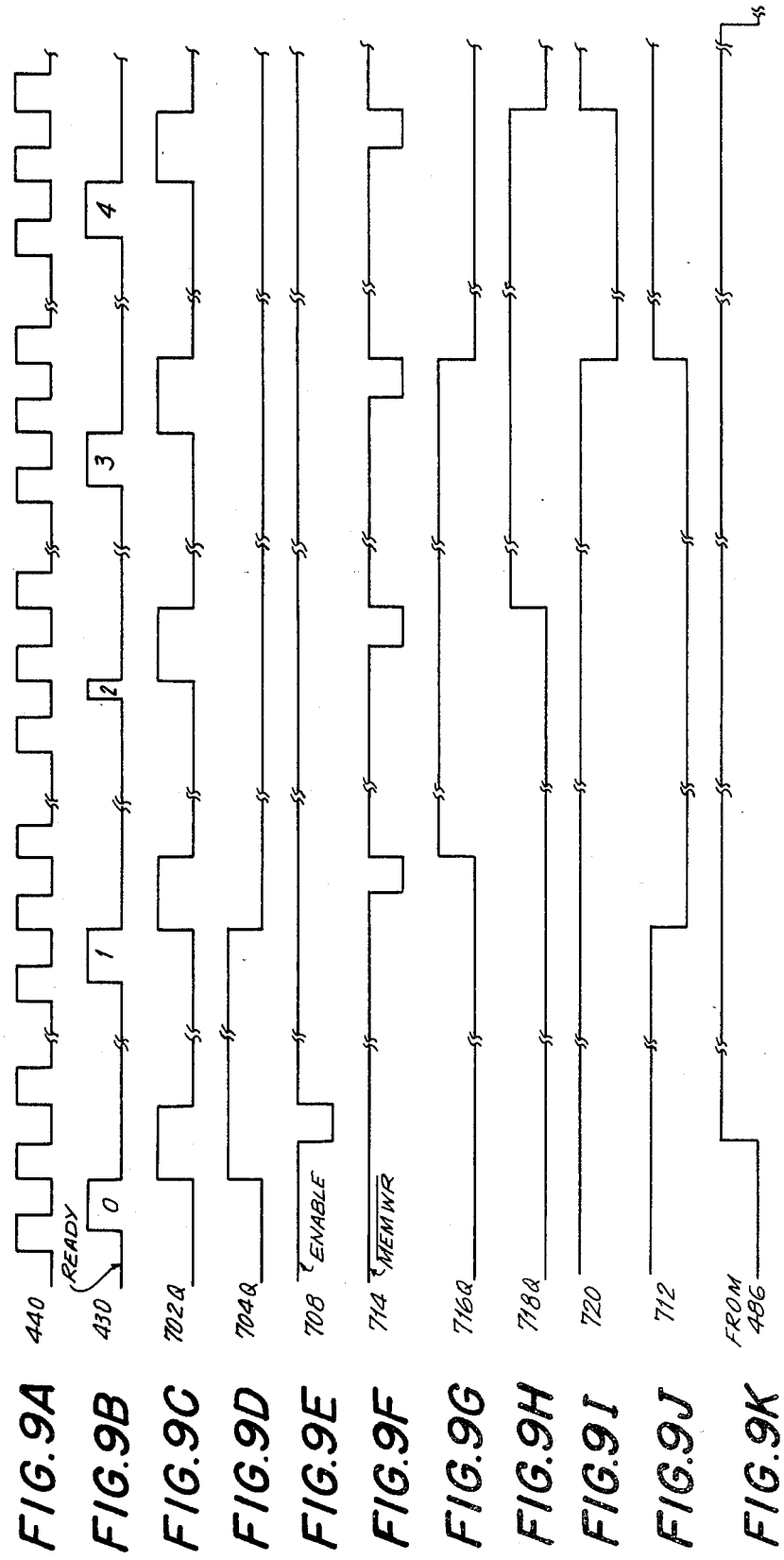

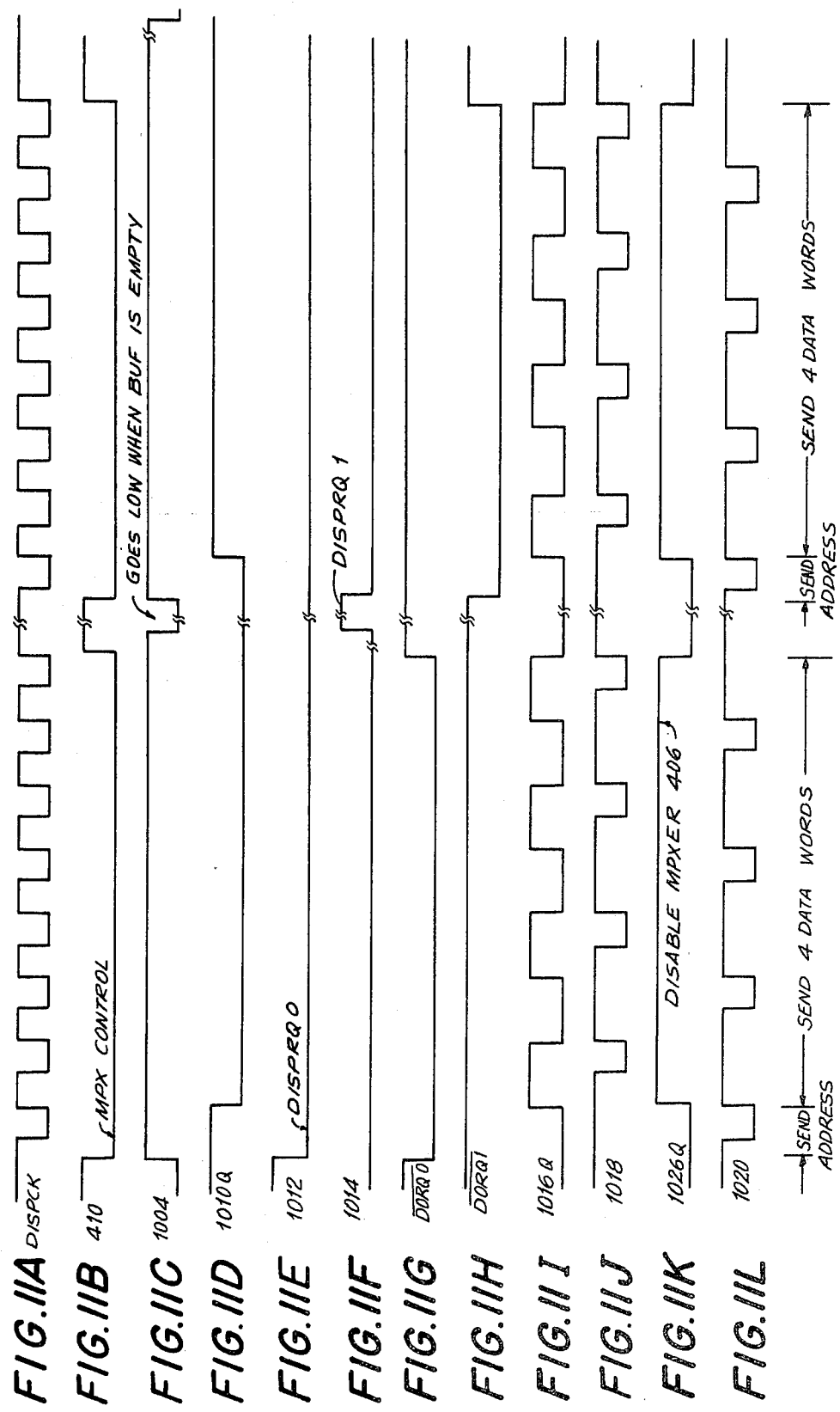

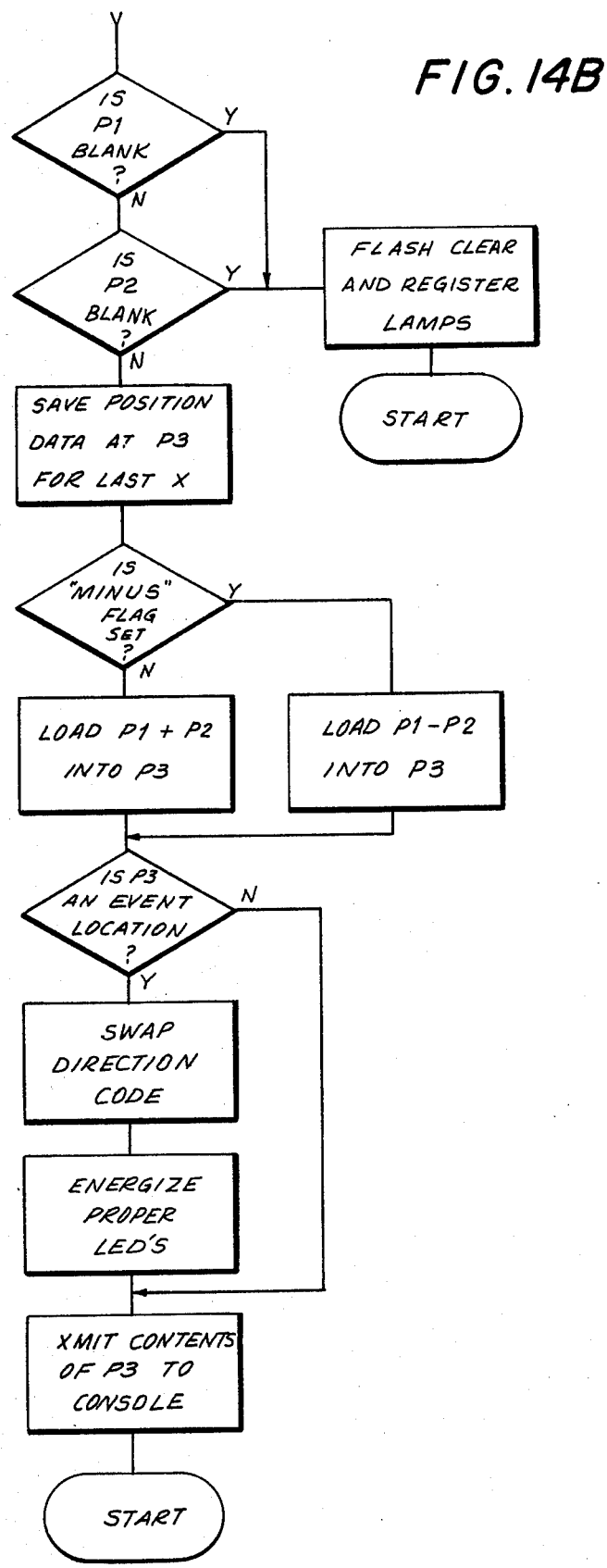

EDITING APPARATUS

BACKGROUND OF THE INVENTION

This invention relates to editing apparatus which controls the transfer of signals from a playback medium to a recording medium and, more particularly, to improved data display features in such apparatus.

In the general field of data recording, it often is desirable to create a finalized recording derived from portions Of pre-existing recordings and other sources of data. It also is desirable to modify one recording by selectively inserting thereinto various bits and pieces which are derived from other recordings. Such creations and modifications of recordings are referred to generally herein as "editing".

While editing is used generally in most fields of data recording, it has become a highly specialized and advantageous technique in the field of video recording. Thus, video signals which are recorded on a particular record medium, such as a magnetic tape, a magnetic disk, or the like, are "edited" by selectively assembling or inserting other video signals onto that record medium. For the purpose of the present discussion, the record medium on which the video signals are recorded is described as magnetic tape which, presently, is the most common form of record medium that now is used for recording video programs. Typically, in the field of broadcast and commercial video tape recording, video signals which are recorded on one tape are reproduced by a video tape recorder (VTR) for an "insert" or "assemble" recording by another VTR on recording tape. As is known to those of ordinary skill in the art of video editing apparatus, an "insert" edit operation describes the insertion of video signals into a predetermined location on a video tape, the "inserted" signals being preceded and followed by pre-existing video signals. In an "assemble" mode of operation, video signals are recorded in following relation (i.e. assembled) to pre-existing information.

As is recognized, to carry out the insert and assemble edit modes of operation, it is necessary for an operator to select appropriate portions, or blocks, of video signals which are to be reproduced from one tape (referred to generally as the source or playback tape) and which are to be recorded at other locations on the recording (or destination) tape. That is, the operator must be aware of the particular addresses on the source tape at which desired video signals are recorded as well as addresses on the destination tape at which new video signals are to be placed. These "addresses" on the respective video tapes generally are recorded as time code addresses, each of which separately identifies a respective frame of the recorded video signal. An example of one type of time code address which is used with, for example, the recording of NTSC signals is the so-called SMPTE (Society of Motion Picture and Television Engineers) time code which represents frame addresses in terms of hours, minutes, seconds and frames up to a maximum value of 23 hours, 59 minutes, 59 seconds and 29 frames. Although other acceptable time code addresses are known, for convenience, and in the interest of simplification, the present discussion refers only to this SMPTE time code.

It is conventional to record the time code longitudinally, that is, in serial tracks along a length of the video tape. Time code generators and readers are known for the recording and reading of such time codes as the video tape is transported. These time codes, as read from the video tape, are used to designate so-called "edit-in" and "edit-out" locations of the respective playback and recording tapes.

To carry out an edit operation, the time code addresses which identify the particular frames on the playback tape which define the video information that is to be re-recorded on the recording tape are marked, or stored, as the edit-in and edit-out points. For an insert edit mode, the desired edit-in and edit-out points on the recording tape likewise are marked, or stored. Of course, for favorable results, that portion of the playback tape which subsists between the edit-in and edit-out points should be equal to the corresponding portion on the recording tape. Once the operator confirms that the material, or video signals, lying between the edit-in and edit-out points on the playback tape is correct and should be re-recorded between the edit-in and edit-out points on the recording tape, the actual transfer of video signals may occur. Such confirmation of this edit operation is known as a "preview", and the previewed operation may be monitored on a suitable video display monitor device. If changes are to be effected to the respective edit-in and edit-out points, for example, if the operator finds other material which he wishes to transfer from the playback tape to the recording tape, or material which should be deleted from the recording tape, the time code addresses which define the respective edit points may be suitably changed.

In an assemble edit mode of operation, it may not be necessary to define an edit-out point for the recording tape. This is because, in the assemble edit mode, the selected video signals which are reproduced from the playback tape, and which lie between the edit-in and edit-out points thereon, merely are added to (i.e. assembled) the previously-recorded video signals on the recording tape commencing from the edit-in and edit-out point thereon.

In many types of VTR edit apparatus presently available, respective edit-in and edit-out points for the playback and recording tapes can be stored merely by operating suitable selector switches when the respective tapes arrive at their desired time code addressed locations. However, the edit-in and edit-out points for each tape often are not displayed. This makes it difficult for the operator to effect relatively small, or fine, adjustments to these respective points. Also, the operator is deprived of important information which, advantageously, would assist him in carrying out an edit operation.

Another disadvantage of VTR edit apparatus which presently is available is the difficulty in transferring time code addresses for effecting modifications in the various edit points that have been selected. For example, let it be assumed that the operator has selected one particular edit-in point for the playback tape. Upon reviewing this tape, he may determine that, possibly, another edit-in point should be selected. In the aforementioned presently available VTR edit apparatus, only one of these edit-in points can be selected and stored. Consequently, the operator must undertake a rather laborious and time-consuming task to compare the two edit-in points which he has selected in order to determine which of these points ultimately should be used. There is, therefore, a need to store two or more time code addresses from which the operator easily can choose which one is to be used in the actual edit operation. In conjunction with this need is a need to permit easy transfer of such stored time code addresses, preferably by simple pushbutton operation.

As will be described hereinbelow, in the apparatus disclosed herein, which is similar to the apparatus disclosed in copending application Ser. No. 139,444 filed Apr. 11, 1980, an edit operation can be carried out if only three of the four edit points (that is, the edit-in points for each of the playback and recording tapes as well as the edit-out points for each tape) are known. This is because, in carrying out the edit operation, the tapes are driven in synchronism, and an edit point for one also serves as a corresponding edit point for the other. Nevertheless, for automatic edit operation, both the edit-in and edit-out points for one tape should be specified, as well as one of the edit-in and edit-out points for the other tape.

Although an edit operation can be carried out when only three of the four edit points are known, an operator often finds it desirable to verify the remaining edit point. For example, in establishing the parameters for the edit operation, the operator may designate specific edit-in and edit-out points for the playback tape, and may also designate a specific edit-in point for the recording tape. This could occur if the operator is aware of a specific segment on the playback tape which he wishes to transfer to the recording tape, and he also knows the particular location on the recording tape at which this segment should begin. However, he might not be fully cognizant of the information which would remain on the recording tape following this insertion. To best preview his proposed edit, the corresponding edit-out point which will result for the recording tape should be specified. Presently available editing devices do not indicate the time code address for such a resultant edit-out point without requiring the operator to undertake a time-consuming and complex data manipulation operation.

Furthermore, in selecting the parameters for an edit operation, the operator may select intermediate edit-in or edit-out points along one tape, such as when setting up a so-called agenda-edit operation (described in copending application Ser. No. 139,448 filed Apr. 11, 1980, for controlling the transfer of signals on the other tape. For example, an intermediate edit-in point along the playback tape may be designated, whereby when the playback tape reaches that intermediate edit-in point, signals will be transferred to the recording tape. Additional intermediate edit points also may be established for the recording tape. If one such intermediate edit-in point is indicated by the time code address of the playback tape and another intermediate edit-in point is designated by the time code address of the recording tape, the operator might not readily recognize which of these intermediate points will be reached first. Therefore, there is a need to permit conversion of the time code address representing an intermediate edit point along one tape to the time code address representing the corresponding edit point along the other tape.

OBJECTS OF THE INVENTION

Therefore, it is an object of the present invention to provide improved editing apparatus.

Another object of this invention is to provide editing apparatus which avoids the disadvantages and defects attending prior art editing apparatus, and which the aforementioned needs.

A further object of this invention is to provide editing apparatus which displays the various edit-in and edit-out points that have been selected for playback and recording media, and which is operable when only three of four edit points have been designated, to display the resultant fourth edit point which would be defined by the other three.

An additional object of this invention is to provide editing apparatus which displays the various edit-in and edit-out points that have been selected for playback and recording media, as well as one additional edit point that has been selected for one of the media, and which is operable to convert that additional edit point to a corresponding edit point on the other medium.

Various other objects, advantages and features will become readily apparent from the ensuing detailed description, and the novel features will be particularly pointed out in the appended claims.

SUMMARY OF THE INVENTION

In accordance with this invention, editing apparatus for controlling the transfer of signals from a playback medium to a recording medium is provided. The apparatus includes a console having a plurality of display registers, including a play IN register for displaying play IN position data representing an edit-in point along the playback medium, a record IN register for displaying record IN position data representing an edit-in point along the recording medium, a play OUT register for displaying play OUT position data representing an edit-out point along the playback medium and a record OUT register for displaying record OUT position data representing an edit-out point along the recording medium. The console also has a plurality of register selector switches, each associated with and adjacent a respective one of the display registers and operable to select the display register associated therewith. A manually operable enabling switch enables position data to be displayed in a selected one of the play IN, record IN, play OUT and record OUT registers as a function of the position data displayed in the remainder of these registers. The apparatus also includes a central processing unit responsive to the operation of the enabling switch and a selected one of the register selector switches to obtain data representing the duration between the edit-in and edit-out points as represented by the position data displayed in two of the registers, neither of which is associated with the selected register switch, to combine the duration data with the position data displayed in a third register, which third register is not associated with the selected register switch, to produce resultant position data, and to cause the resultant position data to be displayed in the register associated with the register selector switch.

The apparatus of this invention also includes an additional register for displaying position data selectively representing an additional edit-in or edit-out point along the playback or recording medium, and a register selector switch is associated with and adjacent this additional register. The central processing unit is responsive to the operation of the enabling switch and the register selector switch associated with the additional register to convert the position data displayed in the additional register from a representation of an edit point on one medium to a representation of a corresponding edit point on the other medium.

BRIEF DESCRIPTION OF THE DRAWINGS

The following detailed description, given by way of example, will best be understood in conjunction with the accompanying drawings in which:

FIG. 2 is a block diagram of the present invention in the environment of a video editing apparatus;

FIG. 3 is a block diagram representing apparatus used with the present invention and by which data from the console is communicated to the central processing unit;

FIGS. 4A and 4B are partial block, partial logic diagrams representing apparatus by which data is communicated from the central processing unit to the console;

FIGS. 6A–6E are timing diagrams which are useful in understanding a portion of the circuitry shown in FIG. 4B;

FIGS. 8A–8F and 9A–9K are timing diagrams which are useful in understanding the operation of the circuits shown in FIG. 7;

FIGS. 11A–11L are timing diagrams which are useful in understanding the operation of the logic circuits shown in FIG. 10;

FIGS. 14A–14D are flow charts which are useful in understanding the operation of the central processing unit in accordance with the present invention.

DETAILED DESCRIPTION OF A CERTAIN PREFERRED EMBODIMENT

Although the present invention is generally applicable to the transfer of data from one location to another, the following description is intended, by way of clarity, to explain this invention in the environment of video editing apparatus. In such apparatus, video signals that are recorded on one medium are re-recorded onto another medium. Although such record media may comprise magnetic tape, magnetic disks, and other conventional recording media, it will be assumed, for the purpose of the present discussion, that magnetic tape is used. Thus, the video editing apparatus will be described in conjunction with video tape recording (VTR) devices, including a source VTR from which pre-recorded video signals are reproduced, and a destination VTR, onto which the reproduced video signals are recorded.

As is known to those of ordinary skill in the art, when video signals are recorded on magnetic tape, time code addresses also are recorded in a longitudinal track. Such time code addresses serve to identify the respective frames of video signals such that, during an edit operation, any desired frame can be addressed such that the addressed frame may be reproduced from the source tape, or the addressed frame may be erased, such as by "over-recording" on the destination tape. As mentioned above, one type of time code address which is used is the SMPTE code. In addition to recording a time code address, control pulses, known as control track signals, also are recorded in predetermined relation with the commencement of a field or frame of video signals. Such control track signals may be counted and used as frame addresses; although it is much preferred to utilize the specific time code addresses for this purpose. Nevertheless, for the purpose of the present discussion, since both time code addresses and control track signals may be used to represent the relative position of the video tape upon which such signals are recorded, the expression "position data" or "position data signals" will be used to refer to such address signals and control track signals.

Figure 1:
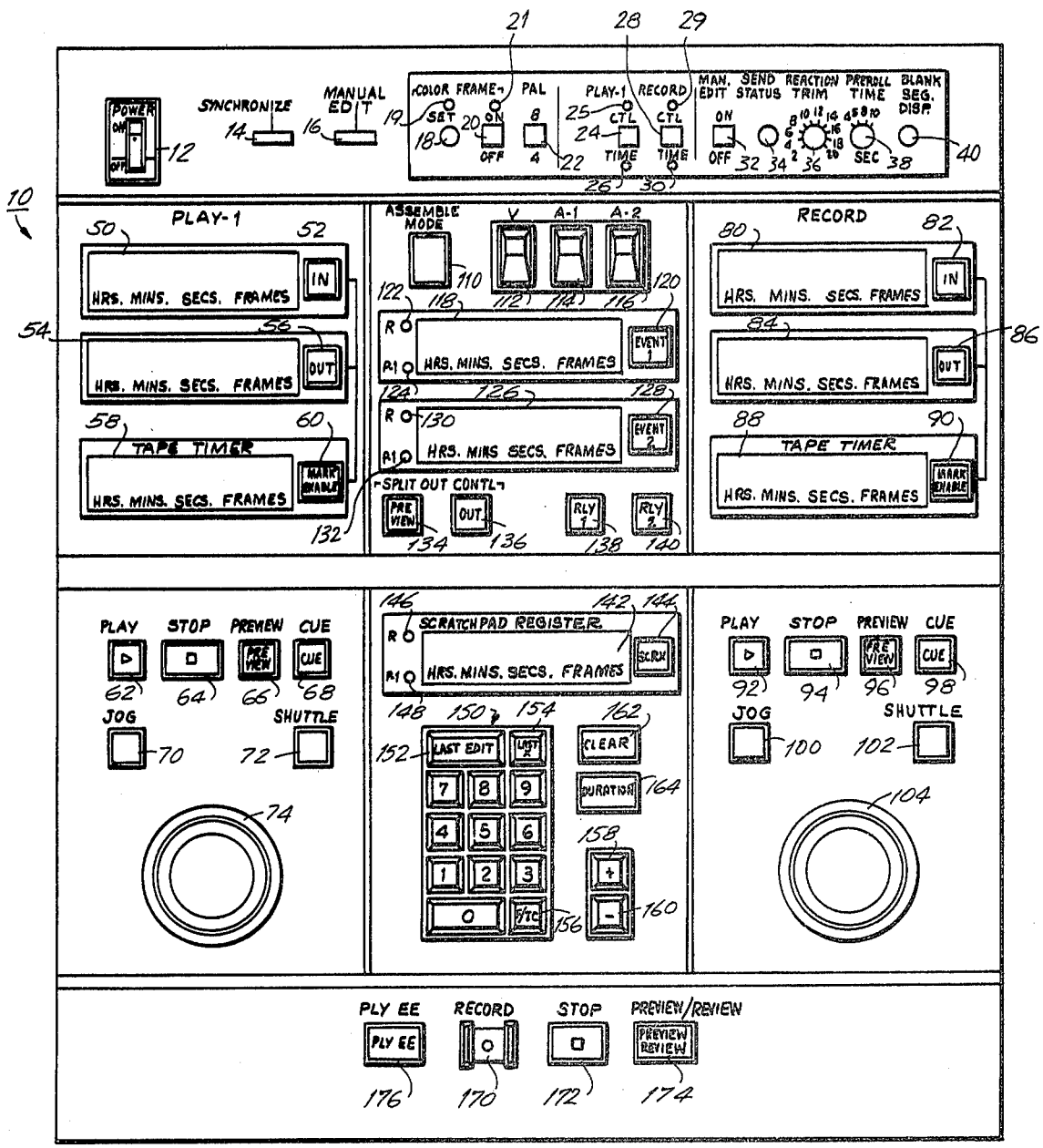
FIG. 1 is a front view of a console which is used with the present invention.

Turning now to FIG. 1, there is illustrated a front view of a console 10 which is used with video editing apparatus in which the present invention is incorporated. Console 10 conveniently is divided into a plurality of sections, including a playback section, a recording section, a data-handling section, and a control section. Also included on console 10 is a power on/off switch 12 to supply electrical power to the illustrated console. A SYNCHRONIZE lamp 14 is provided adjacent power on/off switch 12. The purpose of this SYNCHRONIZE lamp is to indicate when the playback and recording tapes are transported in synchronism. It may be appreciated that, in order to carry out an edit operation, a particular edit-in point should be selected for each of the playback and recording tapes. Typically, once these appropriate edit-in points have been selected, both the playback and recording tapes are rewound, or "pre-rolled" a particular distance. Then, the playback and recording tapes are advanced toward the selected edit-in points. For a proper edit operation, that is, to provide proper transfer of the video signals from the playback tape to the recording tape, it is necessary that the playback and recording heads rotate in synchronism with each other, that the playback and recording tapes advance in synchronism with each other, and that the edit-in points on both tapes arrive at their respective heads simultaneously. Conventional servo apparatus is provided to insure that, during the forward movement of the playback and recording tapes from their respective pre-rolled positions, this synchronism occurs. SYNCHRONIZE lamp 14 provides an indication that this synchronous "lock-up" condition has been attained. For example, SYNCHRONIZE lamp 14 may flash while the servo apparatus attempts synchronous operation, and then this lamp may be energized continuously once the lock-up condition has been attained.

A MANUAL EDIT lamp 16 is provided adjacent SYNCHRONIZE lamp 14 and is adapted to indicate when a manual edit operation is to be carried out. During normal automatic editing, this MANUAL EDIT lamp is extinguished. However, for those instances where an operator prefers to carry out a manual edit operation, this MANUAL EDIT lamp will be energized.

A color frame synchronizing section is adjacent MANUAL EDIT lamp 16. This color frame synchronizing section includes an ON/OFF switch 20 and associated indicator lamp 21, a SET switch 18 and associated indicator lamp 19 and a PAL 4/8 switch 22. It is appreciated that, in conventional color television signals, the phase of the chrominance subcarrier in one particular line in one frame differs from the phase of that subcarrier in the same line in the next frame. For example, in the NTSC system, the phases of the chrominance subcarrier in the same line in adjacent frames differ from each other by 180°. During an edit operation, the first frame of video signals which are reproduced from the playback tape may exhibit an out-of-phase relationship with the last frame of the video signals on the recording tape. To provide color frame synchronization, it may be necessary to provide a correction offset to the position data (e.g. the time code address) associated with the playback tape. Such correction offset is carried out by turning ON/OFF switch 20 on, effecting a frame adjustment (described generally below) and operating SET switch 18. An indication of improper color frame synchronization is provided by the blinking, or flashing, of color frame SET lamp 19. This, of course, would mean that an additional address offset is needed. Alternatively, if ON/OFF switch 20 is operated to its off condition, color frame synchronization is dispensed with, and the edit operation is carried out without such color frame synchronization. It may be appreciated that, if color frame synchronization is desired, edit previews (to be described) should be performed in order to determine if color frame synchronization has been achieved successfully, prior to the carrying out of an actual edit operation.

PAL 4/8 switch 22 is operable to select between four-field or eight-field synchronization when the video signals are PAL color television signals. As is known, the phase of the chrominance subcarrier of a particular line in one frame of a PAL video signal is out-of-phase by 90° with the chrominance subcarrier in that same line in the next-following frame, whereby the chrominance subcarrier varies in phase in a so-called four-frame sequence. The V component of the chrominance signal is reversed at every second line, thus resulting in the so-called four-field sequence. The PAL 4/8 switch enables the operator to select between these sequences.

Adjacent the color frame synchronizing section are CTL/TIME selection switches 24 and 28. Switch 24 is associated with the playback tape of the source VTR and switch 28 is associated with the recording tape of the destination VTR. These switches are adapted to select either the control track pulses or the time code addresses as the position data to be used in the edit operation. Specifically, if switches 24 and 28 are operated in the CTL position, then the control track signals read from the playback and recording tapes are used as the position data signals, and indicator lamps 25 and 29, respectively, are energized. Alternatively, if switches 24 and 28 are operated to their respective TIME positions, then the time code addresses read from the playback and recording tapes are used as the position data signals, and lamps 26 and 30, respectively, are energized.

Adjacent the CTL/TIME selector switches are the MANUAL EDIT switch 32, SEND STATUS switch 34, REACTION TRIM control 36, PREROLL time switch 38 and BLANKING switch 40. MANUAL EDIT switch 32 is adapted to select either an automatic editing operation or, when operated to its ON condition, to select a manual edit mode of operation. In the manual edit mode, MANUAL EDIT lamp 16 is energized and the edit operation is carried out in response to the manual operation of the operator. That is, when the playback and recording tapes reach their desired locations, the operator merely operates a RECORD switch 170 (disposed in the control section of the illustrated console) to effect a recording of the video signals then reproduced from the playback tape.

SEND STATUS switch 34 is adapted to supply the central processing unit that is used with console 10 with the particular control parameters which are selected by operation of the color frame synchronizing controls, the CTL/TIME switches, the MANUAL EDIT switch, the REACTION TRIM switch and the PREROLL time switch. Adjustments of these respective controls do not effect a corresponding change in the parameters supplied to the central processing unit unless SEND STATUS switch 34 is operated.

REACTION TRIM switch 36 is adapted to correct, or compensate (i.e. "trim") for a delayed reaction on the part of the operator. This compensation is selectable between 0 and 12 frames. For example, in setting up the respective edit-in and edit-out points for an edit operaiton, let it be assumed that during normal, or play speed of the tape, the operator's reaction to setting the edit-in point is delayed. If his delay is, for example, equal to the amount of time that 6 frames have been transported, then, without any compensation, the edit-in point will be displayed from the operator's desired edit-in point by 6 frames. However, by setting REACTION TRIM switch 36 to a "trim" of 6, the operator's delayed reaction is compensated. That is, the edit-in point automatically will be reduced by 6 frames so as to be equal to the desired edit-in point. It should be recognized that, with this setting of REACTION TRIM switch 36, all edit-in and edit-out selections will be compensated by this amount when the tapes are driven at their normal play speed.

PREROLL TIME switch 38 is selectable to establish a desired rewind time for the respective playback and recording tapes prior to their edit-in points. For example, depending upon the setting of this PREROLL TIME switch, the playback and recording tapes both will be rewound, or prerolled, by an amount represented by the setting of PREROLL TIME switch 38 when an edit operation is to be carried out or previewed. It is recalled that, as these tapes are advanced from their pre-rolled positions, SYNCHRONIZE lamp 14 will flash until the tapes are transported in synchronism, that is, until such tapes are "locked-up", and then this lamp will be energized continuously.

BLANKING switch 40 is adapted, when operated, to "blank" all displays on console 10. This may be desired during, for example, a manual edit operation wherein these displays may distract the operator. Although the data which is displayed by such displays is blanked, such data nevertheless remains stored for subsequent use.

The playback and record sections of console 10 are of substantially similar construction. In the interest of brevity, only the playback section is described. It will, of course, be appreciated that the following description is equally applicable to the record section of the console. The playback section is provided with a plurality of display registers, referred to herein as an IN register 50, an OUT register 54 and a tape timer register 58. IN register 50 is adapted to display position data, and represents the edit-in point on the playback tape. Depending upon the setting of CTL/TIME switch 24, the position data displayed by IN register 50 either is a time code address, such as the SMPTE time code address in terms of hours, minutes, seconds and frames, or is a frame count representing the number of control track signals that have been counted. IN register 50 sometimes may be referred to herein as the play-in register.

OUT register 54 is adapted to display the position data representing the edit-out point of the playback tape. This position data may be in the form of a time code address or frame count, depending upon the setting of CTL/TIME switch 24. OUT register 54 sometimes may be referred to herein as the play-out register.

Tape timer register 58, which also may be referred to as the present position register, is adapted to display the position data representing the present position of the playback tape. As will be explained below, tape timer register 58 is updated continually as the playback tape is moved. If the playback tape is transported in the forward direction, the position data displayed by tape timer register 58 is incremented. Conversely, if the playback tape is rewound, the position data displayed in this tape timer register is decremented.

Selector switches 52, 56 and 60 are associated with IN register 50, OUT register 54 and tape timer register 58, respectively. Selector switch 52 is referred to herein as the edit-in (or, play in) switch; selector switch 56 is referred to as the edit-out (or play out) switch and selector switch 60 is referred to as the mark enable switch. These switches are used to control the transfer of position data between the illustrated display registers and, depending upon the order in which such switches are operated, function as "source" and "destination" switches. More particularly, the first of switches 52, 56 and 60 which is operated serves to designate its associated display register as a "source" register, and this switch thus is considered to be a source switch. The operation of one of switches 52, 56 and 60 as a source switch thus determines the particular display register from which data is to be transferred. That is, the data is transferred from a source register to a destination register. After one of switches 52, 56 and 60 is operated, the second of these switches to be operated serves to designate its associated display register as a destination register and, consequently, this switch is considered to be a destination switch. Thus, and as an example, if mark enable switch 60 is operated as the source switch, the operation of either of edit-in switch 52 or edit-out switch 56 functions as a destination switch to designate IN register 50 or OUT register 54 as a destination register, whereby the position data in tape timer register 58 is transferred either to IN register 50 or to OUT register 54. It may be appreciated that this is a typical operation to establish the edit-in and edit-out points.

A respective indicator also is provided in association with each of edit-in switch 52, edit-out switch 56 and mark enable switch 60. These indicators preferably are indicator lamps and, if the selector switches are constructed as push-button switches, each such lamp may be provided in a common housing with its associated switch. Alternatively, these indicators may be other light sources, such as LED's, LCD's or the like. As will be explained in greater detail below, when a particular selector switch is operated as a source switch, its associated lamp provides a distinctive indication thereof, thus apprising the operator as to his selection of the source switch. Thus, in the aforementioned example, if mark enable switch 60 is operated as the source switch, the indicator lamp associated therewith is energized. In the present embodiment, the mark enable lamp is energized to its steady-state "on" condition. If the edit-in or edit-out switch is operated, the respective lamps associated therewith is energized to a flashing condition.

As mentioned above, the record section of console 10 is substantially similar to the playback section, and IN register 80 (sometimes referred to as the record in register), OUT register 84 (sometimes referred to as the record out register) and tape timer register 88 correspond to aforedescribed registers 50, 54 and 58, respectively. Similarly, edit-in switch 82, edit-out switch 86 and mark enable switch 90 are similar to selector switches 52, 56 and 60, respectively. It will be clear, from the ensuing detailed discussion, that the selector switches in the playback section may be operated independently of the selector switches in the record section, and data may be transferred from one display register to another.

Both the playback and record sections of console 10 are provided with suitable tape-movement controls. These controls are substantially the same and, in the interest of brevity, only the controls provided in the playback section will be described. These controls include a PLAY switch 62, a STOP switch 64, a PREVIEW switch 66, a CUE switch 68, a JOG switch 70, a SHUTTLE switch 72 and a speed/direction control 74. PLAY switch 62, which may be a push-button switch associated with an indicator lamp provided in, for example, a common housing, is adapted, when operated, to initiate a playback operation such that video signals are reproduced from the playback tape. STOP switch 64, which also may be constructed as a push-button switch, is adapted, when operated, to halt tape motion of the playback tape.

Speed/direction control 74 is adapted to cooperate with JOG switch 70 and with SHUTTLE switch 72 to control the direction and speed at which the playback tape is moved. For example, if JOG switch 70 is operated, the amount of playback tape which is advanced is determined by the angular rotation of speed/direction control 74. Furthermore, the direction in which this tape is moved is a function of the clockwise or counterclockwise rotation of control 74. For example, if JOG switch 70 is operated and if speed/direction control 74 is rotated in the clockwise direction by a relatively small angular amount, then a correspondingly small length of playback tape is advanced in the forward direction. Successive rotary movements of control 74 result in incremental advances, or "jogging" of the playback tape.

When SHUTTLE switch 72 is operated, the playback tape is advanced at a speed and direction determined by the angular rotation of speed/direction control 74. For example, with the SHUTTLE switch operated, a relatively small angular displacement in the clockwise direction of control 74 results in advancing the playback tape at a correspondingly slow speed. If control 74 had been rotated in the counter clockwise direction, the playback tape would have been rewound at a speed determined by the angular rotation of this control. When control 74 is returned to its initial, or 0° position, the playback tape is stopped.

Thus, the use of JOG and SHUTTLE switches 70 and 72, in cooperation with speed/direction control 74, enables the operator to drive the playback tape at a controlled speed so as to search for, or approach, a desired tape position. It is appreciated that, as the playback tape is driven in this manner, the position displayed by tape timer register 58 correspondingly is changed. When a desired location of the tape is reached, the relative position thereof is displayed by the position data in tape timer register 58.

PREVIEW switch 66 is adapted, when operated, to enable a television monitor connected to the playback VTR to display the video signals which will be reproduced from the playback tape if an actual edit operation is carried out. More particularly, the playback tape will rewind, or pre-roll, to a location upstream of the edit-in point displayed in the IN display register 50. It is appreciated that the length of this pre-roll is determined by the setting of PREROLL TIME switch 38. Then, after this initial preroll operation, the playback tape will be advanced. In order to provide the operator with only that video information which will be transferred to the recording tape during the actual edit operation, the display monitor will be blank, or will display a "black" video picture, until the playback tape has reached the edit-in point. At that time, blanking of the display monitor will be terminated and the monitor will display the video picture corresponding to the video signals then reproduced from the playback tape. When the playback tape reaches its edit-out point, blanking of the display monitor will resume. Thus, when PREVIEW switch 66 is operated, the display monitor will exhibit a black-video-black picture corresponding to the pre-rolled video signals, the video signals which will be re-recorded on the recording tape, and then the succeeding video signals reproduced from the playback tape. The operator will perceive only that video information which will actually be re-recorded during the edit operation.

CUE switch 68 is adapted, when operated, to actuate the playback VTR such that the playback tape is driven to a selected position. For example, if the edit-in switch is operated and then the CUE switch is operated, the playback tape is driven to the position represented by the position data in IN display register 50. Alternatively, if edit-out switch 56 had been operated and then CUE switch 68 is operated, the playback tape is driven to the position represented by the position data in OUT display register 54. The playback tape also may be driven to other positions represented by position data in display registers 118, 126 or 142 of the data handling section of console 10, as will be described. A more detailed description of the cue operation is set out in copending application Ser. No. 139,691 filed Apr. 11, 1980. Thus, an operator may drive the playback tape to a selected position merely by operating CUE switch 68.

Switches 62, 64, 66, 68, 70 and 72 may be provided with associated indicators such that when a respective one of these switches is operated, a corresponding indication of the selected switch is provided. If these switches are push-button switches, the indicators associated therewith may comprise lamps which, preferably, are disposed in the same housing as such push-button switches.

PLAY switch 92, STOP switch 94, PREVIEW switch 96, CUE switch 98, JOG switch 100, SHUTTLE switch 102 and speed/direction control 104 included in the record section of console 10 are similar to the corresponding switches and control device described hereinabove in respect of the play section. It should be noted, however, that when PREVIEW switch 96 is operated, the display monitor connected to the recording VTR will display a video picture corresponding to the pre-rolled portion of recording tape and then the video picture will be blanked while the recording tape advances from its edit-in point to its edit-out point (these points being represented by the position data in display registers 80 and 84, respectively), and once the recording tape reaches its edit-out point, the monitor no longer will be blanked but will display the video picture corresponding to the reproduced video signals from the recording tape. Thus, a "preview" operation for the recording tape is displayed as a video-blank-video picture.

Referring now to the data handling section of console 10, this section is comprised of upper and lower portions. The upper portion of the data handling section is comprised of an ASSEMBLE MODE switch 110, a video (V) switch 112, an audio-1 (A-1) switch 114, an audio-2 (A-2) switch 116, a display register 118, an associated selector switch 120, referred to as the EVENT-1 switch, a display register 126 and an associated selector switch 128, referred to as the EVENT-2 switch. Display registers 118 and 126 also are referred to as the EVENT-1 and EVENT-2 registers, respectively. The purpose of these selector switches and display registers is to carry out a so-called "agenda edit" mode of operation. ASSEMBLE MODE switch 110 is adapted, when operated, to condition the setting up of an assemble-edit operation.

It is appreciated that, in recording video signals for broadcast purposes, for example, two separate audio tracks are recorded longitudinally on the tape. In some edit operations, it is preferred to transfer video signals from the playback tape to the recording tape at a time which differs from the transfer of the audio signals. Also, it may be desired to transfer the audio signals from one audio track on the playback tape at a time which differs from the transfer of the audio signals from the other audio track. The agenda-edit operation permits such "split" recording of video and audio signals. For example, the video signals from the playback tape may be re-recorded on the recording tape prior to the time that the audio signals are re-recorded. Alternatively, the audio signals from the playback tape may be re-recorded on the recording tape prior to the time that the video signals are re-recorded. The operation of video (V) switch 112, audio-1 (A-1) switch 114 and audio-2 (A-2) switch 116 enable this split recording, or agenda edit operation. Each of the V, A-1 and A-2 switches 112, 114 and 116, respectively, may be constructed as a push-button switch. Indicators, such as lamps, are provided with each of these switches and, preferably, such lamps are mounted in the same housing as the push-button switch. Moreover, each switch preferably is provided with two indicator lamps, viz. an indicator lamp associated with the upper half of the switch and an indicator lamp associated with the lower half thereof. The manner in which these switches and associated indicator lamps operate to establish an agenda-edit mode of operation will be described below.

EVENT-1 register 118 and EVENT-2 register 126 may be similar to aforedescribed IN and OUT registers 50 and 54. Each of these event registers is adapted to display position data. Furthermore, EVENT-1 and EVENT-2 switches 120 and 128 may be similar to aforedescribed edit-in switch 52 and edit-out switch 56 such that, when operated, their associated event register is designated either as a source or destination register. An indicator, such as a lamp disposed in the same housing thereof, is associated with each of EVENT-1 and EVENT-2 switches 120 and 128 so as to provide a distinctive indication that its associated switch has been operated as a source switch.

Additional indicators 122 and 124 are associated with EVENT-1 register 118 and, similarly, additional indicators 130 and 132 are associated with EVENT-2 register 126. Indicator 122 may comprise, for example, a light emitting diode (LED), or other suitable light source, and is referred to as a record (R) indicator. This record (R) indicator 122 is adapted to be energized when position data in EVENT-1 register 118 is transferred thereto from any of the display registers provided in the record section of console 10. Indicator 124 is referred to as a playback (P) indicator and is adapted to be energized when the position data in EVENT-1 register 118 is transferred thereto from a display register provided in the playback section of the console. Similarly, record (R) indicator 130 and playback (P) indicator 132 are associated with EVENT-2 register 126, and these indicators are adapted to be energized to represent the source (record or playback section) of the position data in EVENT-2 register 126.

The upper portion of the data handling section of console 10 also is provided with SPLIT OUT control switches consisting of a SPLIT OUT PREVIEW switch 134 and a SPLIT OUT selector switch 136. As mentioned above, an agenda-edit mode can be established such that the positions at which the video and audio signals first are transferred from the playback tape to the recording tape are selected and displayed in respective registers, to be described. This operation is known as a "split-in" operation wherein the edit-in points are "split" among the video and audio signals. Similarly, an edit-out point can be "split" among the video and audio signals. The SPLIT OUT control switches, and particularly SPLIT OUT switch 136, establish the respective edit-out points for the video and audio signals. For example, if SPLIT OUT switch 136 is operated, an edit-out point for the video signals and different edit-out points for the audio signals may be selected. This split-out agenda-edit operation will be described below.

It will be appreciated that a split-in or a split-out agenda-edit mode may be established for the playback tape and/or for the recording tape. If a split-out agenda-edit operation is selected, the operation of SPLIT-OUT PREVIEW switch 134 enables a display monitor connected to the record VTR to display a "preview" of the split-out agenda-edit operation. For example, if a split-out agenda-edit operation has been selected for the recording tape, operation of SPLIT OUT PREVIEW switch 134 results in a display of the video picture associated with the selected split edit-out points.

As will be described below, during an agenda-edit operation, EVENT-1 register 118 and EVENT-2 register 126 will display either edit-in or edit-out points. For a split-in agenda-edit operation, these display registers will display position data which define the positions along the playback tape at which the respective video and audio signals are to be transferred to the recording tape or, if desired, the position data representing those positions along the recording tape at which incoming video and audio signals are to be recorded. If this position data represents the edit-in points on the playback tape, the playback (P) indicators 124 and 132 will be energized and the EVENT-1 and EVENT-2 registers then may be considered to be included within the playback section of console 10. Alternatively, if the position data displayed in these EVENT-1 and EVENT-2 registers identify the edit-in points on the recording tape, then record (R) indicators 122 and 130 will be energized and EVENT-1 display register 118 and EVENT-2 register 126 may be considered to be included within the recording section of the console.

If SPLIT-OUT selector switch 136 is operated to establish split edit-out points for an agenda-edit operation, then the position data displayed in the EVENT-1 and EVENT-2 display registers will represent the edit-out points selected for the recording tape (which will be indicated by the energization of record indicators 122 and 130). As before, EVENT-1 register 118 and EVENT-2 register 126 may be considered to be included in the recording section of console 10.

It will also be described below that the event display registers may be used as supplemental registers to display, or store, additional edit-in and edit-out points for either the playback or recording tape, in order to enable an operator to switch quickly from one to another of such points during an edit operation. This feature becomes extremely useful when an operator has determined that two or more points, such as edit-in points, might be used in the actual edit operation, yet he must select only one of such points. By storing a plurality of edit-in points, the operator may preview various ones of such stored edit-in points easily and quickly, thus assisting him in his selection.

The upper portion of the data handling section of console 10 also is provided with a RELAY-1 switch 138 and a RELAY-2 switch 140. Each of these RELAY switches may be constructed as a push-button switch and may be provided with an associated indicator, such as a lamp that is disposed in the same housing therewith. When operated, the associated indicator is energized. The purpose of these RELAY switches is to actuate, or trigger, an external device, such as a special effects generator, a slow-motion device, and the like, when the particular edit point displayed in the EVENT-1 and EVENT-2 registers, respectively, is attained. For example, if an appropriate external device is coupled to the video editing apparatus, and if the position data in EVENT-1 register 118 represents a particular location on the playback tape (which is indicated by the energization of playback indicator 124), then when the playback tape is advanced to this displayed location, the external device coupled to RELAY-1 switch 138 will be actuated if this switch had been operated. As another example, if the position data in EVENT-2 register 126 represents a particular location along the recording tape (which is indicated by the energization of record indicator 130), then if RELAY-2 switch 140 is operated, the external device coupled thereto will be actuated, or triggered, when the recording tape has been advanced to the location corresponding to the position data in the EVENT-2 register.

The lower portion of the data handling section of console 10 is provided with a display register 142, its associated selector switch 144, a numerical keyboard 150, arithmetic operation selector switches 158 and 160, a CLEAR switch 162 and a DURATION switch 164. Display register 142 is referred to herein as a scratchpad register and is adapted to display numerical data derived from the operation of keyboard 150, as well as to display position data. Its associated selector switch 144, designated the SCRX switch, functions in a manner similar to the aforedescribed selector switches 52, 56, 60, 82, 86, 90, 120 and 128. Scratchpad register 142 also is provided with a record (R) indicator 146 and a playback (P) indicator 148, these indicators being similar to the aforementioned record and playback indicators described with respect to the upper portion of the data handling section. Thus, if SCRX switch 144 is operated so as to designate scratchpad register 142 as a destination register, one of the record (R) and playback (P) indicators 146, 148 will be energized, depending upon whether the position data which is transferred to scratchpad register 142 was derived from a display register in the record or playback section of console 10. If SCRX switch 144 is operated to designate scratchpad register 142 as the source register, then the indicator associated with the SCRX switch (e.g. the lamp disposed in the same housing therewith) will provide the aforementioned distinctive indication representing that this switch has been operated as a source switch.

Numerical keyboard 150, together with arithmetic operation selector switches 158 and 160, are adapted, when operated, to enable the operator to adjust the position data in any of the aforementioned display registers. In the absence of position data in scratchpad register 142, the operation of numerical keyboard 150 results in the display of the selected numerical data in this display register. When one of the arithmetic operation selector switches 158 and 160 is operated, for example, the "+" switch 158 is operated, scratchpad register 142 is designated as the source register. Then, if any of the selector switches associated with other display registers is operated, its associated display register is designated as the destination register and the numerical data in scratchpad register 142 is summed with the position data in that destination register. This summed data now is displayed in the designated destination register. A similar operation occurs if the "−" switch 160 is operated. In this manner, position data in any of the display registers may be adjusted by arithmetically combining that position data with the numerical data which is "keyed" into scratchpad register 142 from numerical keyboard 150.

An arithmetic adjustment of the position data displayed in one display register by the position data displayed in another display register also may be effected, if desired. This is attained by operating a desired one of the selector switches as a source switch, then by operating one of the arithmetic operation selector switches 158 and 160, followed by operating another of the selector switches as a destination switch. This operation results in arithmetically combining the position data in the display register that had been designated as the source register with the position data in the display register that had been designated as the destination register in accordance with whether the "+" switch 158 or the "−" switch 160 had been selected. For example, the position data displayed in EVENT-1 register 118 may be summed with or subtracted from the position data in IN register 50 by operating EVENT-1 switch 120, followed by "+" switch 158 or "−" switch 160, followed by edit-in switch 52. The resultant position data (sum or difference) is displayed in IN register 50.

Keyboard 150 also is provided with a LAST EDIT switch 152. This switch, when operated, restores the position data displayed in the respective display registers to that data which was present at the completion of the immediately preceding edit operation. Thus, an operator may recall all previous data to their respective registers so that, if desired, the edit operation may be modified and attempted once again. Such rapid recall of the parameters associated with the preceding edit operation avoids the introduction of errors which might otherwise occur if such data had to be reconstructed manually.

Keyboard 150 also is provided with a LAST X selector switch 154. This switch, when operated, restores the immediately preceding data in the destination register (for example, an IN, OUT or EVENT register) which has been selexted. For example, if the operator transfers new position data into IN register 50, the operation of LAST X switch 154 restores the immediately preceding data which had been present in this IN register. Similarly, if EVENT-1 register 118 is selected as a destination register, that is, if position data is transferred thereto, the operation of the LAST X switch restores to this event register the data which had been present therein prior to this latest transfer.

Finally, keyboard 150 is provided with an F/TC switch 156. this switch preferably comprises a push-button selector which having two conditions: (1) to select the time code address as the position data displayed in scratchpad register 142, and (2) to select the frame count (i.e. a count of the control track signals on the tape) as the position data displayed in the scratchpad register. Successive operation of push-button switch 156 is effective to establish one or the other of the two conditions.

CLEAR switch 162 is adapted, when operated, to clear all data entries into scratchpad register 142 and, when operated as a source switch, to clear, or "blank" the position data displayed in a display register that is selected as a destination register. DURATION switch 154 is adapted, when operated, to result in the display in the tape timer registers of the difference, or duration, between the edit-in and edit-out points which have been selected for the playback and recording tapes, respectively; and also to display in scratchpad register 142 the total elapsed edit time, i.e. from the first edit-in position to the current, or present position. These displays may be cleared by the concurrent operation of the DURATION and CLEAR switches. As will be explained below, if position data is displayed in three of the four display registers (i.e., the play IN, play OUT, record IN and record OUT registers), concurrent operation of DURATION switch 154, which may be a push-button switch, and the register selector switch associated with the fourth register will result in the display therein of proper position data. Also, concurrent operation of the DURATION switch and an EVENT switch will convert the position data displayed in the associated EVENT register from an edit point along one tape to a corresponding edit point along the other tape.

The control section of console 10 is comprised of a RECORD switch 170, a STOP switch 172, a PREVIEW switch 174 and a PLY E-E switch 176. The RECORD switch, when operated, initiates an actual edit operation. That is, the playback and record VTR's are operated, in response to the actuation of RECORD switch 170, to pre-roll the playback and recording tapes, respectively. Then, once the predetermined pre-roll positions (as selected by PREROLL TIME switch 38) are reached, the respective tapes are advanced toward the edit-in points displayed in IN registers 50 and 80. The information signals on the playback tape then are re-recorded on the recording tape until the respective edit-out positions, as displayed in OUT registers 54 and 84, are reached.

STOP switch 172 serves to stop both VTR's at any time. If, in the course of an actual edit operation, the operator wishes to terminate that operation immediately, operation of the STOP switch will achieve this. PREVIEW switch 174 is adapted, when operated, to provide a preview, or preliminary display, of the edit operation which has been established by the parameters in the respective display registers. A suitable display monitor coupled to the recording VTR will display this previewed edit operation. Thus, when PREVIEW switch 174 is operated, the monitor displays a video picture corresponding to those video signals which had been recorded on the recording tape upstream of the edit-in point, followed by the video picture corresponding to those video signals which are reproduced from the playback tape and re-recorded on the recording tape between the edit-in and edit-out points, followed by the video picture corresponding to those video signals which remain on the recording tape downstream of the edit-out point (i.e. a video-video-video picture).

PLAY E-E switch 176 is adapted to couple an external source of video signals, other than signals which are reproduced by a VTR, to the recording VTR in an edit operation. That is, if a suitable external video source is coupled to the video editing apparatus in place of a playback VTR, then, when PLAY E-E switch 176 is operated, an edit operation is carried out with the signals from this external source being used in place of reproduced video signals. Typically, a color bar generator may be used as such an external video source, and a color bar pattern derived from this source may be edited onto the recording tape.

The operation of console 10 to carry out various types and formats of edits now will be described. In each of the following examples, it is assumed that color frame synchronization has been established, that position data is represented as a time code address, and that a desired amount of reaction trim and pre-roll time had been set by REACTION TRIM and PREROLL TIME switches 36 and 38.

Basic Edit

In this example, it is assumed that both the video and audio signals which are recorded along a particular length of playback tape are to be transferred to the recording tape. Initially, the operator actuates MARK ENABLE switch 60, thus designating tape timer register 58 as a source register. When this MARK ENABLE switch is actuated, its associated indicator is energized to indicate that tape timer register 58 has been designated as the source register. The operator now may advance the playback tape by use of JOG switch 70, SHUTTLE switch 72 and speed/direction control 74 until desired information is located. This information may be displayed by a suitable display monitor coupled to the playback VTR. It is appreciated that, in order to locate the desired location of the playback tape, the speed at which the tape is advanced is varied, and it is expected that, as the desired location approaches, the tape speed will be relatively slow. As the tape advances, the time code address displayed in tape timer register 58 correspondingly changes.

When the playback tape reaches its desired location such that the information recorded thereon is to be transferred to the recording tape, the operator actuates edit-in switch 52. The time code address displayed in tape timer register 58 at the instant that edit-in switch 52 is actuated is transferred into IN register 50. If the playback tape had been driven at its normal play speed, this time code address is adjusted, e.g. decreased, by the predetermined amount set by REACTION TRIM switch 36. Hence, a delay in the operator's reaction to actuate edit-in switch 52 is compensated. If desired, the operator now may operate STOP switch 64 to arrest the playback tape.

The time code address of the edit-out point is established in a similar manner. That is, JOG and SHUTTLE switches 70 and 72, together with speed/direction control 74 are operated until a desired edit-out location is reached. At that time, if the MARK ENABLE switch 60 had been operated to designate tape timer register 58 as a source register, then edit-out switch 56 should be actuated to designate OUT register 54 as the destination register, whereupon the time code address then present in the tape timer register is transferred into this OUT register. A trim adjustment to this time code address is effected in order to compensate for the operator's delayed reaction in actuating edit-out switch 56 if the tape is driven at its normal play speed.

In a similar manner, desired edit-in and edit-out locations along the recording tape are determined, and mark enable switch 90, edit-in switch 82 and edit-out switch 86 in the recording section of console 10 are operated so as to set the respective edit-in and edit-out time code addresses into the IN and OUT registers 80 and 84.

Normally, the record edit-out point, that is, the position data in OUT register 84, is used to terminate the edit, or signal transfer, operation. However, if the OUT register is blanked, the position data in OUT register 54 is used to terminate the edit operation.

If desired, the operator may adjust one or more of the selected edit-in and edit-out points by operating keyboard 150 such that scratchpad register 142 displays numerical data. This numerical data may be added to the time code address in, for example, OUT register 54 by operating "+" switch 158 followed by edit-out switch 56. This operation serves to add the quantity in scratchpad register 142 to the quantity in OUT register 54. Alternatively, the quantity displayed in scratchpad register 142 may be added to the time code address displayed in IN register 50, or it may be subtracted from the time code address in OUT register 54 by operating "—" switch 160 and then operating edit-out switch 56. OUT register 54 thus will display the difference between the time code address which previously had been displayed therein and the quantity entered into scratchpad register 142.

As yet another alternative, the operator may wish to adjust the edit-in and edit-out points on the recording tape, as displayed in IN register 80 and OUT register 84, by a similar arithmetic operation. Thus, the time code addresses displayed in registers 80 and 84 may be increased or reduced, as desired.

After adjusting the respective edit-in and edit-out points on the playback and/or recording tape, the information which is to be reproduced from the playback tape may be previewed by operation of PREVIEW switch 66. It is recalled that, when PREVIEW switch 66 is operated, the display monitor coupled to the playback VTR displays a video picture corresponding to black-video-black information. That is, only the video signals which are to be transferred from the playback tape to the recording tape are displayed. Video information surrounding this transferred information is blanked.

Similarly, in order to preview the video picture which will be retained on the recording tape, the operator may actuate PREVIEW switch 96. This switch energizes the recording VTR to pre-roll the recording tape and then advance that tape such that the display monitor coupled thereto displays a video picture represented as video-black-video. That is, that portion of the video picture which will be replaced by the information transferred from the playback tape is blanked.

If, after previewing the information to be edited from the playback to the recording tape, the operator wishes to make additional adjustments, for example, if he wishes to substitute other information to be edited, this may be attained by operating the mark enable, edit-in and edit-out switches in the manner described above.

The overall edit operation may be previewed by operating PREVIEW switch 174 of the control section of console 10. When this switch is operated, both the playback and record VTR's pre-roll their respective playback and recording tapes by the amount determined by PREROLL TIME switch 38. Then, both tapes are advanced toward their respective edit-in locations. It is recalled that, initially, SYNCHRONIZE lamp 14 flashes as the servo apparatus attempts to synchronize the movement of the playback and recording tapes. Once these tapes are driven in synchronism, that is, once the lock-up condition has been attained, SYNCHRONIZE lamp 14 is energized continuously. While the playback and recording tapes are advanced, the display monitor, such as the monitor that may be connected to the recording VTR, displays the information which is reproduced from the recording tape. Once the edit-in points of the playback and recording tapes are reached, which points are reached simultaneously, the monitor displays the information which is reproduced from the playback tape and which will be re-recorded on the recording tape. Then, when the respective edit-out locations are reached, the monitor once again displays the information which is reproduced from the recording tape. Thus, during this preview operation, the monitor displays the equivalent information which will be provided on the recording tape following the actual edit operation.

As mentioned above, if the respective playback and recording durations are not equal, the edit-out location that has been selected for the recording tape will control. That is, the signals which are reproduced from the playback tape will be recorded on the recording tape until the edit-out location represented by the time code address in OUT register 84 is reached. Hence, even if the edit-out point of the playback tape has been passed, the information reproduced from that tape will, nevertheless, be re-recorded on the recording tape until the edit-out location on the recording tape is reached.

If the operator now is satisfied with the parameters establishing the edit operation which he has selected, he may operate RECORD switch 170 to initiate the actual edit operation. Thus, the same operation obtains as was discussed with respect to the operation of PREVIEW switch 174, except that now the video signals which are reproduced from the playback tape at the time that the edit-in point on the recording tape is reached will be transferred to the recording tape.

After completion of this edit operation, the resultant information which now is recorded on the recording tape may be displayed on the display monitor connected to the recording VTR if PREVIEW switch 174 is operated. As a result of the operation of this switch immediately following the edit operation, the record VTR is energized to rewind the recording tape to its edit-in point and then advance it such that all of the edited signals recorded thereon are displayed on the display monitor.

Multiple Edit Points

When selecting parameters to carry out an edit operation, an operator may wish to select among a plurality of, for example, edit-in or edit-out points. For example, two or more possible edit-in points may be selected preliminarily, and the operator may wish to make a final determination as to which of these points will be used by observing them on the display monitor. To achieve this for the playback tape, for example, the operator actuates mark enable switch 60 and then advances the playback tape by operating JOG and SHUTTLE switches 70, 72 and speed/direction control 74 in the manner described above.

As the playback tape is advanced, the operator views the reproduced video picture on the display monitor connected to the playback VTR. When a first desired edit-in point is observed, the operator actuates edit-in switch 52. As discussed above, this transfers the time code address then present in tape timer register 58 into IN register 50. The operator then may continue to advance the playback tape while searching for another possible edit-in point. When the operator observes such a possibly desirable edit-in point, he operates EVENT-1 switch 120 so as to transfer the time code address then displayed in tape timer register 58 into EVENT-1 register 118.

Yet another possible edit-in point may be stored in EVENT-2 register 126 by a similar operation, that is, by operating EVENT-2 switch 128. A still further possible edit-in point may be stored in scratchpad register 142 by operating SCRX switch 144. It may be appreciated that, when time code addresses are transferred from tape timer register 58 in the playback section, play (P) indicators 124, 132 and 148 associated with display registers 118, 126 and 142, respectively, are energized.

A comparison of the video picture which would result from each of these selected edit-in points now may be made as follows. With the first edit-in point stored in IN register 50, the operator may actuate PREVIEW switch 66, thereby previewing the video picture commencing from this edit-in point. Then, after arresting the playback tape by operating STOP switch 64, the operator may transfer the edit-inpoint now stored in EVENT-1 register 118 into IN register 50. It is appreciated that this transfer is attained by first operating EVENT-1 switch 120, thus designating display register 118 as the source register, and then operating edit-in switch 52, thereby designating IN register 50 as the destination register. The operator now may operate PREVIEW switch 66 to preview the video picture which commences from the edit-in point which now has been transferred into display register 50.

After viewing this previewed video picture, the original time code address may be restored to IN register 50 by operating LAST X switch 154 of keyboard 150 in the data handling section of console 10. Then, the video picture commencing with the edit-in point stored in EVENT-2 register 126 may be previewed by transferring this edit-in point into IN register 50 in a manner similar to that described above with respect to the transfer of position data from display register 118 into display register 50. After previewing this video picture, the operator again may restore the original time code address into IN register 50 by operating LAST X switch 154. If desired, the edit-in point stored in scratchpad register 142 may be transferred to IN register 50, and then the video picture commencing at this edit-in point may be previewed.

After previewing the respective video pictures established by the aforementioned edit-in points, the operator may select the desired edit-in point by transferring such point to IN register 50.

A similar operation may be carried out to select a desired edit-out point from a plurality of selected edit-out points which may be stored temporarily in display registers 118, 126, and 142. In addition, although the foregoing has described the manner in which a particular one of plural possible edit points may be selected for the playback tape, it should be appreciated that a similar operation can be carried out in order to select appropriate edit points for the recording tape.

It is recognized that, when position data is transferred from one display register to another, the data is not erased from the source register. Thus, the operator can reconstruct or arrange various edit operations as he desires, merely by selecting appropriate edit points from such stored data.

Furthermore, by energizing the appropriate playback (P) or record (R) indicators associated with the EVENT and scratchpad registers, the operator is kept apprised of the source of such data. That is, the position data in these registers may be transferred from or to the IN and OUT registers in either the playback or record section of console 10. To avoid confusion in transferring such position data, the record and playback indicators remind the operator of the source of such displayed data. Once the appropriate edit-in and edit-out points have been finalized, as discussed above, the overall edit operation may be previewed by operating PREVIEW switch 174. This edit operation then may be carried out by operating RECORD switch 170.

Agenda-Edit Mode

This mode will best be understood by the following description of some examples of an agenda-edit operation.

Let it be assumed that, after carefully reviewing the playback tape, the operator wishes to establish an edit-in point for the video signals, the audio signals on the first audio track (A-1) and the audio signals on the second audio track (A-2) at time code addresses A, B and C, respectively. This is referred to as a split-in edit and, when initiated, results in the re-recording of the video signals on the playback tape from point A to the edit-out point, the re-recording of the A-1 audio signals from point B to the edit-out point and the re-recording of the A-2 audio signals from point C to the edit-out point.

To establish such split-in edit points, the operator must transfer time code address A into IN register 80, time code address B into EVENT-1 register 118 and time code address C into EVENT-2 register 126. The manner in which these time code addresses are transferred into these respective registers has been described above. Once the appropriate time code addresses have been stored in these display registers, selector switches 112, 114 and 116 are operated in the following manner.

First, video (V) switch 112 is actuated. The indicator associated with this actuated video switch then flashes, indicating that switch 112 has been operated and that it now is necessary to associate this switch with the time code address displayed in a suitable one of registers 80, 118 and 126. Since time code address A is in IN register 80, and since this is the location at which the video signals are to be transferred, edit-in switch 82 now is operated. Upon operation of this edit-in switch, the indicator associated with video (V) switch 112 is energized to its steady state. It is recalled that respective indicator lamps are provided at the upper and lower halves of switch 112. Both indicator lamps therein are energized so as to apprise the operator that the video signals will be transferred from the playback tape to the recording tape when the recording tape reaches the edit-in point A, now stored in display register 80.

If A-1 switch 114 now is operated, the indicator lamps associated therewith flash to apprise the operator that this switch has been actuated. It is recalled that the audio signals on the first audio track of the playback tape are to be transferred onto the recording tape when the playback tape reaches edit-in point B. This edit-in point is stored in EVENT-1 register 118, and EVENT-1 switch 120 now should be operated. When the EVENT-1 switch is operated, the indicator associated with the upper half of A-1 switch 114 is energized, thus indicating that the audio signals on the first track of the playback tape will be transferred at the edit-in point that is displayed in EVENT-1 register 118.

Finally, A-2 switch 116 is operated, resulting in the flashing of its associated indicators. When EVENT-2 switch 128 is actuated, the indicator associated with the lower half of this A-2 switch is energized. Hence, when the recording tape reaches edit point C, now stored in EVENT-2 register 126, the audio signals which are recorded in the second audio track are transferred, or re-recorded onto the recording tape. Once these split edit-in points A, B and C have been selected and associated with switches 112, 114 and 116, this split-in edit mode may be previewed by operating PREVIEW switch 96 in the recording section of console 10. Operation of this PREVIEW switch actuates the recording VTR to pre-roll the playback tape an amount determined by PREROLL TIME switch 38. Then, the recording tape is advanced, and the respective edit-in points are displayed on the display monitor.

Although the foregoing has explained the establishment of a split-in agenda-edit mode in which the video and respective audio signals are transferred when the recording tape reaches its split edit-in points, the split edit-in mode can be carried out by selecting split edit-in points for the playback tape, whereupon the respective video and audio signals will be re-recorded when this playback tape reaches its split-in points. Thus, and analogous to the aforedescribed example, time code address A' on the playback tape may be transferred from, for example, tape timer register 58 into IN register 50, time code address B' may be transferred from this tape timer register into EVENT-1 register 118 and time code address C' may be transferred from this tape timer register into EVENT-2 register 126. The manner in which such time code addresses are transferred into these respective display registers has been described above.

Assuming that the video signals, followed by the audio signals on the first audio track, followed by the audio signals on the second audio track are to be transferred, in this order, so as to be recorded on the recording tape when this tape reaches edit-in points A', B' and C', respectively, the operator first operates video switch 112, resulting in the flashing of the indicators associated with this switch, and then operates edit-in switch 52. This results in steady-state energization of the indicators associated with the upper and lower halves of the video switch. The operator then actuates the A-1 switch 114, resulting in the flashing of the indicators associated with this switch. If EVENT-1 switch 120 next is actuated, the indicator associated with the upper half of the A-1 switch is energized in its steady-state. Finally, the A-22 switch 116 is operated, resulting in the flashing of its associated indicators, followed by the operation of EVENT-2 switch 128. This effects the steady-state energization of the indicator associated with the lower half of the A-2 switch.

As a result of the foregoing operation, video signals will be transferred from the playback tape to the recording tape when the former reaches its time code address A'; audio signals will be transferred from the first audio track when the playback tape reaches its time code address B'; and audio signals will be transferred from the second audio track when the playback tape reaches its time code address C'.

If it is assumed that the desired edit-in point for the playback tape is displayed in IN register 50, and if it is assumed that a suitable edit-out point is displayed in at least OUT register 84, then a split-in agenda-edit operation can be previewed. Upon operation of PREVIEW switch 174 of the control section of console 10, both the playback and recording tapes are pre-rolled as discussed above. Then, the tapes are advanced until the selected edit-in point is reached, corresponding to edit-in point A' for the playback tape. At that time, the video signals which are reproduced from the playback tape are displayed. It is recognized that the audio signals on the playback tape are not yet reproduced until that tape reaches its edit-in points B' and C'. When time code address B'' is reached, the audio signals are reproduced from the first audio track of the playback tape, and when the playback tape reaches time code address C', the audio signals are reproduced from the second audio track thereon. Hence, the split-in edit operation is previewed.

The video and audio signals now reproduced from the playback tape are displayed until the recording tape reaches the edit-out point displayed in OUT register 84. At that time, the previewed agenda-edit operation is terminated.

If the operator is satisfied with this split-in agenda-edit mode, RECORD switch 170 may be operated so as to effect an actual edit operation in accordance with the aforedescribed split-in operation. Thus, a video scene will be inserted on the recording tape, commencing from edit-in point A', followed by inserted audio signals on the first and second audio tracks at edit-in points B' and C', respectively. This means that the audio signals which had been recorded on the recording tape prior to edit-in points B' and C' will remain thereon. During a broadcast of these edited signals, the inserted scene will be accompanied by audio information which had been associated with the excised scene, that is, the scene which has been replaced.

The foregoing has described a split-in agenda-edit mode of operation wherein the initiation of the re-recording of video and audio signals is staggered, or "split". A similar split-out operation can be established, if desired. Moreover, the agenda-edit operation may be constituted by a split-in and also by a split-out edit mode. To establish a split-out edit operation, SPLIT-OUT switch 136 is operated, and then the setting of time code addresses in the respective OUT and EVENT registers is carried out. For example, let it be assumed that, when the recording tape reaches time code address A'', the transfer of video signals from the playback tape should terminate. Similarly, let it be further assumed that when the recording tape reaches time code addresses B'' and C'', the transfer of audio signals from the first and second tracks, respectively, of the playback tape should terminate.

Time code address A'' is transferred into OUT register 84 and time code addresses B'' and C'' are transferred into EVENT registers 118 and 126, respectively. It is appreciated that such time code addresses A'', B'' and C'' are transferred from tape timer register 88, this register being designated by mark enable switch 90 as a source register. Once these time code addresses have been stored in the aforementioned display registers, the operator first actuates video switch 112, thus causing the indicators associated therewith to flash, and then operates edit-out switch 86, resulting in the steady-state energization of the indicators associated with both halves of the video switch. This establishes time code address A'' as the edit-out point for the video signals.

In similar manner, A-1 switch 114 is actuated, thus causing the indicators associated therewith to flash, and then EVENT-1 register 120 is operated, resulting in the steady-state energization of the indicator associated with the upper half of the A-1 switch. The edit-out point B'' now is established as the edit-out point for the audio signals which are recorded on the first track.

Finally, A-2 switch 116 is actuated, thereby causing the indicators associated therewith to flash, and then EVENT-2 switch 128 is operated, resulting in the steady-state energization of the indicator associated with the lower half of this A-2 switch. Hence, time code address C'' is established as the edit-out point for the audio signals on the second audio track.

During an actual edit operation, video and audio signals will be transferred from the playback tape to the recording tape, commencing with the edit-in points. It is recalled that, if desired, such edit-in points may be "split" in the manner discussed above. When the recording tape reaches edit-out point B'', audio signals in the first audio track no longer are re-recorded thereon. When the recording tape next reaches edit-out point C'', audio signals no longer are re-recorded in the second audio track. Finally, when the recording tape reaches edit-out point A'', the split-out edit operation is completed.

Although EVENT registers 118 and 126 are capable of displaying either edit-in or edit-out points, both a split-in and a split-out operation may occur, as described above. If SPLIT-OUT switch 136 is operated, then the position data displayed in the EVENT registers represents the edit-out points. If the SPLIT-OUT switch 136 is not operated, then the position data displayed in EVENT registers 118 and 126 represent the edit-in points. An indicator associated with SPLIT-OUT switch 136 provides a suitable indication to apprise the operator of the display of edit-in or edit-out points. In either mode, it is appreciated that the record (R) and playback (P) indicators 122, 130 and 124, 132 represent the source of the position data displayed in these EVENT registers.

In the foregoing discussion, it has been assumed that switches 112, 114 and 116 are actuated by the operator in the order of the V switch, followed by the A-1 switch, followed by the A-2 switch. It should be appreciated that these switches may be actuated in any order desired. In a split-in agenda-edit mode, the signal selector switch which is selected to be associated with the time code address displayed in the IN register is identified by the energization of the indicators associated with the upper and lower halves of this switch. The signal selector switch which is selected to be associated with the time code address displayed in EVENT-1 register 118 is identified by the energization of the indicator which is associated with the upper half of this switch. Finally, the signal selector switch which is selected to be associated with the time code address in EVENT-2 register 126 is identified by the energization of the indicator associated with the lower half of this switch. It will be recognized that the first edit-in point is displayed in the IN register, and the next-following edit-in points are displayed in the EVENT-1 and EVENT-2 registers. The particular video and audio signals that are to be transferred at these respective edit-in points are determined by the corresponding V, A-1 and A-2 switches that are associated therewith.

A similar explanation is applicable to a split-out agenda-edit mode which is established by operating SPLIT-OUT switch 136. In the interest of brevity, and since additional explanation of such a split-out agenda-edit mode is duplicative further description is not provided.

The foregoing has described a so-called three-way agenda-edit operation. If desired, a two-way agenda-edit mode may be established merely by actuating two of switches 112, 114 and 116 concurrently. For example, in a split-in mode, video switch 112 may be actuated first so as to be associated with the first edit-in point. Then, A-1 switch 114 and A-2 switch 116 may be actuated such that the indicators associated with both switches flash concurrently. Then, depending upon which of the EVENT switches is operated, switches A-1 and A-2 both will be associated with the corresponding time code address. Hence, the indicators associated with the upper half of both of switches 114 and 116 will be energized if EVENT-1 switch 120, for example, is operated. This means that the audio signals on both the first and second audio tracks will be transferred when the second-selected edit-in point, displayed in the EVENT-1 register, is reached.

If it is desired that either the video or audio signals should not be re-recorded, the switches which are associated with signals that should be recorded first are operated to establish the appropriate split edit-in points. Then, the remaining switch should be actuated, thus causing the indicators associated therewith to flash, and then actuated again to extinguish such indications and avoid the assignment of a time code address to that switch. During an edit operation for this condition, only the signals associated with the assigned switches will be transferred from the playback tape to the recording tape at the selected edit-in points. The signals associated with the unselected (or unassigned) switches will not be transferred.

Thus, it may be seen that various combinations of split edit-in and split edit-out points may be established merely by operating the video and audio switches 112, 114 and 116 and the edit-in and EVENT switches to establish the order desired by the operator, thereby establishing one or more time code addresses at which the video and audio signals are transferred from the playback tape to the recording tape. A common time code address may be selected for these switches which are operated concurrently. As is seen, the edit-in and edit-out points may be selected on either the playback or the recording tape, depending upon which tape is chosen to derive the respective time code addresses.

General Description of the System Electronics

Turning now to FIG. 2, there is illustrated a block diagram of the overall video editing system comprised of console 202, separate VTR's 204 and 206, a central processing unit (CPU) 208 and display monitors 210 and 212 coupled to VTR's 204 and 206, respectively. Console 202 may include the selector switches, display registers, controls and keyboard, all discussed hereinabove with respect to console 10 of FIG. 1. In addition, and as will be described below, console 202 also includes particular electronics for energizing the respective display registers and indicator lamps. In a preferred embodiment, each display register is comprised of seven-segment numerical display elements which may be constituted by light emitting devices (LED's), liquid crystal displays (LCD's), or the like. The manner in which such numerical displays are energized will be described in greater detail below.

Console 202 also is provided with energizing circuitry for energizing the particular indicators, such as the respective indicator lamps associated with the selected switches, as well as the record (R) and playback (P) LED indicators associated with the EVENT and scratchpad registers.

Console 202 is coupled to VTR's 204 and 206, respectively, and is adapted to receive position data from these VTR's. Interface and control circuitry may be provided between each of these VTR's and console 202 for the purpose of assuring that proper time code addresses and frame, or control track signals, are supplied to the console, and particularly to tape timer registers 58 and 88. A detailed description of such interface and control circuitry is described in copending applications Ser. Nos. 139,748 and 139,702 both filed Apr. 11, 1980. The disclosure of such copending applications is incorporated herein by reference.

Console 202 and VTR's 204 and 206 are coupled to CPU 208. Although not shown herein, it should be appreciated that interface, or communicating circuitry, is provided between the console and the CPU and also between the VTR's and the CPU. Position data in the form of time code addresses and frame, or control track signals, are supplied from each of the VTR's to the CPU. Thus, the CPU is provided with the same position data as console 202.

A bi-directional data bus couples console 202 and CPU 208 to each other. This data bus serves to supply data derived from the console to the CPU, and also serves to supply to the console data which is transmitted from the CPU. For example, whenever a selector switch or control element in console 202 is operated, a coded representation thereof is supplied to CPU 208. Similarly, whenever the enrgization of an indicator display register of the console is to be updated, such as during a display register data transfer operation, data is transmitted from CPU 208 to console 202. Still further, the operation of the circuitry included in console 202 and CPU 208 may be synchronized by a system clock, and appropriate timing information is transferred between the console and CPU.

CPU 208 is comprised of a microprocessor, such as a Model 8080 microprocessor, manufactured by Intel Corporation of California, together with associated memory and appurtinent devices which commonly constitute central processing units. CPU 208 serves, in addition to updating the data displayed on console 202, to control the operation of VTR's 204 and 206 to effectuate the edit operation that has been selected in the manner described hereinabove with respect to console 10 of FIG. 1. For this purpose, CPU 208 supplies control signals to these VTR's. It is appreciated that, although not shown in FIG. 2, suitable interface circuitry is provided between the CPU and each of VTR's 204 and 206. To this effect, the CPU may supply speed and direction control signals to the VTR's, start and stop control signals and record/playback control signals. The latter control the transfer of information from the playback VTR, such as VTR 204, to the recording VTR, such as VTR 206.

To carry out an edit operation, console 202 is operated in the manner discussed hereinabove with respect to FIG. 1 to supply CPU 208 with data representative of the particular operations which have been selected by the operator. CPU 208 responds to this data to control VTR's 204 and 206 so as to, for example, advance the playback and recording tapes to enable the operator to select particular video pictures, or scenes, which should be edited. Such scenes are, of course, displayed on display monitors 210 and 212 as the playback and recording tapes are advanced.

As the respective tapes are transported, position data associated therewith, that is, position data derived from the reproduced time code addresses and control track signals, are supplied to console 202 and to CPU 208. This position data serves to update tape timer registers 58 and 88 (FIG. 1) in a manner described in greater detail below. This data update is carried out automatically and without specific action on the part of the operator. When the commencement of a particular scene recorded on the playback tape, and suitable for re-recording onto the recording tape, is reached, mark enable switch 60 is operated; and console 202 supplies a coded representation of that switch to CPU 208. The CPU recognizes this code representation as a source switch. Then, when edit-in switch 52 is operated, console 202 transmits a coded representation thereof to CPU 208. This coded representation is recognized as a destination switch, and the CPU now transmits to console 202 the position data which has been displayed in tape timer 58 at the time that the edit-in switch was operated, which position data now is displayed in IN register 50. More particularly, the numeric display elements which constitute the display registers are suitably energized with this position data. CPU 208 also stores this position data in a particular location for use in controlling the edit operation of the playback and recording tapes.

The foregoing communication of data between console 202 and CPU 208 is carried out whenever a selector switch on the console is operated, whenever the data displayed by a display register on the console is to be updated, such as in response to a register-transfer operation, and whenever arithmetic operations (such as of the type discussed above with respect to FIG. 1) are to be carried out.

Thus, the selected parameters for carrying out an edit operation are generated from console 202 and supplied to CPU 208. Indications of such parameters are returned to the console by the CPU so as to apprise the operator thereof. CPU 208 thus is supplied with sufficient data to control the selected edit operation.

If a PREVIEW switch, such as PREVIEW switch 66, is operated, a coded representation of this switch is transmitted to CPU 208 from console 202. In response to the actuation of this switch, CPU 208 supplies control signals to VTR 204, resulting in a preview operation, discussed above. The video picture displayed on display monitor 202 is blanked until the scene selected for re-recording, that is, the scene defined by the edit-in and edit-out points stored in CPU 208, is reached. Arrival of the playback tape at the selected scene is detected by CPU 208, for example, by comparing the position data supplied thereto from the VTR with the position data representing the selected edit-in point, and the CPU now controls the reproducing electronics of this VTR such that the selected scene is displayed on display monitor 210. The CPU detects when the playback tape is advanced to the selected edit-out point, whereupon monitor 210 is blanked. Thus, display monitor 210 displays a black-video-black picture corresponding to the scene which has been selected for re-recording.

CPU 208 controls the operation of VT 1206 in a similar manner in the event that, for example, PREVIEW switch 96 is operated.

If RECORD switch 170 in the control section of the console is operated so as to initiate an actual edit operation, a coded representation of this switch is transmitted to CPU 208 from console 202. In one embodiment, both the RECORD and PREVIEW switches are operated simultaneously. The CPU then controls both VTR's 204 and 206 to carry out the edit operation, described above. Thus, the playback and recording tapes both are pre-rolled by the preselected pre-roll amount, and then both tapes are advanced. During the advance of these tapes, the servo apparatus included in the VTR's is controlled by CPU 208 to effect a lock-up condition of the playback and recording tapes, whereby such tapes now are transported in synchronism with each other. The position data supplied to CPU 208 from VTR's 204 and 206 is compared to the respective edit-in points stored in the CPU. When these tapes arrive at their respective edit-in points, the CPU actuates the recording electronics in VTR 206 such that the information that is reproduced by VTR 204 from the playback tape now is recorded on the recording tape. It is appreciated that the re-recording of information may be carried out in a simple edit mode or in a split-in edit-agenda mode, discussed above. The re-recording of information on the recording tape continues until the CPU detects that the selected edit-out point has been reached. At that time, the recording electronics in VTR 206 are disabled, thus completing the edit operation. It is appreciated that the edit-out point may be a simple point or may be split-out points, discussed above.

The foregoing has been a general description of the manner in which the apparatus illustrated in FIG. 2 carries out an insert-edit operation. If ASSEMBLE MODE switch 110 (FIG. 1) had been operated, the illustrated apparatus effects an assemble-edit operation wherein the scene selected from the playback tape is recorded in following relation to the last scene that had been recorded on the recording tape, and a new control track (e. g. SMPTE time code) also is recorded. Thus, the information from the playback tape is transferred to the recording tape when the latter reaches its selected edit-in point. Typically, in an assemble edit operation, the transferred scene merely is added, or "assembled" to those video signals already present on the recording tape. This differs from the "insertion" of a video scene into a selected block on the recording tape in accordance with the insert edit mode. It may be appreciate that in an insert edit operation, the edit-out point which has been selected for the recording tape is the controlling factor in terminating the edit operation unless, of course, an edit-out point has not been selected for the recording tape, whereupon the edit-out point which has been selected for the playback tape terminates the edit operation. However, in an assemble edit operation, it is the edit-out point that has been selected for the playback tape which is the controlling factor in terminating the edit operation.

Particular electronic circuits which are provided in console 202 and in the interface, or communicating electronics, between this console and CPU 208 now will be described with reference to the remaining drawings.

Data Transmitting Electronics

Turning now to FIG. 3, there is illustrated a block diagram of the electronics utilized to transmit data from console 202 to CPU 208. It is appreciated that this data represents the particular switches that may be operated to carry out a data transfer operation, an arithmetic adjustment operation, or an operation for controlling tape movement, such as a playback, preview, cue, record, or other similar operation. The data transmitting electronics is comprised, generally, of a keyboard matrix encoder 304, a code converter 306, a parallel-to-serial converter 308, a serial-to-parallel converter 312 and a bi-directional buffer 328. Keyboard matrix encoder 304 may be of a conventional type, such as Model AY-5-3600 PRO and is provided with a plurality of inputs, each adapted to receive a voltage. The keyboard matrix encoder serves to produce an encoded signal, such as a parallel-bit digital signal, encoded in a manner corresponding to the particular input upon which an input voltage has been received. The inputs of keyboard matrix encoder 304 are connected to respective ones of switches 302. These switches correspond to the selector switches provided on console 10 of FIG. 1. Thus, depending upon which of these switches is operated, voltages are applied to the keyboard matrix encoder at the particular inputs which are connected to this operated switch. If the selector switches are, for example, push-button switches, then pulse signals are supplied to respective inputs of the keyboard matrix encoder in response to the operation of that push-button switch.

Typically, the encoded output produced by keyboard matrix encoder 304 differs from the particular code to which CPU 208 is responsive. Code converter 306 is coupled to the keyboard matrix encoder and is adapted to produce a compatible encoded representation of the particular switch 302 which has been operated. That is, code converter 306, which may comprise a programmable read-only memory (PROM), is adapted to convert the plural-bit digital signal received from keyboard matrix encoder 304 into a suitable coded signal.

Code converter 306 is provided with a plurality of outputs, for example, eight outputs to supply an 8-bit signal, coupled to an equal number of inputs of parallel-to-serial converter 308. This parallel-to-serial converter is included within a so-called universal synchronous-/asynchronous receive/transmit (USART) device, such as Model AY 5-1013A. This device serves to convert the parallel-bit coded signal received from code converter 306 into a serial-bit signal. For this purpose, parallel-to-serial converter 308 includes a clock signal input connected to a clock signal generator 310, referred to herein merely as a clock. Clock 310 is adapted to generate successive timing signals which are used to serially transmit the coded signal received by the parallel-to-serial converter. Clock 310 may include an oscillator and various timing circuits in order to produce a clock signal of desired frequency.

The serial-bit coded signal produced at the output of parallel-to-serial converter 308 is supplied to serial-to-parall converter 312. Converter 312 may be similar to converter 308, and may be included in a section of another universal synchronous/asynchronous receive/-transmit device. Clock 310 is coupled to a clock signal input of converter 312 so as to synchronously receive the serial bits supplied thereto and convert such serial bits to a parallel-bit coded signal. Converter 312 is provided with a plurality of outputs coupled to an internal data bus 314, this internal data bus serving to connect serial-to-parallel converter 312 to bi-directional buffer 328. Converter 312 also includes an output 316 which is adapted to be provided with a signal, for example, a binary "1", when the converter has received eight successive bits from parallel-to-serial converter 308. For the purpose of the present discussion, it will be assumed that a digital signal formed of eight bits is a word or a byte. Thus, when serial-to-parallel converter 312 receives a completer word, ouput 316 thereof is provided with a binary "1".

Serial-to-parallel converter 312 also is provided with a gate input connected to receive a gating signal derived from CPU 208. This gating signal is designated the I/OR45 signal. IN response to this gating signal, supplied to serial-to-parallel converter 312 via an input lead 326, the parallel-bit word of this converter is supplied to internal data bus 314.

Output 316 of serial-to-parallel converter 312 is coupled to the set input S of a flip-flop circuit 318. The reset input R of this flip-flop circuit is coupled to lead 326 to receive the I/OR45 gating signal. When flip-flop circuit 318 is set in response to the binary "1" supplied to its set input S, a signal indicative of the set state thereof is supplied to an interrupt handler circuit 320. This circuit is of conventional construction, one embodiment of which is an interrupt handler Model 8259. As is known, a CPU communicates with an external, or peripheral device, in response to "interrupt requests". That is, when data is to be transmitted to the CPU from such a device, an interrupt request first is supplied to the CPU. Once the CPU acknowledges this interrupt request, it embarks upon an appropriate programmed routine so as to receive the data for which the interrupt request has been made. Interrupt handler 320 is adapted to receive a plurality of interrupt requests, one of which is the signal supplied thereto when flip-flop circuit 318 is triggered to its set state. The interrupt handler functions to select appropriate requests in accordance with a predetermined order of priority, and to transmit coded representations of each such request to the CPU. Thus, when flip-flop circuit 318 supplies interrupt handler 320 with an interrupt request signal, a coded representation of that interrupt request signal is transmitted to the CPU. Interrupt handler 320 additionally includes an acknowledge input terminal coupled to lead 324 for receiving an acknowledgement from the CPU that the latter has received and is processing the interrupt request transmitted thereto by the interrupt handler. This interrupt request acknowledge signal is designated as INTA. When the CPU enters its programmed interrupt routine and is in condition to respond to the particular interrupt signal that has been transmitted in response to the setting of flip-flop circuit 318, the I/OR45 is derived from the CPU and supplied to lead 326 so as to reset this flip-flop circuit and also to enable, or gate, the word from serial-to-parallel converter 312 onto internal data bus 314.

Bi-directional buffer 328 is conventional, one embodiment of which is a Model LS243 buffer. This buffer is adapted to communicate with CPU 208 via a system data bus 332. That is, words, or bytes, may be transmitted from the bi-directional buffer to the CPU, and words may be received by this buffer from the CPU. It may be appreciated, therefore, that internal data bus 314 may be used either as an input data bus or an output data bus, depending upon the direction in which data is transmitted. Similarly, system data bus 332 may comprise an output or an input data bus, depending upon whether data is being transmitted to or received from CPU 208. In the arrangement illustrated in FIG. 3 wherein data is transmitted to CPU 208, internal data bus 314 may be considered to be connected to the inputs of bi-directional buffer 328, and system data bus 332 may be considered to be connected to the outputs of this buffer. In addition, bidirectional buffer 328 is provided with a gate input connected to lead 330 to receive a gating signal derived from the CPU so as to enable the word supplied thereto via internal data bus 314 to be transmitted therefrom to system data bus 332. This gating signal is derived from the aforementioned signal I/OR45 and, for convenience, FIG. 3 illustrates that this gating signal I/OR45 is supplied to lead 330.

In operation, when one of switches 302, such as one of the selector switches of console 10 (FIG. 1) is operated, a signal voltage representative thereof is supplied to keyboard matrix encoder 304 at inputs to which the operated switch is connected. The keyboard matrix encoder generates an encoded representation of this operated switch and supplies that representation to code converter 306 whereat it is converted to a particular code that is compatible with CPU 208. It may be appreciated that, if keyboard matrix encoder 304 functions to produce such a compatible code, code converter 306 may be omitted.

Code converter 306 supplies a parallel-bit word, corresponding to the particular switch 302 which has been operated, to parallel-to-serial converter 308. Clock signals also are supplied to this converter from clock 310, resulting in a serialized word supplied from this parallel-to-serial converter to serial-to-parallel converter 312. Clock signals also are supplied to this latter converter so as to synchronize the reception of the serialized word.

When a complete word has been received by serial-to-parallel converter 312, a binary "1" is provided at output 316 to set flip-flop circuit 318 to its set state. This, in turn, supplies an interrupt request signal to interrupt handler 320. The interrupt handler apprises the CPU that an interrupt request is to be mde. The CPU then enters its interrupt program routine and returns the $\overline{INTA}$ signal to interrupt handler 320 via lead 324. If it is assumed that no other interrupt request signals are supplied to the interrupt handler, or alternatively, the interrupt request signal derived from serial-to-parallel converter 312 exhibits the highest priority, interrupt handler 320 transmits a coded representation of this interrupt request to the CPU.

In its interrupt program routine, the CPU responds to this particular interrupt request by returning the I/OR45 signal via lead 326, thereby resetting flip-flop circuit 318 and enabling serial-to-parallel converter 312 to gate the word representing the operated switch 302 onto internal data bus 314. This I/OR45 signal also enables bi-directional buffer 328 to transmit this word from the internal data bus through the buffer onto system data bus 332, thus transmitting this word to CPU 208. Consequently, the identity of the particular switch on console 10 (FIG. 1) which has been operated is transmitted to the CPU.

As will be described below, the CPU responds to this received coded representation of an operated switch by transmitting data to the console, resulting in the energization of an indicator associated with a selector switch, or the display of tape position data.

Data Receiving Circuitry

Figure 4B:
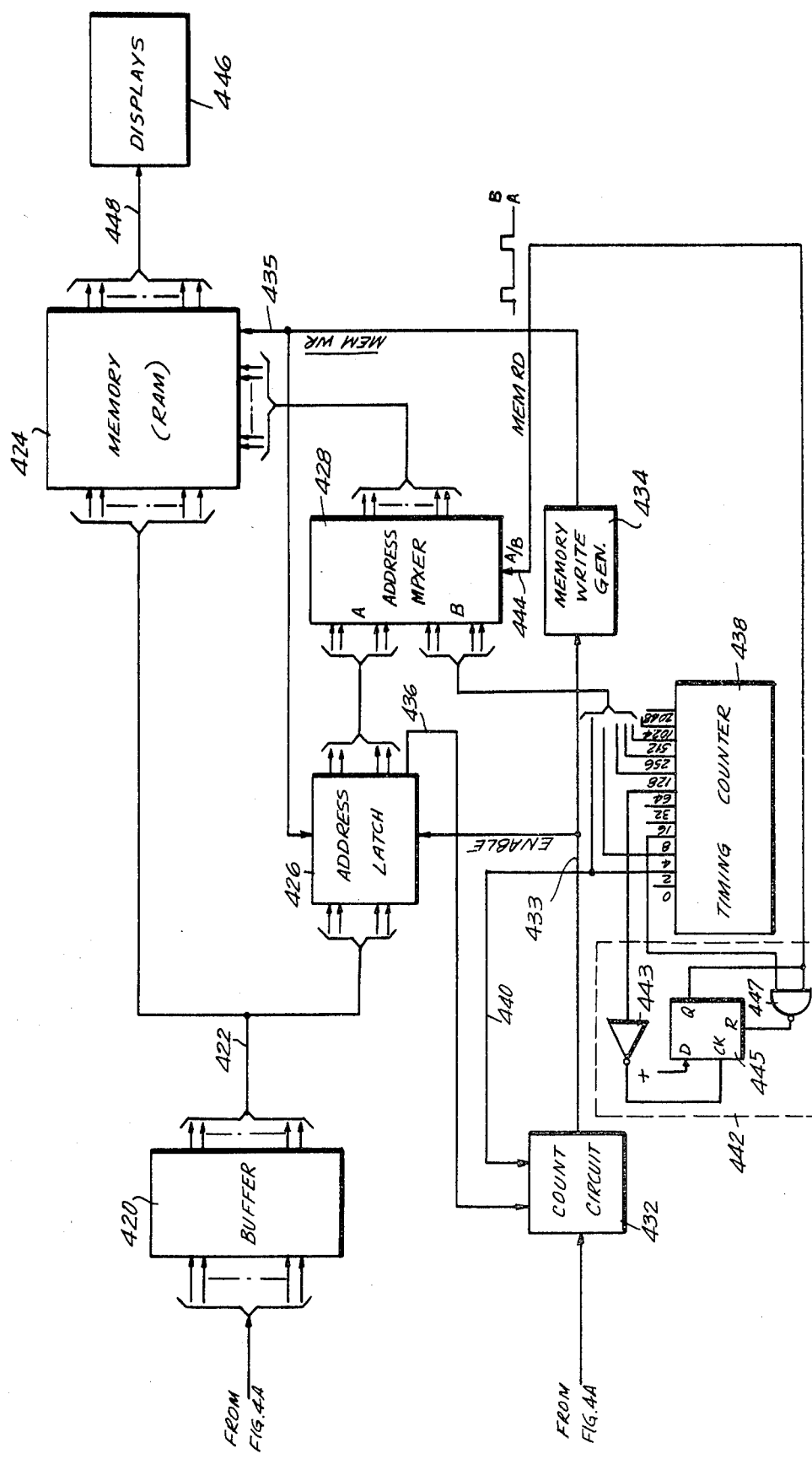

As mentioned above, CPU 208 responds to the coded representation of the operated switch 302 by returning data to the console electronics. If the switch which has been operated is identified as a source switch, the CPU transmits an indicator control signal, in the form of an indicator data word, so as to actuate the indicator associated with the source switch, thereby informing the operator of the particular switch which has been actuated as the source switch. Alternatively, if the operated switch is identified as a destination switch, the CPU returns an indicator data word to extinguish the energized indicator, and also a plurality of position data words which are used to energize the numerical display elements which constitute the respective display registers. FIGS. 4A and 4B illustrate the apparatus which is used to receive these words from CPU 208 and to use such words to control the respective indicators and numerical display elements. This data-receiving apparatus is comprised of a buffer 416, converters 312 and 308, described previously with respect to FIG. 3, a buffer 420, an address latch circuit 426, a timing counter 438, an address multiplexer 428 and a memory device, preferably a random access memory (RAM) 424. The purpose of this apparatus is to receive the data words from the CPU and to store such data words in appropriate addresses in RAM 424. As will be explained below with respect to FIG. 5, respective addresses in RAM 424 correspond to particular indicators and numerical display elements. It is important, therefore, for the proper energization of such indicators and numerical display elements that the appropriate data word be stored in the correct address in the RAM. Accordingly, the CPU precedes each data word with an address word. More particularly, in the embodiment described herein, the CPU transmits an address word followed by an indicator data word and, when position data is transmitted, the CPU transmits an address word followed by a predetermined number of position data words. In most instances, when indicator control signals are transmitted, a single indicator word is transmitted, and this is preceded by a corresponding address word. Similarly, in most instances, a predetermined number (e. g. four) of position data words are transmitted, preceded by a single address word. A general exception to this convention is the transmission of data from the CPU to the console, which data is necessary to update all of the displays and indicators, as may be required when an error condition is detected.

As will be described, position data also is transmitted to RAM 424 from the VTR's. That is, as the playback and recording tapes are transported, the time code addresses and control track signals read therefrom are supplied via apparatus described in copending application Ser. Nos. 139,748 and 139,702 filed Apr. 11, 1980 to appropriate addresses in the RAM, thereby updating timer registers 58 and 88 of console 10 (FIG. 1). The circuitry illustrated in FIGS. 4A and 4B is intended to perform this function.

Data is not transmitted from the CPU to the apparatus illustrated in FIGS. 4A and 4B until the CPU is supplied with a signal representing that this apparatus is in condition to receive such data. As will become apparent, buffer 416, which is a so-called first-in-first-out (FIFO) buffer, is adapted to receive address data words and position data words which are derived either from the CPU or from the VTR's. Since data derived from the VTR's still might be present in buffer 416 at the time that the CPU is conditioned to transmit data thereto, flip-flop circuit 402 and AND gate 404 are provided to produce an enabling signal which apprises the CPU when this buffer is in condition to receive data therefrom. The set input S of flip-flop circuit 402 is connected to receive a signal derived from the CPU representing that data is about to be transmitted therefrom. The reset input R of this flip-flop circuit is adapted to receive a signal representing that the CPU has completed its transmission of data. AND gate 404 includes one input connected to the Q output of this flip-flop circuit and another input connected to a lead 418 for receiving a signal from buffer 416 representing that the contents of this buffer are "empty" and that the buffer is in condition to receive data which may be transmitted by the CPU. The output of AND gate 404 is adapted to produce the enabling signal, whereby the CPU then proceeds with the transmission of data.

Multiplexer 406 is provided with two sets of inputs: the A inputs and the B inputs. The A inputs of this multiplexer are coupled to a pre-set address generator 408 which is adapted, when actuated, to supply a first or a second predetermined address to multiplexer inputs A. This address identifies a respective location in RAM 424. The manner in which pre-set address generator 408 is actuated is described in greater detail below with respect to FIG. 10.

The B inputs of multiplexer 406 are coupled to internal data bus 314 which, as described above, is connected to bidirectional buffer 328 whose inputs are coupled to system data bus 332 to receive words from CPU 208. When this bi-directional buffer is intended to transmit data to the CPU, the gate signal supplied to its gate input via lead 330 conditions this buffer to transmit data from internal data bus 314 to system data bus 332. However, the gate signal supplied to the gate input of bi-directional buffer 328 also conditions this buffer to receive data from the CPU such that data supplied to system data bus 332 is transferred to internal data bus 314. The gate signal supplied to lead 330 thus functions as a transmit/receive control signal derived from CPU 208. That is, when data is to be transmitted to the CPU, this control signal functions to condition the bi-directional buffer to transmit data to the system data bus. However, when the CPU is to transmit data to the console, the control signal supplied to lead 330 conditions the bidirectional buffer to receive data from the system data bus.

Multiplexer 406 additionally includes a control input coupled to a lead 410 to receive a multiplex control signal. This multiplex control signal is generated by circuitry described below with respect to FIG. 10. The multiplexer may be a conventional multiplexing circuit, such as Model LS257, whereby the data supplied to its inputs A or inputs B selectively is transmitted therethrough to its outputs.

The outputs of multiplexer 406 are coupled to respective inputs of buffer 416. It may be appreciated that the multiplexer and buffer are connected by a plurality of leads such that a parallel 8-bit word may be transferred from the multiplexer to the buffer. Buffer 416 preferably is of the aforementioned FIFO type, one embodiment of which is Model AM2841. Buffer 416 additionally includes an enable input coupled by a lead 412 to receive an enable signal derived from the CPU. The buffer further includes a clock input coupled via lead 414 to receive a clock signal from a suitable timing circuit (not shown). The enable signal supplied to buffer 416 is referred to as the I/OW45 signal and is derived from the CPU when the CPU transmits data to the console. This signal thus is generated during the normal data transmission program routine of the CPU. The outputs of buffer 416 are coupled to respective inputs of parallel-to-serial converter 312, described above with respect to FIG. 3. This converter 312 serves to serialize the parallel 8-bit word supplied thereto from buffer 416 and to transmit this serialized word to serial-to-parallel converter 308. It is appreciated, therefore, that converters 308 and 312 function to transmit data bi-directionally so as to supply data to the CPU from the console electronics and to supply data received from the CPU to the console electronics.

As is conventional, serial-to-parallel converter 308 includes a "ready" output adapted to produce a "ready" signal, such as a binary "1", when a complete word has been received from parallel-to-serial converter 312. This "ready" signal is applied via a lead 430 to a counting circuit 432.

The outputs of serial-to-parallel converter 308 are coupled to respective inputs of buffer 420 such that the converter supplies a parallel 8-bit word to the buffer. Buffer 420 is of conventional construction, typical examples of which are Model 4076 and Model 74C173. The outputs of this buffer are coupled in common to data inputs of RAM 424 and also to respective inputs of address latch circuit 426. One embodiment of the address latch circuit is a Model LS197 latching circuit. The address latch circuit is adapted to receive and store a word supplied thereto via bus 422 from buffer 420. The manner in which address latch circuit 426 is operated to store only address words will be described in greater detail below with respect to FIG. 7.

The outputs from address latch circuit 426 corresponding to the bits of an address word are coupled to the A inputs of address multiplexer 428. The address latch circuit additionally includes a further output which is provided with a control bit when the address word stored in address latch circuit 426 precedes a predetermined number of position data words. This control bit is supplied via a lead 436 to counting circuit 432.

Address multiplexer 428 is a conventional multiplexing circuit, one embodiment of which is a Model LS157 multiplexer. This address multiplexer includes a set of B inputs which are connected to receive address signals generated from an address generator constituted by timing counter 438. Address multiplexer 428 also includes a selector input 444 coupled to a control circuit 442 to receive an input control signal. This input control signal, referred to as the MEMRD signal is a pulse signal adapted to select inputs A when, for example, this signal is at its relatively lower level, and to select inputs B when at its relatively higher level. As will be explained below with respect to the timing diagrams shown in FIGS. 6A-6E, address multiplexer 428 normally is conditioned such that its A inputs are selected, and this condition is interrupted periodically and briefly to select its B inputs. It is appreciated that the data applied to the selected inputs of the address multiplexer are transmitted therethrough to its outputs. These outputs are coupled to address selection inputs, referred to merely as the address inputs, of RAM 424. Data is written into locations or read out of locations of the RAM in accordance with the address supplied to its address inputs by address multiplexer 428. The data which is written into the RAM is constituted by the particular data word that is supplied to the data inputs from buffer 420 via bus 422. The words which are read out of RAM 424, that is, the position data words or the indicator data words, are supplied from the data outputs thereof to selected ones of the indicators and numerical display elements, referred to collectively as displays 446. The manner in which a particular indicator or numerical display element is energized will be described in detail with respect to FIG. 5.

Counting circuit 432 is adapted to produce an "enable" signal in response to the "ready" signal applied thereto from serial-to-parallel converter 308 and in response to a timing signal supplied thereto via lead 440 from timing counter 438. As will be described below with respect to FIG. 7, the "enable" signal is a negative-going pulse signal which enables address latch circuit 426 to "latch" or store the word then supplied thereto from buffer 420. This stored word is modified only when the "enable" signal is produced. The operation of counting circuit 432 is modified in the presence of the control bit supplied thereto via lead 436 from address latch circuit 426 so as to modify the generation of the "enable" signal. For example, in the format wherein the CPU transmits an address word, followed by an indicator word, followed by an address word, and so on, the "enable" signal is produced at every other word, in coincidence with each received address word. However, when the CPU transmits an address word, followed by a predetermined number (for example, four) of position data words, the address latch circuit is enabled only in coincidence with the received address word and not at every alternate word. Thus, position data words are not erroneously stored in address latch circuit 26. Similarly, when position data is received from the VTR's, such position data is constituted by four position data words preceded by a single pre-set address word, the latter being generated by pre-set address generator 408. In this mode, the "enable" signal is generated in coincidence with the single address word and is inhibited for the duration that the data words are received.

Figure 7:
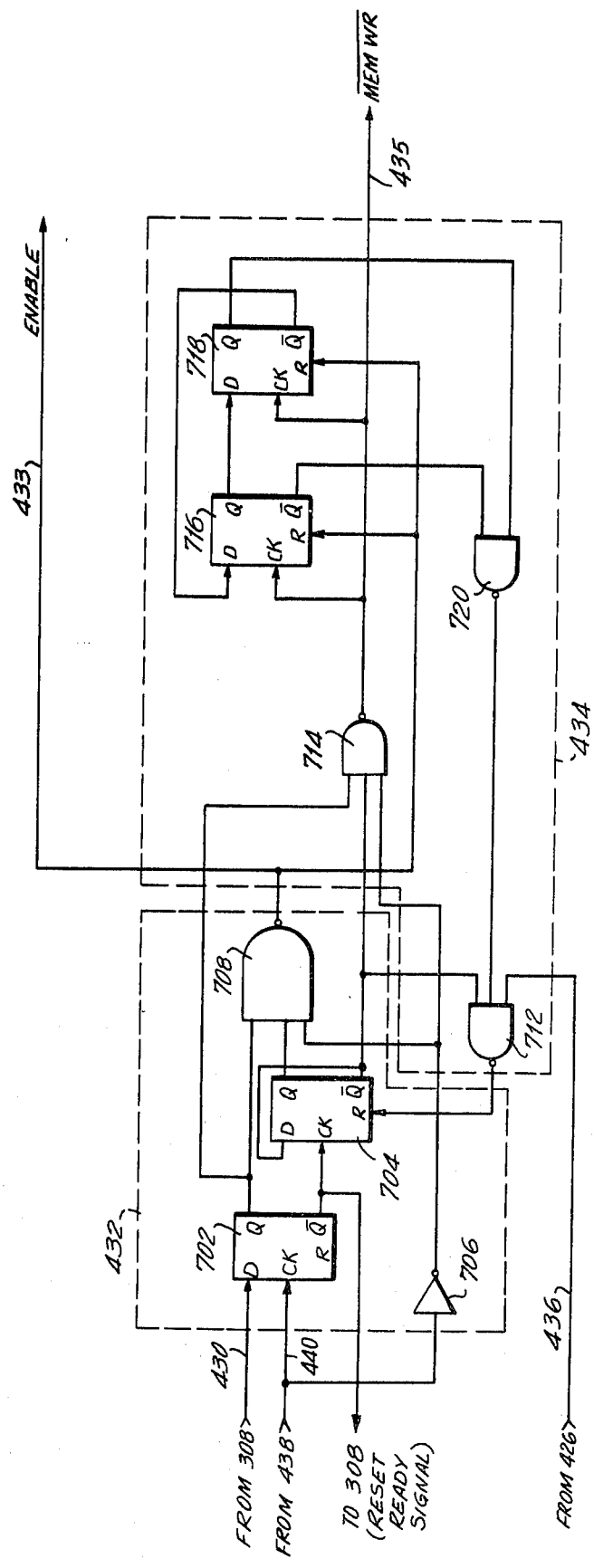
FIG. 7 is a logic diagram showing, in greater detail, a portion of the circuitry shown in FIG. 4B.

The output of this counting circuit 432 is coupled, via lead 433, to a memory write generator 434. This memory write generator, described in greater detail below with respect to FIG. 7, is adapted to produce a $\overline{\text{MEMWR}}$ signal that is supplied to RAM 424 via lead 435. The condition of this $\overline{\text{MEMWR}}$ signal determines whether data is written into the RAM or read out therefrom at the address supplied by address multiplexer 428. This $\overline{\text{MEMWR}}$ signal is synchronized with the respective indicator and position data words such that only these words are written into the RAM. At all other times, RAM 424 is conditioned to read out the data words which are stored at the locations then addressed by address multiplexer 428. A more detailed explanation of the memory write generator and the $\overline{\text{MEMWR}}$ signal are described below with reference to FIG. 7.

Timing counter 438 may be a conventional timing device supplied with a relatively higher frequency oscillating signal and adapted to divide the frequency of that signal for use as read-out addresses. One embodiment of this timing counter is a Model LS197. Typically, timing counter 438 includes twelve outputs for providing frequency-divided timing signals having divided frequencies ranging from $2^0 \ldots 2^{12}$ of the input oscillating signal. These outputs of timing counter 438 are designated outputs 0, 2, 4, 16, 32, 64, 128, 256, 512, 1024 and 2048, respectively. Outputs 2, 4, 128, 256, 512 and 1024 are coupled to respective ones of the B inputs of address multiplexer 428. As the binary signals provided at these respective outputs of the timing counter vary, the address defined thereby likewise varies.

Outputs 8 and 64 of timing counter 438 also are coupled to control circuit 442. This control circuit is comprised of an inverter 443, a clocked flip-flop circuit 445, and a NAND gate 447. In particular, the "64" output is coupled to the clock input CK of flip-flop circuit 445 via inverter 443. The clocked flip-flop circuit also includes a D input, supplied with a constant positive potential, and a reset input R, the latter being coupled to the output of NAND gate 447. One input of this NAND gate is connected to the Q output of flip-flop circuit 445, and the other input thereto is coupled to the "8" output of timing counter 438. The Q output of flip-flop circuit 445 also is supplied as the input selector signal MEMRD to selector input 444 of address multiplexer 428. The manner in which control circuit 442 operates will be described below.

Figure 10:
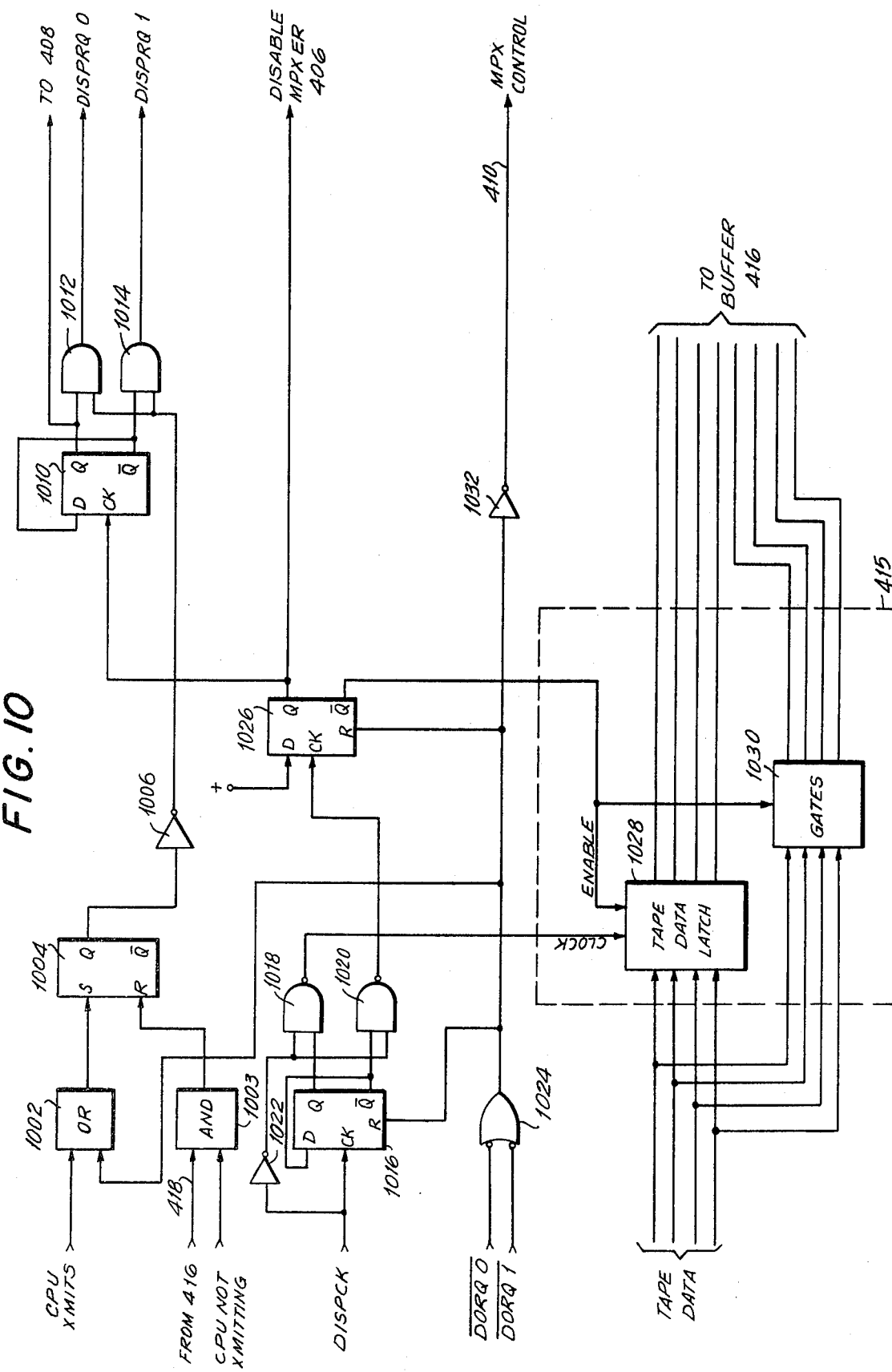
FIG. 10 is a logic diagram of a control circuit which is used to control a portion of the circuitry illustrated in FIG. 4A.

As shown in FIG. 4A, the inputs to buffer 416 also are coupled to the outputs of a gating circuit 415, this gating circuit being described in greater detail with respect to FIG. 10. Gating circuit 415 is adapted to receive the positive data derived from the VTR's. In addition, a gate signal is supplied to this gating circuit, as will be described, to enable the position data derived from the VTR's to be transmitted through buffer 416 and thence to RAM 424.

The manner in which the apparatus illustrated in FIGS. 4A and 4B operates to receive data from the CPU and to store that data at appropriate addresses in RAM 424 now will be described.

Let it be assumed that the CPU is in condition to transmit data to RAM 424. A suitable signal is supplied to the set input S of flip-flop circuit 402, thereby conditioning AND gate 404. If the contents of buffer 416 are "empty", that is, if a data word is not stored within this buffer, then a binary "1" is supplied via lead 418 to the other input of AND gate 404, thereby energizing this AND gate to produce an enabling signal to apprise the CPU that data transmission may begin.

Let it be assumed that the CPU transmits indicator control signals which, in the present embodiment, are constituted by a single indicator data word preceded by a single address word, this address word identifying the particular address in RAM 424 in which the indicator word is to be stored. This address word also serves to identify the particular indicators of console 10 which are to be energized in accordance with the indicator control signals represented by the indicator data word. Thus, the CPU transmits an address word followed by an indicator data word to bi-directional buffer 328 via system data bus 332. It is appreciated that, when the CPU transmits data to the bi-directional buffer, the transmit/receive control signal applied to lead 330 conditions the bi-directional buffer to receive data from the system data bus. This received data is transferred to internal data bus 314 and supplied to the B inputs of multiplexer 406.

When the CPU is conditioned to transmit data, and during such data transmissions, the multiplex control signal supplied via lead 410 to the selector input of multiplexer 406 results in the selection of the B inputs. Thus, in the example being described, the successive words supplied to bi-directional buffer 328 from the CPU are transmitted through the multiplexer to buffer 416.

In its programmed routine to transmit data to RAM 424, the CPU also supplies an enable signal to buffer 416 via lead 412. The buffer thus is conditioned to transfer the words supplied thereto from multiplexer 406 to parallel-to-serial converter 312 in synchronism with the clock signals which are applied to this buffer via lead 414. Converter 312 serializes each word supplied thereto from buffer 416, and each serialized word is supplied to serial-to-parallel converter 308. When a complete word has been received by converter 308, the "ready" signal is produced thereby and supplied by lead 430 to counting circuit 432. This "ready" signal cooperates with the timing signal derived from the "2" output of timing counter 438 to supply the "enable" signal to address latch circuit 426. Hence, when the first complete word transmitted from the CPU is received by serial-to-parallel converter 308, address latch circuit 426 is enabled to store this word therein. It is recalled that this first word is an address word, and it is supplied to the address latch circuit via buffer 420. This address word also is supplied to the data inputs of RAM 424 but, as will be appreciated, has no effect upon the contents of the RAM because, at this time, the $\overline{\text{MEMWR}}$ signal is not produced.

At this time, let it be assumed that the MEMRD selector signal supplied to selector input 444 of address multiplexer 428 actuates this multiplexer to select its A inputs. Hence, the address word stored in address latch circuit 426 is supplied to the address inputs of RAM 424 via address multiplexer 428. Consequently, the particular location in the RAM which now is addressed by the stored address word is conditioned to have a data word written therein. Of course, the actual writing in of data into the address location does not occur until the $\overline{\text{MEMWR}}$ signal is produced by memory write generator 434.

Following the transmission of the address word by the CPU, the data word then is transmitted. In accordance with the present example, it is assumed that this data word is constituted by a single indicator data word. When the complete indicator data word is received by serial-to-parallel converter 308, the "ready" signal is supplied to counting circuit 432. It is recalled that, in response to the first "ready" signal, the counting circuit generated the "enable" signal to enable address latch circuit 426 to receive and store the preceding address word. As will be described below, this "enable" signal is of a predetermined, brief duration. The next "ready" signal produced by serial-to-parallel converter 308 is counted by counting circuit 432 whose count now triggers memory write generator 434 to produce the $\overline{\text{MEMWR}}$ signal. It will be appreciated, therefore, that the $\overline{\text{MEMWR}}$ signal is supplied to RAM 424 in time synchronism with the "ready" signal produced by converter 308. That is, when a complete indicator data word has been received by this converter, RAM 424 is enabled to carry out its write-in operation. The indicator data word is supplied to the data inputs of RAM 424 by buffer 420 and, in response to the $\overline{\text{MEMWR}}$ signal, this indicator data word is written into the location then being addressed by address latch circuit 426.

When multiplexer 406 supplies a word to buffer 416, for example, the address word transmittd from the CPU, buffer 416 applies a binary "0" to lead 418, thus indicating that data now is being processed by this buffer, thereby disabling AND gate 404. Consequently, while buffer 416 is processing data, the CPU is advised to delay the initiation of another data transmission operation. The capacity of buffer 416 is sufficient such that a satisfactory number of data words may be "clocked" therethrough in succession.

Let it now be assumed that, in place of the single indicator word, the CPU transmits a predetermined number, (for example, 4) of position data words. It is recalled that time code address data is an 8-digit decimal number consisting of a 2-digit number representing hours, a 2-digit number representing minutes, a 2-digit number representing seconds and 2-digit number representing frames. As is known, a decimal digit can be represented by a 4-bit character. Thus, each 2-digit number (i.e. hours, minutes, seconds and frames) may be represented by an 8-bit word, the first four bits representing one digit and the second four bits representing the other digit. Thus, a complete time code address is represented by four position data words.

As mentioned above, and in accordance with the example being described, the CPU transmits this position data as four sequential position data words, this block of four position data words being preceded by a single address word. The address word, of course, identifies the particular display register in which the data, represented by the following four sequential position data words, should be displayed. More particularly, the address word identifies the first location in RAM 424 in which these four successive position data words are to be stored.

As before, the first word transmitted from the CPU, that is, the address word, is transferred through bi-directional buffer 328, multiplexer 406, buffer 416, parallel-to-serial converter 312 and serial-to-parallel converter 308. When a complete address word has been received by the latter converter, the "ready" signal is produced and is counted by counting circuit 432. In response to this first "ready" signal, the counting circuit produces the "enable" signal to enable address latch circuit 426 to receive and store the address word then supplied thereto via buffer 420 from serial-to-parallel converter 308. The address now stored in address latch circcuit 426 is supplied through address multiplexer 428 to the address input of RAM 424, thereby defining the particular location in which the next-following data is to be stored. At this time, however, the $\overline{\text{MEMWR}}$ signal is not yet produced.

The next-following word received from the CPU is the first position data word. This position data word is supplied via bi-directional buffer 328, multiplexer 406, buffer 416, and parallel-to-serial converter 312 to serial-to-parallel converter 308. Upon receipt of the complete position data word, another "ready" signal is produced and is counted by counting circuit 432. At this time, however, the address word stored in address latch circuit 426 contains the control bit which, it is recalled, is provided by the CPU when the address word precedes the predetermined number (e.g. 4) of position data words. This control bit is supplied to counting circuit 432 to condition the counting circuit to count each of the "ready" signals produced by the four succssive position data words following the received address word. Each of these "ready" signals supplied to the counting circuit results in the triggering of memory write generator 434 so as to produce four successive $\overline{\text{MEMWR}}$ signals. Each of these $\overline{\text{MEMWR}}$ signals enables RAM 424 to write the position data word then supplied to its data inputs into the address supplied to its address inputs. It is recognized that, in response to the control bit supplied from address latch circuit 426 to counting circuit 432, the counting circuit is inhibited from producing the "enable" signal until after all four of these position data words have been written into the RAM. Thus, none of the successive position data words that are received by serial-to-parallel converter 308 can be stored in the address latch circuit.

It is appreciated that each position data word should be stored in a separately addressed location in RAM 424. The address word stored in address latch circuit 426 identifies the first such memory location. Then, although this address word is not changed by any of the successive position data words which are received by converter 308, each $\overline{\text{MEMWR}}$ signal is supplied as a clock clock signal to the address latch circuit, thereby incrementing the address stored therein by a respective one count. More particularly, the stored address is incremented in response to each trailing edge of the $\overline{\text{MEMWR}}$ signal. Hence, the first position data word that is transmitted by the CPU immediately following the address word is stored in the address location identified by the specific address word that preceded it, which preceding address word is stored in address latch circuit 426. After this position data word is written into the RAM, the address stored in address latch circuit 426 is incremented by one count in response to the trailing edge of the $\overline{\text{MEMWR}}$ signal, thereby defining the next sequential address into which the next-following position data word is written. This process continues until four such position data words have been written into four sequential addresses in RAM 424. In response to the fourth position data word, the "ready" signal supplied to counting circuit 432 returns this counting circuit to its initial condition, thereby awaiting receipt of the next word, presumed to be an address word, so as to produce the "enable" signal.

Thus, it is seen that when indicator data is transmitted from the CPU, the indicator data word is preceded by an address word, and counting circuit 432 generates the "enable" signal to store this preceding address word in address latch circuit 426. Then, in response to the following indicator data word, counting circuit 432 triggers memory write generator 434 to generate the $\overline{\text{MEMWR}}$ signal such that the indicator data word is written into the addressed location in RAM 424. Although the trailing edge of this $\overline{\text{MEMWR}}$ signal increments the address stored in address latch circuit 426, this has no effect on the memory write-in operation, because it is assumed that the next-following word is an address word which, of course, is stored in address latch circuit 426 regardless of the previously incremented address which may be stored therein.

When position data is transmitted from the CPU, counting circuit 432 is responsive to the first word, which is the address word, to supply address latch circuit 426 withthe "enable" signal. Hence, this address word is stored in the address latch circuit so as to define the location in which the next-following position data words are to be stored. The first of these position data words is supplied to the data inputs of RAM 424 and, in response to the "ready" signal produced where the complete position data word is received by serial-to-parallel converter 308, counting circuit 432 triggers memory write generator 434 to generate the $\overline{\text{MEMWR}}$ signal so as to enable the position data word to be written into the address location. At the trailing edge of this $\overline{\text{MEMWR}}$ signal, the address stored in address latch circuit 426 is incremented by on count. Of course, the control bit remains stored in address latch circuit 426 so as to prevent counting circuit 432 from being reset to its initial condition in response to this position data word. That is, the counting circuit does not respond to the next word as if that word is an address word. Rather, this next position data word results in the generation of another $\overline{\text{MEMWR}}$ signal that it is written into the location then addressed by the incremented address stored in address latch circuit 426. This procedure is repeated until four such position data words have been detected, whereupon counting circuit 432 is reset to its initial condition to await the arrival of the next sequence of data, which sequence is prefaced by an address word.

In this manner, address words and position data words are distinguished. In the embodiment shown in FIGS. 4A and 4B, the control bit is stored in address latch circuit 426 (or in any other equivalent storage device) so as to control counting circuit 432 to distinguish between an address word followed by one data word and an address word followed by a plurality of data words.

If desired, indicator signals may be transmitted as a first predetermined number of data words, for example, two or three data words, and position data may be transmitted as another predetermined number of data words, such as four, five or six data words. Counting circuit 432 then may be modified so as to distinguish between the number of indicator data words which follow an address word and the number of position data words which follow an address word, for proper control of RAM 424.

At times that data words are not written into RAM 424, data words stored therein are read out. Although not shown in FIG. 4B, it should be apppreciated that suitable read/write control circuitry is provided to prevent a read operation from being initiated while a write operation is being carried out. The addresses from which the data stored in RAM 424 are read are generated by timing counter 438. Furthermore, this timing counter cooperates with control circuit 442 to control address multiplexer 428 whereby during read-out operations, the B inputs of this address multiplexer are selected. As shown, these B inputs are coupled to the reset input R of flip-flop circuit 445. The resultant signal produced at the Q output of this flip-flop circuit, which is the MEMRD signal, is as shown in FIG. 6E.

Thus, it is seen that address multiplexer 428 is controlled, periodically, to select its B inputs in response to the MEMRD pulses shown in FIG. 6E. During the duration of each MEMRD pulse, four successive addresses are generated by timing counter 438. Furthermore, the duration of a memory read-out operation is substantially coincident with the duration of each of these MEMRD pulses. As a numerical example, the MEMRD pulses are generated at a frequency of 38.4 KHz, and the address supplied to the B inputs of address multiplexer 428 by timing counter 438 changes at the rate of 1.23 MHz.

In the interval between successive MEMRD pulses, a write-in operation is enaled to be carried out, and the MEMWR signal is produced during this interval.

During the read-out operation wherein the address supplied to RAM 424 is from the B inputs of address multiplexer 428, the data stored in each address location is read out and supplied to displays 446. As mentioned above, the manner in which the data read out fom the RAM is used to energize these displays is discussed with reference to FIG. 5.

Reference now is made briefly to the use of pre-set address generator 408 and gating circuit 415. Position data derived from the VTR's is supplied to gating circuit 415. When the CPU is not transmitting data to RAM 424, and when the ontents of buffer 416 are "empty", the multiplex control a predetermined output of timing counter 438 for receiving the read-out addresses therefrom. Specifically, the read-out addresses are generated by the pulse signals produced at the "2", "4", "128", "256"and "1024" outputs of the timing counter.

The manner in which the MEMERD input selector signal is generated by control circuit 442 to select either the A or B inputs of address multiplexer 428 now will be described with reference to the timing diagrams shown in FIGS. 6A-6E. FIG. 6A represents the timing signal produced by the "8" output of timing counter 438. FIGS. 6B, 6C and 6D represent the timing signals which are produced by the "16", "32"and "64" outputs oof the timing counter, respectively. It is assumed that flip-flop circuit 445 is a clocked flip-flop circuit such that that Q output thereof is provided with a signal corresponding to the signal supplied to its D input at the negative edge of the clock signal supplied to its clock CK input. It is further assumed that if a relatively low level, such as a binary "0",is supplied to its reset input R, flip-flop circuit 445 remains in its reset state, whereby the Q output produces a binary "0".

In accordance with this understanding, inverter 443 inverts the timing signal produced at the "64" output of timing counter 438, such that flip-flop circuit 445 is set to produce a binary "1" at the Q output thereof at the positive edge of the timing signal shown in FIG. 6D. When flip-flop circuit 445 is set, NAND gate 447 is supplied with a binary "1" at one input thereof. At the next-following positive transition in the timing signal produced at the "8" output of timing counter 438 shown in FIG. 6A, NAND gate 447 is supplied with a binary "1" at each input thereof so as to supply a binary "0" signal supplied to multiplexer 406 selects the A inputs thereof. If position data derived from the VTR's is available to be transmitted to the RAM, pre-set address generator 408 is actuated to establish the address within RAM 424 in which position data derived from the playback tape or position data derived from the recording tape is to be stored. This address is supplied from pre-set address generator 408, through the A inputs of multiplexer 406, buffer 416, parallel-to-serial converter 312 and serial-to-parallel converter 308. The remaining apparatus shown in FIG. 4B operates in response to this address word in the manner discussed hereinabove. Hence, this address word is stored in address latch circuit 426. Since this address word represents the address in which position data is stored, and since, it is recalled, position data is constituted by four successive position data words successively following the address word, the address word stored in the address latch circuit contains the aforementioned control bit, whereby counting circuit 432 is controlled in the manner discussed above.

After the pre-set address is supplied from inputs A of multiplexer 406 to buffer 416, the multiplexer is disabled and gating circuit 415 now is enabled to gate the position data supplied thereto from the VTR's to buffer 416. These successive position data words are transferred to serial-to-parallel converter 308, and counting circuit 432 responds to each "ready" signal produced by this converter as each complete data word is received to trigger memory write generator 434 to write in each of these position data words into the addresses then produced by address latch circuit 426. As was discussed above, the specific address first stored in the address latch circuit, that is, the pre-set address supplied thereto from pre-set address generator 408 by multiplexer 406, is incremented by a count of one as each position data word is written into RAM 424. Hence, the position data words that are derived from the VTR's are written into successive memory locations in RAM 424.

As will be described further below with respect to FIG. 10, after the position data derived from one VTR is written into predetermined locations in RAM 424, the position data derived from the other VTR is written into its respective address location. This second operation of writing in the position data is substantially the same as the first-described operation and, in order to avoid unnecessary duplication of description, further explanation thereof is not provided. Suffice it to say that, when the CPU is not transmitting data to RAM 424, and when the contents of buffer 416 are "empty", a pre-set address word is supplied from the A inputs of multiplexer 406 to address latch circuit 426 to determine the locations in RAM 424 in which the next-following four successive position data words are stored. These position data words are, of course, derived from one of the VTR's. After such position data words have been stored in RAM 424, this operation is repeated in order to store the four position data words derived from the other VTR.

From the foregoing description, it should be fully appreciated that RAM 424 stores position data words and indicator data words at predetermined address locations therein. The manner in which such data words are used to energize the respective indicators and display of console 10 (FIG. 1) now will be described.

Memory Read-Out for Display Control

As mentioned above, position data words and indicator data words are stored in RAM 424 in locations corresponding to the particular numerical display elements and indicator elements which are to be energized by such words. Each word is comprised of eight bits and, since each numerical display element is energized by four bits, it is recognized that each position data word serves to energize two numerical display elements. Consequently, when a position data word is read out of an address location from RAM 424, this word serves to energize two predetermined numerical display elements.

With respect to the indicator elements, such as the indicator lamps associated with respective ones of the display switches of console 10, each indicator lamp is adapted to be energized, or turned ON, to be turned OFF and to be flashed. To achieve this, four bits of each 8-bit indicator data word are adapted to energize four corresponding indicator elements to be either ON or OFF, and the other four bits of that indicator data word are adapted to determine whether these four indicator lamps are flashed. For example, of the first-mentioned four bits, a binary "1" is effective to turn the indicator lamp ON and a binary "0" is effective to turn it OFF. Of the secondmentioned four bits, a binary "1" is effective to flash the indicator lamp (providing it has been turned ON), and a binary "0" represents that the indicator lamp is not to be flashed.

In a preferred embodiment, RAM 424 may be considered to be divided into four separate sections, the first three sections storing position data words and the fourth section storing indicator data words. During a read-out operation, a particular location is addressed successively in each of these sections, followed by the next location, and so on. For example, location 1 is addressed in section 1, followed by location 1 in section 2, followed by location 1 in section 3, followed by location 1 in section 4. Then, location 2 in section 1 is addressed, followed by location 2 in section 2, followed by location 2 in section 3, followed by location 2 in section 4. This read-out addressing technique continues until all of the locations in all of the sections have been addressed and read out. Thus, and with reference to the MEMRD signal shown in FIG. 6E, during each pulse duration, a particular location is read out from each of the sections in RAM 424. Then, during the next pulse duration, the next sequential location is read out from each of these sections. Timing counter 438 serves to generate the appropriate address, wherein outputs "2" and "4" of the timing counter determine the particular section which is to be addressed, and outputs "128", "256", "512" and "1024" determine the particular location that is to be addressed in each section.

Figure 5:
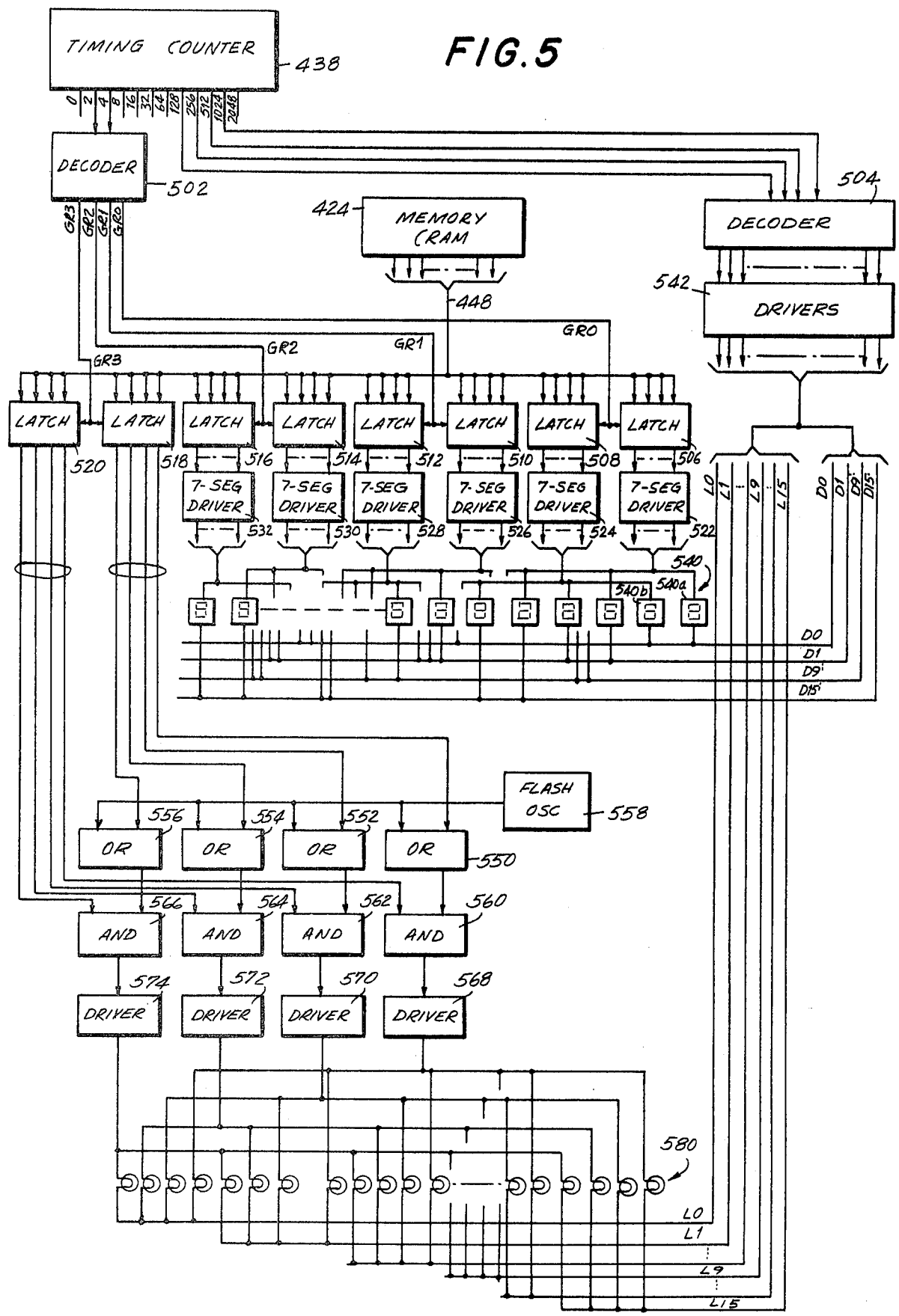
FIG. 5 is a partial block, partial logic diagram representing apparatus for energizing the displays on the console.

The apparatus which is used to energize the particular numerical display elements or indicator lamps associated with the position data word or indicator data word which is read from an addressed location in RAM 424 is illustrated in FIG. 5. This apparatus is comprised of decoders 502 and 504, drivers 542, latch circuits 506, . . . 520, 7-segment drivers 522 . . . 532, OR gates 550 . . . 556, AND gates 560 . . . 566, lamp drivers 568 . . . 574 and blinking oscillator 558. FIG. 5 also illustrates that each of the numerical display elements is a 7-segment display of the type mentioned hereinabove, these 7-segment displays being disposed in array 540. Similarly, FIG. 5 illustrates that the indicator lamps are disposed in array 580.

In the illustrated embodiment, the 7-segment display elements 540 are arranged in three separate groups, each group being defined by the address signals produced at outputs "2" and "4" of timing counter 438. If these groups are identified as groups 0, 1 and 2, then group 0 is identified by the combination 00 produced at outputs "4" and "2," respectively, group 1 is identified by the combination 01, and group 2 is identified by the combination 10. When this combination of signals at outputs "4" and "2" corresponds to 11, indicator lamps 580 are identified. Decoder 502, one embodiment of which may be a Model LS139, is connected to receive the signals provided at outputs "4" and "2", respectively, and to decode these outputs so as to produce a respective group selection signal as a function of the combination of these received signals. Thus, group selection signal GR0 is produced in response to the combination 00, group selection signal GR1 is produced in response to the combination 01, group selection signal GR2 is produced in response to the combination 10 and group direction signal GR3 is produced in response to the combination 11. Group selection signal GR0 is supplied to latch circuts 506 and 508 and is adapted, when produced, to enable these circuits to store the digital signals then supplied thereto. As shown, latch circuits 506 and 508 are connected to the outputs 448 of RAM 424 and are adapted to receive the data word read out from an address location in the RAM. Four bits of the read-out word are supplied to latch circuit 506 and the other four bits of this word are supplied to latch circuit 508. Thus, each latch circuit is supplied with a 4-bit signal representative of a decimal digit.

In a similar manner, group selection signal GR1 is supplied to latch circuits 510 and 512, the inputs of these latch circuits being connected in common with latch circuits 506 and 508 to outputs 448 of RAM 424. Group selection signal GR2 is supplied to latch circuits 514 and 516, the inputs of these latch circuits being connected in common with the aforementioned latch circuits. Group selection signal GR3 is supplied to latch circuits 518 and 520, the inputs of these latch circuits also being connected in common with the aforementioned latch circuits.

The outputs of latch circuits 506 and 508 are connected to 7-segment drivers 522 and 524, respectively. These 7-segment drivers are conventional and are adapted to energize the respective display members in each 7-segment element as a function of the 4-bit signal that is supplied to and stored in latch circuits 506 and 508. In this regard, each latch circuit may also include decoding circuitry or, if desired, each 7-segment driver may include such decoding circuitry. Similarly, the outputs of latch circuits 510 and 512 are connected to 7-segment drivers 526 and 528, and the outputs of latch circuits 514 and 516 are connected to 7-segment drivers 530 and 532.

In the illustrated embodiment, each 7-segment driver is connected in common with sixteen separate 7-segment elements. Thus, the four bits stored in, for example, latch circuit 506 are adapted to energize sixteen separate 7-segment display elements. Similarly, the four bits stored in latch circuit 508 are adapted to energize sixteen different ones of the 7-segment display elements. However, each display element also is connected to an actuating lead, identified as leads D0, D1, D2 . . . D15, only one of which is supplied with an actuating signal at any given time. The particular 7-segment display element which is energized thus is limited to that particular element which is driven by a respective 7-segment driver and, also, is supplied with an actuating signal that is present on one of these leads.

Leads D0 . . . D15 are connected to respective outputs of drivers 542, which drivers are supplied with decoded signals produced by decoder 504 in response to the signals supplied to the decoder from outputs "128", "256", "512", and "1024" of timing counter 438. It is appreciated that sixteen separate combinations are available from the 4-bit signal supplied to the decoder from the timing counter. Thus, depending upon the condition of this 4-bit signal, a corresponding one lead D0 . . . D15 is supplied with an actuating signal.

Before describing the apparatus which is connected to indicator lamps 580, the manner in which 7-segment display elements 540 are energized now will be briefly described. As the read-out address generated by timing counter 438 changes, the particular 7-segment display that is energized changes in a corresponding manner.

For example, let it be assumed that timing counter 438 addresses a location in RAM 424 in which is stored the position data word corresponding to the "frames" digits of a particular display register. Let it be further assumed that the 7-segment display elements which are to display these "frames" digits are elements 540a and 540b. This address is, of course, represented by the address bits provided at outputs "2", "4", "128", "256", "512" and "1024" of timer counter 438. Outputs "2" and "4" are decoded to produce group selection signal GR0, thus enabling latch circuits 506 and 508 to store the position data word read from RAM 424. Seven-segment drivers 522 and 524 thus are conditioned to energize all of the 7-segment display elements connected thereto, including elements 540a and 540b.

The remaining bits in the address generated by timing counter 438 are decoded by decoder 504 to supply the actuating signal to lead D0. This actuating signal thus is applied to all of the 7-segment display elments that are connected to lead D0, including elements 540a and 540b. Since these latter elements are the only elements that are connected to lead D0 and also are supplied with energizing signals, elements 540a and 540b are energized to display the "frames" digits.

These address supplied to RAM 424 by timing counter 438 next is changed by a change in the bits produced at outputs "2" and "4". The remaining address bits remain the same. This change in the address bits produces group selection signal GR1. Consequently, the position data word now read out of RAM 424 is stored only in latch circuits 510 and 512. Seven-segment drivers 526 and 528 are supplied with energizing signals, and only those 7-segment display elements which are driven by 7-segment counters 526 and 528 and which also are connected to lead D0 are energized.

The foregoing operation is repeated as each address word supplied to RAM 424 by timing counter 438 changes. From FIG. 6E, it is seen that after all four group selection signals GR0, GR1, GR2 and GR3 have been produced, in sequence, the read-out operation terminates. When the read-out operation next is instituted, the address bits supplied from timing counter 438 to decoder 504 will be changed, such that the actuating signal now is supplied to, for example, lead D0. Then, those 7-segment display elements which are connected to lead D1 and which also receive energizing signals from their respective 7-segments drivers will be energized in response to the position data words read out from RAM 424.

It is appreciated, therefore, that the 7-segment drivers and actuating leads D0 . . . D15 are arranged in a matrix configuration, wherein the 7-segment drivers may be considered as columns and the actuating leads may be considered as rows. Those 7-segment elements which are defined by a particular column and row are energized, or actuated, and will display the numerical data represented by the position data word then read from RAM 424.

As a numerical example, the rate at which the bit produced at output "1024" of timing 438 changes may be equal to 1.2 KHz. This is the frequency at which each 7segment display element is energized. That is, all of the 7-segment display elements provided in the respective display registers of console 10 are energized sequentially and cyclically. This 1.2 KHz rate is sufficiently high that the operator does not perceive any visible blinking in these elements. Thus, to his eye, all of the display elements are energized concurrently.

Turning now to the apparatus for energizing indicator lamps 580, it may be appreciated that these indicator lamps are energized in a similar manner as that discussed above with respect to the 7-segment display elements. Indicator lamps 580 are arranged in groups of four lamps in each group. Each group is connected to an actuating lead, referred to as a lamp actuating lead, L0, L1 . . . L15, and each of these lamp actuating leads is connected in common with a respective one of the aforementioned display element actuating leads D0 . . . D15. Thus, when a particular display element actuating lead is supplied with an actuating signal, its corresponding lamp actuating lead also is supplied with that actuating signal.

A particular lamp in each of the sixteen groups of lamps is connected to a respective one of lamp drivers 568, 570, 572 and 574. Thus, when one of these drivers is energized, all of the lamps (i.e. sixteen indicator lamps) connected thereto are conditioned to be energized. However, the only one of these sixteen lamps which actually is energized is the one which also is connected to the lamp actuating lead to which an actuating signal is supplied.

The particular lamp driver that is energized is determined by the bits constituting the indicator word that is read from RAM 424 and stored in latch circuits 518 and 520. The four bits stored in latch circuit 520 determine the ON and OFF condition of lamp drivers 568, 570, 572 and 574; and the four bits stored in latch circuit 518 determined the flashing condition of these lamp drivers. To this effect, AND gates 550, 552, 554 and 556 are connected to respective outputs of latch circuit 518. These AND gates also receive a slowly oscillating signal, corresponding to the flash rate for indicator lamps 580, from oscillator 558. The outputs of OR gates 550, 552, 554 and 556 are connected to one input of AND gates 560, 562, 564 and 566, respectively. The other inputs of these latter AND gates are connected to latch circuit 520 to receive the ON and OFF bits stored therein. The outputs of AND gates 560, 562, 564 and 566 are connected to lamp drivers 568, 570, 572 and 574, respectively.

In operation, when the read-out address produced by timing counter 438 identifies a location in which an indicator data word is stored, this same address will produce group selection signal GR3. Thus, only latch circuits 518 and 520 will be enabled to receive the indicator data word then read from the RAM. Depending upon the ON and OFF bits, as well as the flash-control bits which consititute this indicator data word, respective ones of drivers 568, 570, 572 and 574 will be energized, and such energized drivers will be either in the steady energization state or the flashing energization state. Suitable energizing signals are supplied by these lamp drivers to all of the indicator lamps connected thereto. However, the address which identifies the particular location in RAM 424 from which the indicator data word has been read also selects a single one of lamp actuating leads L0 . . . L15 to which an actuating signal is supplied. Thus, only those indicator lamps which are connected to this lead will be energized by lamp drivers 568 . . . 574. In this manner, as each indicator data word is read from the RAM, four indicator lamps that are associated with the memory location which has been addressed will be selectively energized by the read-out indicator data word.

From the foregoing, it is seen that, as the contents of RAM 424 are read out sequentially, three pairs of 7-segment display elements 540, followed by four indicator lamps 580 are actuated successively in accordance with the read out position and indicator data words. The rate at which such data words are read from the RAM, and thus, the rate at which these display and indicator elements are energized, is sufficiently high such that the operator does not perceive any so-called blinking on console 10. Of course, those indicator lamps whch are to be flashed will be flashed at a clearly perceptable rate, such as on the order of 1 or 2 Hz. Hence, the data stored in RAM 424 is displayed on console 10. Of course, as new data is supplied to the RAM, such as updated position data derived from the VTR's or data that is supplied thereto from the CPU, as discussed above with respect to FIGS. 4A and 4B, this new data also is displayed.

Address and Write Control Circuit

Referring to FIG. 7, there is illustrated a logic circuit diagram of one embodiment of counting circuit 432 and memory write generator 434 (shown in FIG. 4B). It is recalled that counting circuit 432 functions to generate the "enable" signal, whereby address latch circuit 426 is enabled to store an address word then supplied thereto. The contents of the address latch circuit remain therein in the absence of such an "enable" signal. Memory write generator 434 serves to produce the $\overline{\text{MEMWR}}$ signal for enabling a data word to be written into an address location of RAM 424. A memory write operation is not performed unless the $\overline{\text{MEMWR}}$ signal is produced.

Counting circuit 432 is comprised of clocked flip-flop circuits 702 and 704 and NAND gate 708. Memory wirte generator 434 is comprised of clocked flip-flop circuits 716 and 718, and NAND gates 712, 714 and 720. For convenience, the circuitry shown in FIG. 7 is described in its entirety, and not as separate counting and memory write generating circuits. Each of the clocked flip-flop circuits illustrated in FIG. 7 is a D-type flip-flop device having a data input D, a clock input CK, and Q and $\overline{Q}$ outputs. Such flip-flop circuits also include a reset input R which, when supplied with a relatively low level signal, such as a binary "0", serves to reset the flip-flop circuit. The set state of the clocked flip-flop circuit is represented by a binary "1" at its Q output and a binary "0" at its $\overline{Q}$ output. These signals are reversed when the flip-flop circuit is reset.

The D input of flip-flop circuit 702 is coupled to serial-to-parallel converter 308 via lead 430, as described above with respect to FIG. 4B. Hence, this D input is adapted to receive the "ready" signal when the serial-to-parallel converter is supplied with a complete word. The clock input CK of flip-flop circuit 702 is supplied with a clock signal generated from the "2" output of timing counter 438 and supplied thereto via lead 440. In the embodiments described herein, each clocked flip-flop circuit is adapted to be triggered in response to the positive-going, or leading edge of the clock signals supplied to its clock input CK. If desired, each of these flip-flop circuits may be of the so-called negative-edge triggering type. It is appreciated that, when triggered, the flip-flop circuit is set if a binary "1" is supplied to its D input and is reset if a binary "0" is supplied thereto.

The Q output of flip-flop circuit 702 is connected in common to a respective input of each of NAND gates 708 and 714. It is appreciated that a NAND gate is adapted to produce a binary "0" only when a binary "1" is supplied to each of its inputs. If a binary "0" is supplied to any input thereof, the NAND gate produces a binary "1".

Flip-flop circuit 704 has its D input connected to its $\overline{Q}$ output, and its clock input CK connected to the $\overline{Q}$ output of flip-flop circuit 702. In addition, the Q output of flip-flop circuit 704 is connected to another input of NAND gate 708, and its $\overline{Q}$ output is connected to another input of NAND gate 714, and also to a respective input of NAND gate 712. The remaining inputs of NAND gates 708 and 714 are connected to receive the clock signal supplied to lead 440 by timing counter 43 after this clock signal has passed through inverter 706.

The output of NAND gate 708 is connected to lead 433 to produce the "enable" signal and, additionally, is connected to the reset input R of each of flip-flop circuits 716 and 718. These flip-flop circuits also have their clock inputs CK connected in common to the output of NAND gate 714. The output of this NAND gate also is connected to lead 435 to produce the $\overline{\text{MEMWR}}$ signal. Flip-flop circuits 716 and 718 are interconnected to comprise a counter, whereby the D input of flip-flop circuit 71 is connected to the $\overline{Q}$ output of flip-flop circuit 718, and the D input of flip-flop circuit 718 is connected to the Q output of flip-flop circuit 716. The Q and $\overline{Q}$ outputs of flip-flop circuits 718 and 716, respectively, are connected to corresponding inputs of NAND gate 720, the ouput of which is connected to an input of NAND gate 712. The remaining input of NAND gate 712 is connected to lead 436 to receive the control bit that may be included in the address word stored in address latch circuit 426, as discussed above.

Figure 8A:
Figure 8B:
Figure 8C:

An operation of the circuit illustrated in FIG. 7 in the absence of a control bit in the stored address word now will be described. It is recalled that this control bit is not present if the address work stored in address latch circuit 426 precedes an indicator data word. Referring to the timing diagrams shown in FIGS. 8A–8F, the clock signal supplied to the clock inputs CK of flip-flop circuit 702 is illustrated in FIG. 8A. Let it be assumed that a "ready" signal is produced by serial-to-parallel converter 308, as shown in FIG. 8B. It is appreciated that the first "ready" signal represents that a complete address word has been received by this converter, the second "ready" signal represents that a complete indicator word has been received, the third "ready" signal represents that a complete address word has been received and the fourth "ready" signal represents that a complete indicator data word has been received. Thus, as shown in FIG. 8B, it is assumed that the CPU transmits information in the form of an address word followed by a data word followed by an address word, and so on.

Flip-flop circuit 702 serves to time-synchronize the "ready" signals which are received from serial-to-parallel converter 308. That is, each of these "ready" signals is synchronized by flip-flop circuit 702 with the leading, or positive-going, edges of the clock signals shown in FIG. 8A. Of course, if flip-flop circuit 702 is a negative-edge triggering type of flip-flop circuit, then the "ready" signals will be synchronized with such negative edges of the clock signal.

Figure 8D:

In the absence of a control bit supplied to lead 436 by address latch circuit 426, a binary "0" is applied via this lead to NAND gate 712. Hence, the NAND gate applies a binary "1" to the reset input R of flip-flop circuit 704. This binary "1" is not effective to reset this flip-flop circuit and enables it to respond to signals supplied to its clock input CK. The signal supplied to the clock input CK of flip-flop circuit 704 is derived from the $\overline{Q}$ output of flip-flop circuit 702. Flip-flop circuit 704 thus is adapted to change state each time that flip-flop circuit 702 is set, that is, in response to each positive-going transition at the $\overline{Q}$ output of this flip-flop circuit. FIG. 8D represents that flip-flop circuit 704 is set when the first "ready" signal is produced and is reset when the next-following "ready" signal is produced. Flip-flop circuits 702 and 704 may be thought of as a counting circuit in which the count thereof, as represented by the state of flip-flop circuit 704, is incremented by the first "ready" signal and reset by the next-following "ready" signal. That is, this count is incremented when an address word is received in serial-to-parallel converter 308 and is reset when the next-following data word is received therein.

Figure 8E:

When flip-flop circuits 702 and 704 both exhibit their set states, NAND gate 708 generates the "enable" pulse shown in FIG. 8E in response to the negative half-cycle of the clock signal (FIG. 8A). From a comparison of FIGS. 8A–8E, it is seen that this "enable" signal is produced in response to every other "ready" signal, that is, this "enable" signal is produced when each address word is received but not when the data words are received. Hence, address latch circuit 426 is enabled to store the address word then supplied thereto in response to this "enable" signal. When a data word is supplied to the address latch circuit, the "enable" signal is not produced. Hence, address latch circuit 426 is responsive only to address words and not to data words.

Figure 8F:
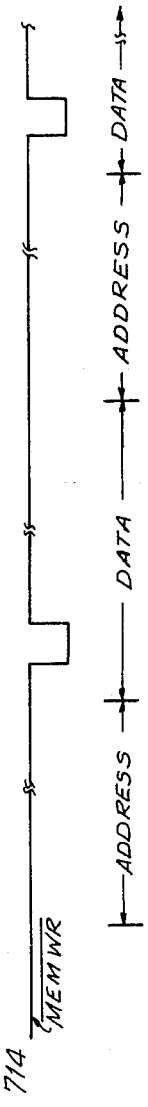

As shown in FIG. 8F, NAND gate 714 produces the $\overline{MEMWR}$ signal in response to the negative half-cycle of the clock signal (FIG. 8A) when flip-flop circuit 702 is in its set state and flip-flop circuit 704 is in its reset state. Since the latter flip-flop circuit is reset in response to the data word which follows the address word, the $\overline{MEMWR}$ signal is produced when the indicator data word is received thereby enabling RAM 424 to store this indicator data word in the address determined by the contents of address latch circuit 426.

The counter arrangement comprised of flip-flop circuits 716 and 718 is actuated in response to each $\overline{MEMWR}$ pulse produced by NAND gate 714. These flip-flop circuits are represented as having inverted clock inputs CK such that these flip-flop circuits are triggered in response to the positive-going edge of the $\overline{MEMWR}$ pulse. However, regardless of the count exhibited by this counter arrangement, it is appreciated that each "enable" pulse (FIG. 8A) produced by NAND gate 708 resets the count thereof to an initial count 00.

Let it now be assumed that position data words, preceded by an address word, are supplied to serial-to-parallel converter 308. Reference is made to the timing diagrams shown in FIGS. 9A–9K for an understanding of the operation of the circuitry shown in FIG. 7 when position data is received. FIG. 9B represents the "ready" pulses which are produced by converter 308 in response to the address word ("ready" pulse 0) and the four succeeding position data words ("ready" pulses 1, 2, 3 and 4). FIG. 9C is similar to aforedescribed FIG. 8C and illustrates the clock-synchronized "ready" pulses produced by flip-flop circuit 702. FIG. 9D is similar to FIG. 8D and illustrates the state of flip-flop circuit 704, which flip-flop circuit is set in response to "ready" pulse 0 (i.e., the "ready" pulse produced in response to the address word) and is reset in response to "ready" pulse 1 (i.e. the "ready" pulse produced in response to the next-following position data word). FIG. 9E illustrates the "enable" pulse produced by NAND gate 708 in response to the negative half-cycle of the clock signal (FIG. 9A) when flip-flop circuits 702 and 704 both exhibit their set states.

It is appreciated that, in response to the "enable" pulse, the address word received by serial-to-parallel converter 308 is shifted into address latch circuit 426. Since this address word is assumed to precede 4 position data words, this address word includes the aforementioned control bit. This control bit is supplied via lead 436 from address latch circuit 426 to NAND gate 712, and is illustrated in FIG. 9K.

Let it be assumed that, initially, flip-flop circuits 716 and 718 both exhibit their reset states, such that a binary "0" is supplied from the Q output of flip-flop circuit 718 to NAND gate 720. Hence, NAND gate 720 supplies a binary "1" signal to NAND gate 712, as shown in FIG. 9I.

When flip-flop circuit 704 is rest in response to the first position data word ("ready" pulse 1), NAND gate 714 produces a $\overline{MEMWR}$ signal (FIG. 9F) each time that flip-flop circuit 702 exhibits its set state and the negative half-cycle of the clock signal (FIG. 9A) is present. It is appreciated that when flip-flop circuit 704 exhibits its reset state and NAND gate 720 produces a binary "1", NAND gate 712 applies a binary "0" to the reset input R of flip-flop circuit 704, thereby maintaining this flip-flop circuit in its reset state regardless of the signals that may be applied to its clock input CK.

The positive transition in the $\overline{MEMWR}$ pulse triggers flip-flop circuit 716 to be set in response to the binary "1" supplied to its D input from the $\overline{Q}$ output of the flip-flop circuit 718. The state of flip-flop circuit 718, as represented by its Q output, is shown in FIG. 9G. Also, the $\overline{MEMWR}$ pulse is supplied to address latch circuit 426 (as shown in FIG. 4B) to increment the address stored therein by one count after the first position data word has been written into RAM 424.

Since flip-flop circuit 704 remains in its reset state, another $\overline{MEMWR}$ pulse (FIG. 9F) is produced in response to the second position data word ("ready" signal 2). This second $\overline{MEMWR}$ pulse now triggers flip-flop circuit 718 to its set state, as shown in FIG. 9H, and also increments the address stored in the address latch circuit.

Flip-flop circuit 704 remains in its reset state when the third position data word is received ("ready" signal 3), whereby NAND gate 714 produces the third $\overline{MEMWR}$ pulse, shown in FIG. 9F. The positive transition of this third $\overline{MEMWR}$ pulse triggers flip-flop circuit 716 to its reset state in response to the binary "0" supplied to its D input from the $\overline{Q}$ output of flip-flop circuit 718, and also increments the address latch circuit. FIG. 9G illustrates the reseting of flip-flop circuit 716. The signals now supplied to NAND gate 720 from the $\overline{Q}$ output of flip-flop circuit 716 and from the Q output of flip-flop circuit 718 are equal to [11], whereupon NAND gate 720 supplies the binary "0" shown in FIG. 9I to NAND gate 712. The latter NAND gate now removes the reset binary "0" signal that had been applied to the reset input R of flip-flop circuit 704.

In response to the fourth position data word received by serial-to-parallel converter 308 ("ready" signal 4), the fourth $\overline{MEMWR}$ signal is produced by NAND gate 714 (FIG. 9F) thereby returning flip-flop circuits 716 and 718 to their respective reset [00] states. The circuitry of FIG. 7 thus is in condition to respond to the next address word received by serial-to-parallel converter 308 to produce an "enable" signal followed by one or more $\overline{\text{MEMWR}}$ pulses in response to one or more succeeding data words. It is appreciated that such data words may be constituted by a single indicator data word preceded by an address word or a predetermined number (assumed herein to be four) position data words preceded by a single address word. Such position data words may be transmitted from the CPU or may be derived from the VTR's, as discussed above. In the latter circumstance, such position data words are supplied to serial-to-parallel converter from gating circuit 415 (FIG. 4A). Thus, the circuitry illustrated in FIG. 7 serves to control address latch circuit 426 and RAM 424 to write indicator and position data words into correct addressed locations.

Control Circuit for Multiplexer 406

It is recalled that multiplexer 406 is controlled by a multiplex control signal applied to lead 410 (FIG. 4A) to select for transmission therethrough the signals applied either to inputs A or inputs B. Normally, inputs B are selected. However, when position data is derived from the VTR's, then the address word therefor must be transmitted to address latch circuit 426, and this address word is applied to inputs A of multiplexer 406. The circuit illustrated in FIG. 10 is adapted to control the selection of the inputs of this multiplexer and, moreover, to control gating circuit 415.

The multiplexer control circuit shown in FIG. 10 is comprised of a set-reset (R/S) flip-flop circuit 1004, clocked flip-flop circuits 1010, 1016 and 1026, AND gates 1003, 1012 and 1014, NAND gates 1018 and 1020 and NOR gate 1024. Gating circuit 415 is comprised of a tape data latch circuit 1028, such as a Model LS173 4-bit latch circuit, and gates 1030. The set input S of R/S flip-flop circuit 1004 is connected to an OR gate 100 and is adapted to receive a set signal when the CPU is or is about to transmit data. The other input of OR gate 1002 is connected to the output of NOR gate 1024, the purpose of which will become apparent from the description set out below.

The signal provided at the output of NOR gate 1024 is used as the multiplexer control signal and is applied to lead 410 via an inverter 1032. It will be appreciated that the multiplexer control signal is a binary "1" when signals, referred to as $\overline{\text{DORQ 0}}$ and $\overline{\text{DORQ 1}}$ both are binary 1's; and the multiplexer control signal is a binary "0" when either of the $\overline{\text{DORQ 0}}$ and $\overline{\text{DORQ 1}}$ signals is a binary "0". Multiplexer 406 is adapted to select its B inputs for the transmission of data supplied thereto when the multiplexer control signal is a binary "1" and to select its A inputs when the multiplexer control signal is a binary "0". The reset input R of R/S flip-flop circuit 1004 is connected to an AND gate 1003 which is adapted to receive a binary "1" when the CPU is neither transmitting nor is about to transmit data, and also is adapted to receive the binary "1" supplied by buffer 416 to lead 418 when the contents of this buffer are "empty". Thus, when buffer 416 is in condition to receive data and the CPU is not transmitting such data, AND gate 1003 resets flip-flog circuit 1004.

Clocked flip-flop circuit 1010 has its data input D connected to its $\overline{Q}$ output and, thus, is adapted to change its state, or "toggle", in response to each positive transition supplied to its clock input CK. This clock input CK is connected to the $\overline{Q}$ output of flip-flop circuit 1026. The Q and $\overline{Q}$ outputs of flip-flop circuit 1010 are connected to respective inputs of AND gates 1012 and 1014, the other inputs of which are connected in common via an inverter 1016 to the Q output of flip-flop circuit 1004. AND gate 1012 is adapted to produce a signal, referred to herein as the DISPRQ 0 signal, for the duration that flip-flop circuit 1004 is reset, provided that flip-flop circuit 1010 is set. AND gate 1014 is adapted to produce the signal DISPRQ 1 for the duration that flip-flop circuit 1004 is reset, provided that flip-flop circuit 1010 also is reset. The DISPRQ 0 and DISPRQ 1 signals are adapted to be supplied to apparatus which is used to transmit the position data derived from the VTR's to gating circuit 415. Such apparatus is described in greater detail in copending application Ser. Nos. 139,748 and 139,702 filed Apr. 11, 1980. These DISPRQ signals represent that buffer 416 is in condition to receive such position data.

It is assumed, for the purpose of the present discussion, that the DISPRQ 0 signal enables the aforementioned apparatus to transmit position data derived from the recording VTR; and that the DISPRQ 1 signal is adapted to condition that apparatus to transmit the position data that is derived from the playback VTR. It is appreciated that the position data derived from the playback and recording VTR's are to be stored in different locations in RAM 424. These memory locations are defined by respective pre-set addresses generated by pre-set address generator 408 (FIG. 4A). To distinguish between the memory location associated with the playback and recording VTR's, the signal produced at the Q output of flip-flop circuit 1010 is supplied to pre-set address generator 408 to be included in the pre-set address word generated thereby. Thus, when the Q output of flip-flop circuit 1010 is a binary "1", the pre-set address identifies a memory location in RAM 424 in which position data derived from the recording VTR is stored. Conversely, when the Q output of this flip-flop circuit is a binary "0", pre-set address generator 408 is actuated to supply the A inputs of multiplexer 406 with the address identifying the location in RAM 424 in which the position data derived from the playback VTR is stored.

The aforementioned apparatus, when provided with position data derived from the playback and recording VTR's, responds to the DISPRQ 0 and DISPRQ 1 signals to supply acknowledgement signals to the apparatus illustrated in FIG. 10. More particularly, such apparatus supplies the $\overline{\text{DORQ 0}}$ signal to one input of NOR gate 1024 when position data derived from the recording VTR is available to be stored in RAM 424. When position data derived from the playback VTR is available for storage, such apparatus supplies the $\overline{\text{DORQ 1}}$ signal to the other input of NOR gate 1024. The output of this NOR gate is connected to the reset inputs R of clocked flip-flop circuits 1016 and 1026.

The clock input CK of flip-flop circuit 1016 is connected to receive a clock signal DISPCK which is synchronized with the timing signals used by the aforementioned apparatus in providing position data derived from the playback and recording VTR's. Normally, when such apparatus is not active, the DISPCK clock signal is at a relatively high level. The $\overline{Q}$ output of this flip-flop circuit is connected to the data input D thereof, such that flip-flop circuit 1016 changes state, or toggles, in response to, for example, the positive-going edge of each DISPCK clock signal. In addition, this $\overline{Q}$ output is connected to one input of NAND gate 1020 and the Q output of this flip-flop circuit is connected to an input of NAND gate 1018. The other inputs of NAND gates 1018 and 1020 are connected in common to receive the DISPCK signal via an inverter 1022.

The output of NAND gate 1020 is connected to the clock input CK of flip-flop circuit 1026. The data input D of this flip-flop circuit is connected to a source of positive potential, corresponding to a binary "1", such that flip-flop circuit 1026 is triggered to its set state in response to the positive transition, for example, in the signal produced by NAND gate 1020, provided that the binary "0" reset signal is not applied to the reset input R thereof. The signal produced at the Q output of flip-flop circuit 1026 is supplied to multiplexer 406 to disable the operation thereof. That is, in response to this disable signal, neither the data provided at the A inputs nor the data provided at the B inputs of this multiplexer are transmitted therethrough. In the "disable" mode, the outputs of multiplexer 406 present a high impedance so as not to affect other circuitry connected thereto.

The position data derived from the playback and recording VTR's are provided in the form of successive 4-bit characters. The purpose of tape data latch circuit 1028 and gate 1030 is to store the first 4-bit character until the next-following 4-bit character is received, and then to transmit both characters as a single 8-bit word. It is appreciated that each 4-bit character represents a decimal digit of the position data. Tape data latch circuit 1028 is supplied with the 4-bit character derived from the VTR's and is adapted to temporarily store this character until the next-following 4-bit character is transmitted. To this effect, tape data latch circuit 1028 includes a clock input connected to receive the output of NAND gate 1018 as a clock signal, and a gate input connected to receive the signal provided at the $\overline{Q}$ output of flip-flop circuit 1026 as an enable, or gating circuit. Gates 1030 include a similar gating, or enable input connected to the $\overline{Q}$ output of flip-flop circuit 1026.

The manner in which the control circuit illustrated in FIG. 10 functions to control multiplexer 406 and to control gating circuit 415 now will be described with reference to the timing diagrams illustrated in FIGS. 11A–11L. Normally, the $\overline{DORQ\ 0}$ and $\overline{DORQ\ 1}$ signals exhibit their relatively high levels, and each is a binary "1", as shown in FIGS. 11G and 11H. Consequently, the signal supplied to the reset input R of flip-flop circuits 1016 and 1026 is a binary "0" so as to maintain these flip-flop circuits in their respective reset states. The DISPCK clock signal supplied to the clock input CK of flip-flop circuit 1016 normally is at a high level and has no affect upon this flip-flop circuit, as shown in FIG. 11I. Since flip-flop circuit 1016 is maintained in its reset state, NAND gate 1020 is conditioned to apply "clock" signals (FIG. 11L) to the CK input of flip-flop circuit 1026. However, since flip-flop circuit 1026 also is maintained in its reset state (FIG. 11K), the "enable" signal is not applied to the tape data latch circuit or to gates 1030. These circuits thus remain inoperative.

Let it be assumed that the CPU is neither transmitting data nor is it about to transmit data. OR gate 1002 thus is supplied with a binary "0" at each of its inputs. Let it be further assumed that the contents of buffer 416 are "empty", resulting in a binary "1" supplied from this buffer to AND gate 1003 via lead 418. The fact that the CPU is not transmitting data is represented by a binary "1" which is applied to the other input of AND gate 1003, resulting in the resetting of flip-flop circuit 1004, as shown in FIG. 11C. The Q output of this flip-flop circuit is provided with a binary "0", which is inverted by inverter 1006 so as to condition AND gates 1012 and 1014.

Let it also be assumed that flip-flop circuit 1010 exhibits its set state, to produce a binary "1" at its Q output, as shown in FIG. 11D. This binary "1" is supplied to pre-set address generator 408 to establish a pre-set address in RAM 424, corresponding to the location in which position data of the recording tape is stored. Also, this binary "1" is supplied to AND gate 1012. AND gate 1012 now is supplied with a binary "1" at each input thereof so as to produce the DISPRQ 0 signal shown in FIG. 11E.

The DISPRQ 0 signal is supplied to apparatus from which the time code addresses read from the recording tape also are supplied. This apparatus, described in greater detail in the aforementioned copending applications, returns a binary "0" $\overline{DORQ\ 0}$ signal, shown in FIG. 11G, if position data from the playback tape is available for storage in RAM 424. This negative transition actuates the circuitry shown in FIG. 10 to transfer such time code addresses to the RAM. In response to this negative transition in the $\overline{DORQ\ 0}$ signal, NOR gate 1024 supplies a binary "1" to the reset input of each of flip-flop circuits 1016 and 1026, thereby enabling these flip-flop circuits to be toggled by positive transitions applied to their respective clock inputs CK. Also, after a suitable delay (not shown), the binary "1" produced by NOR gate 1024 sets flip-flop circuit 1004, as shown in FIG. 11C, thereby disabling AND gates 1012 (FIG. 11E) and 1014. Furthermore, the binary "1" output of NOR gate 1024 is inverted by inverter 1032 (FIG. 11B) to operate multiplexer 406 (FIG. 4A) to transfer the signals provided at its A input to buffer 416. Thus, for the duration of the negative pulse shown in FIG. 11B, the preset address generated by pre-set address generator 408 is transferred by multiplexer 406 to be supplied to address latch circuit 426. In this manner, the address word supplied to RAM 424 identifies the storage location therein in which position data derived from the recording tape is to be stored.

The first positive transition in the DISPCK clock signal (FIG. 11A) following the occurrence of the $\overline{DORQ\ 0}$ signal toggles flip-flop circuit 1016 to its set state. Hence, the Q output thereof is supplied with a binary "1" as shown in FIG. 11I. It is appreciated that this flip-flop circuit continues to toggle in response to each successive positive transition in the DISPCK clock signal supplied thereto, provided NOR gate 1024 applies a binary "1" to its reset input R. Thus, NAND gates 1018 and 1020 are alternately enabled by the setting and resetting of the flip-flop circuit 1016. When NAND gate 1020 is enabled, each negative half-cycle in the DISPCK clock signal is supplied to the clock input CK of flip-flop circuit 1026, as shown in FIG. 11L. It is recalled that, at the beginning of the operation described herein, flip-flop circuit 1026 exhibits its reset state. When the binary "0" reset signal applied to its reset input R by NOR gate 1024 terminates, the first positive transition in the pulses supplied to flip-flop circuit 1026 by NAND gate 1020 toggles this flip-flop circuit to its set state. Consequently, the Q output of this flip-flop circuit is provided with a binary "1" (FIG. 11K) to disable multiplexer 406. That is, when flip-flop circuit 1026 is set, the outputs of multiplexer 406 exhibit a relatively high impedance, and neither its A nor its B inputs are selected. It is appreciated that, in the absence of this disabling signal produced by flip-flop circuit 1026, the A inputs of the multiplexer would have been selected.

The binary "1" provided at the Q outputs of flip-flop circuit 1026 triggers flip-flop circuit 1010 to its reset state, as shown in FIG. 11D. This conditions AND gate 1014 to transmit the DISPRQ 1 signal when flip-flop 1004 next is reset.

Also, the binary "0" at the $\overline{Q}$ output of flip-flop circuit 1026 serves as the "enable" signal for tape data latch circuit 1028 and gates 1030. The duration of this "enable" signal is determined by the duration of the $\overline{DORQ\ 0}$ signal, shown in FIG. 11G. During this duration, the "clock" signal produced by NAND gate 1018 and supplied to tape data latch circuit 1028 serves to clock the time code addresses derived from the recording VTR into this tape data latch circuit. As an example, the 4-bit signal representing one decimal digit of the position data is clocked into tape data latch circuit in response to the positive transition of this "clock" signal, whereby this 4-bit signal is temporarily stored. At the next-following positive transition in this "clock" signal, the 4-bit signal stored in tape data latch circuit 1028 is read out therefrom concurrently with the receipt of the next 4-bit signal derived from the playback VTR and representing the next decimal digit of the time code address. This next 4-bit signal also is supplied to and gated through gates 1030, whereby an 8-bit data word, formed of the first and second 4-bit digital signals, is supplied from tape data latch circuit 1028 and gates 1030 to buffer 416. It is appreciated that this position data word next is transmitted from buffer 416 to be written into RAM 424 at the address previously generated by pre-set address generator 408 and now stored in address latch circuit 426, in a manner similar to that set out in detail hereinabove with respect to FIGS. 4A and 4B.

At the termination of the $\overline{DORQ\ 0}$ signal (FIG. 11G), flip-flop circuits 1016 and 1026 are reset (FIGS. 11I and 11K), thereby restoring the circuitry illustrated in FIG. 10 to its initial condition, except that now, flip-flop circuit 1010 remains in its reset state, as shown in FIG. 11D.

When the contents of buffer 416 are "empty", flip-flop circuit 1004 is reset once again, as shown in FIG. 11C, and the aforedescribed operation is repeated. Since flip-flop circuit now is reset (FIG. 11D), AND gate 1014 is enabled to produce the DISPRQ 1 signal shown in FIG. 11F.

This DISPRQ 1 signal is received by the apparatus which derives time code addresses from the playback VTR and, if such a time code address is available for storage in RAM 424, such apparatus returns the $\overline{DORQ\ 1}$ signal to NOR gate 1024, as shown in FIG. 11H. The remaining circuitry illustrated in FIG. 10 responds to this $\overline{DORQ\ 1}$ signal in the same manner as it had responded to the $\overline{DORQ\ 0}$ signal, discussed above. Hence, the "enable" signal produced at the $\overline{Q}$ output of flip-flop circuit 1026 remains for the duration of the $\overline{DORQ\ 1}$ signal, and the "clock" signal produced by NAND gate 1018 is as shown in FIG. 11J. The pre-set address generated by pre-set address generator 408 to identify the location in RAM 424 in which position data derived from the recording VTR is to be stored is transferred from the A inputs of multiplexer 406 to address latch circuit 426. Then, after RAM 424 is supplied with the appropriate address, the next-following 4-bit digital signal, representing one decimal digit of the position data derived from the recording tape is clocked into tape data latch circuit 1028, and this 4-bit digital signal is read-out therefrom in concurrence with the next-following 4-bit digital signal which is gated by gates 1030. Accordingly, the resultant 8-bit position data word, which represents two decimal digits of the recording tape time code address, is transferred to buffer 416 and thence to RAM 424 whereat it is stored in the addressed location.

It is appreciated that flip-flop circuit 1004 is reset when the CPU is not transmitting data and when buffer 416 is in condition to receive data. The resetting of this flip-flop circuit is used to apprise the apparatus from which time code addresses are derived from the playback and recording VTR's to transmit such time code addresses sequentially by digit. First the time code address derived from the recording tape is received and the time code address derived from the playback tape is received. Such time code addresses are transferred to RAM 424 in the form of successive position data words, each position data word being constituted by two 4-bit digital signals, each such 4-bit digital signal representing a respective time code address digit. The addresses supplied to RAM 424 during this mode of operation are derived from pre-set address generator 408. More particularly, the position data words derived from the playback tape are supplied to RAM 424 are preceded by the pre-set address word derived from pre-set address generator 408 to identify the first memory location into which the first position data word is stored. This address word, which is stored in address latch circuit 426, includes the aforedescribed control bit representing that this word is associated with position data. As mentioned above, this control bit controls the operation of counting circuit 432 and memory write generator 434, whereby the address word stored in the address latch circuit is incremented by one count after each playback tape position data word is written into the RAM. After all of the position data words derived from the recording tape have been written into respective addresses in RAM 424, this operation is repeated so as to write position data words derived from the playback tape into the RAM. As before, preceding the first position data word, pre-set address generator 408 supplies the pre-set address word, associated with the first storage location, to address latch circuit 426, this address word also containing the control bit that is supplied to counting circuit 432 via lead 436. After each position data word derived from the recording tape then is written into RAM 424, tha address word stored in address latch circuit 426 is incremented by one count.

Thus, position data derived from the playback and recording tapes automatically are written into predetermined address locations in RAM 424 in the absence of specific control by the CPU. Of course, this operation is not carried out when the CPU transmits or is about to transmit data to the RAM.

CPU Controls

Figure 12A:
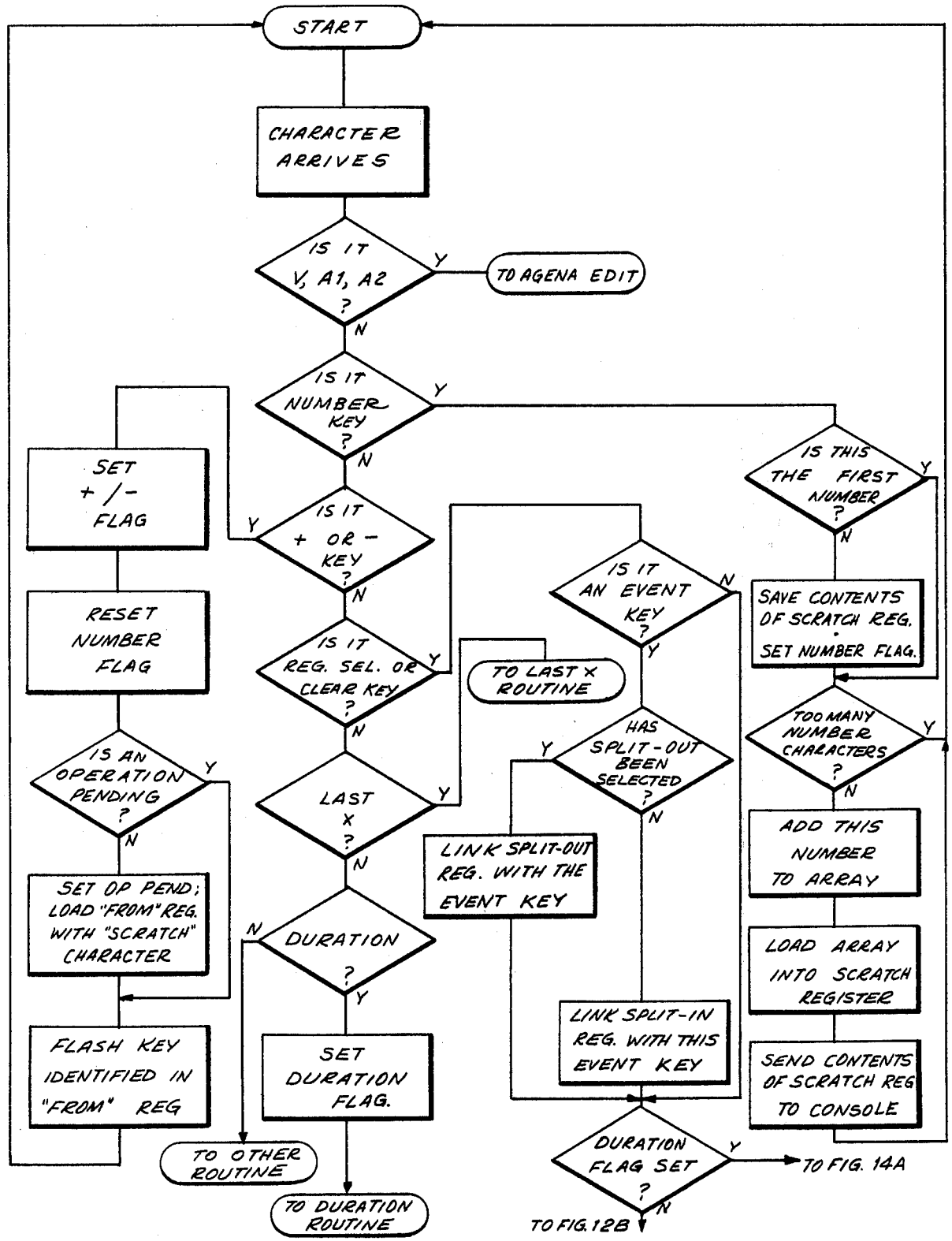
FIGS. 12A–12C are flow charts which are useful in understanding one type of operation of the central processing unit.
Figure 12B:
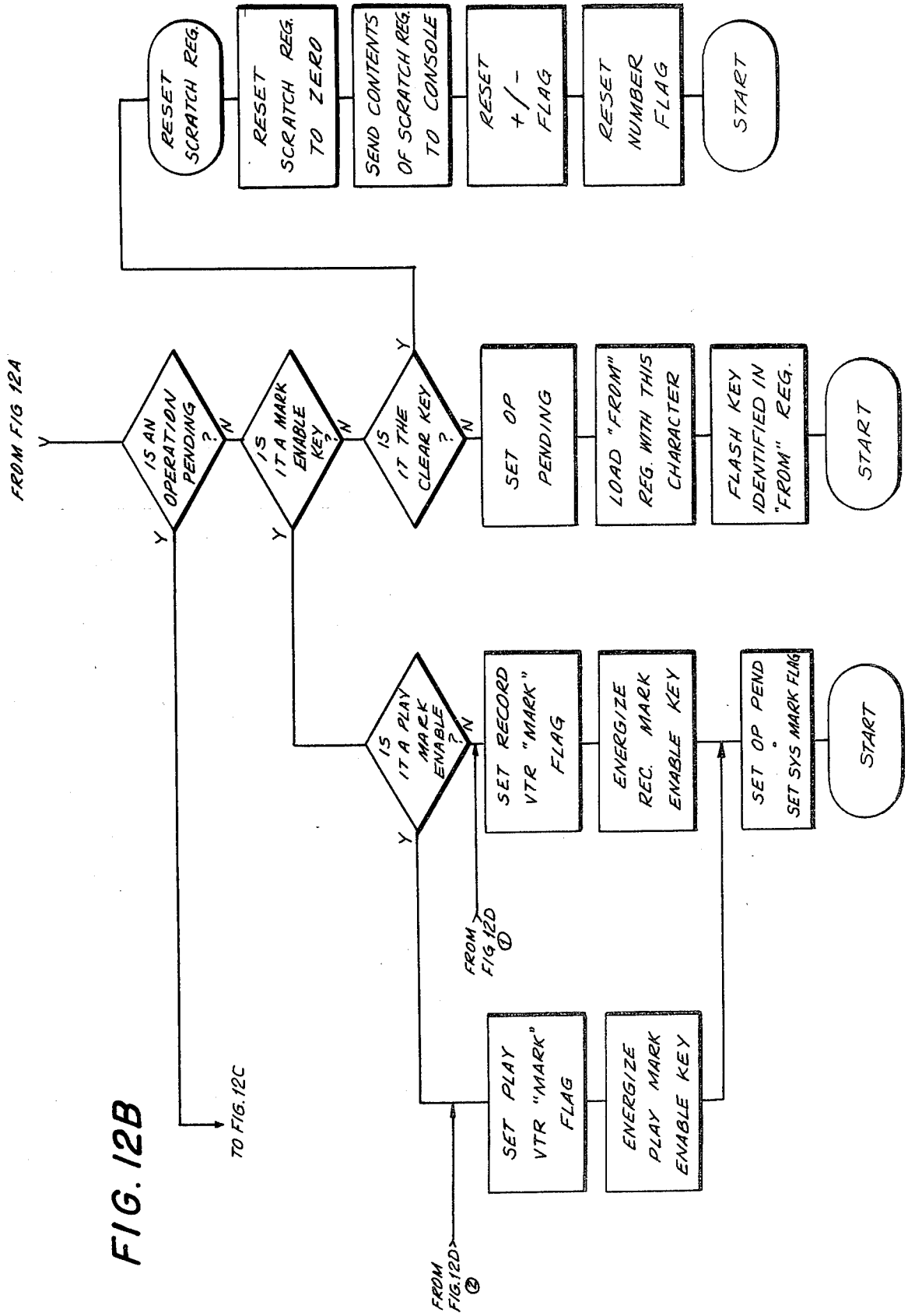
Figure 12C:
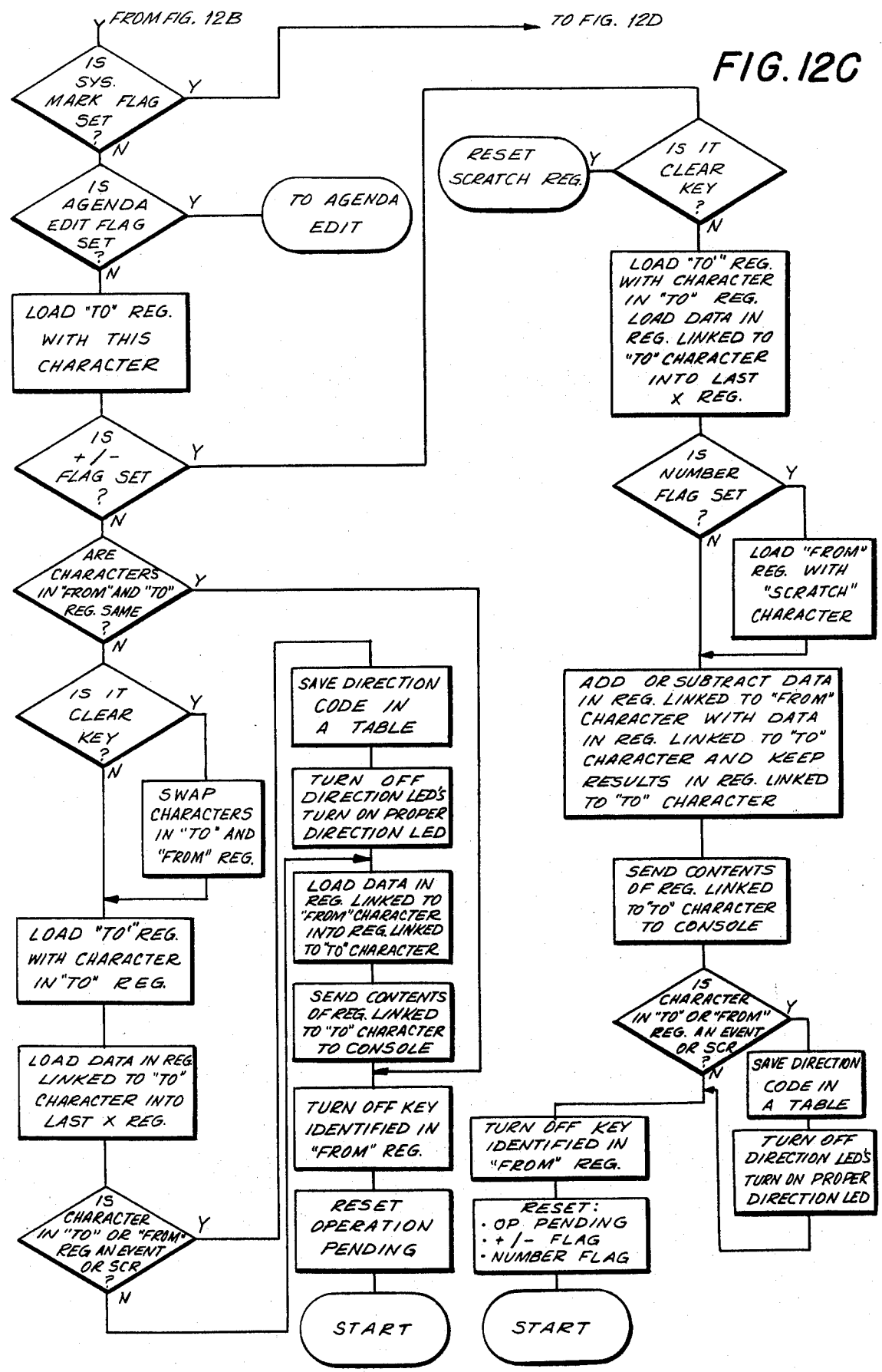
Figure 12D:
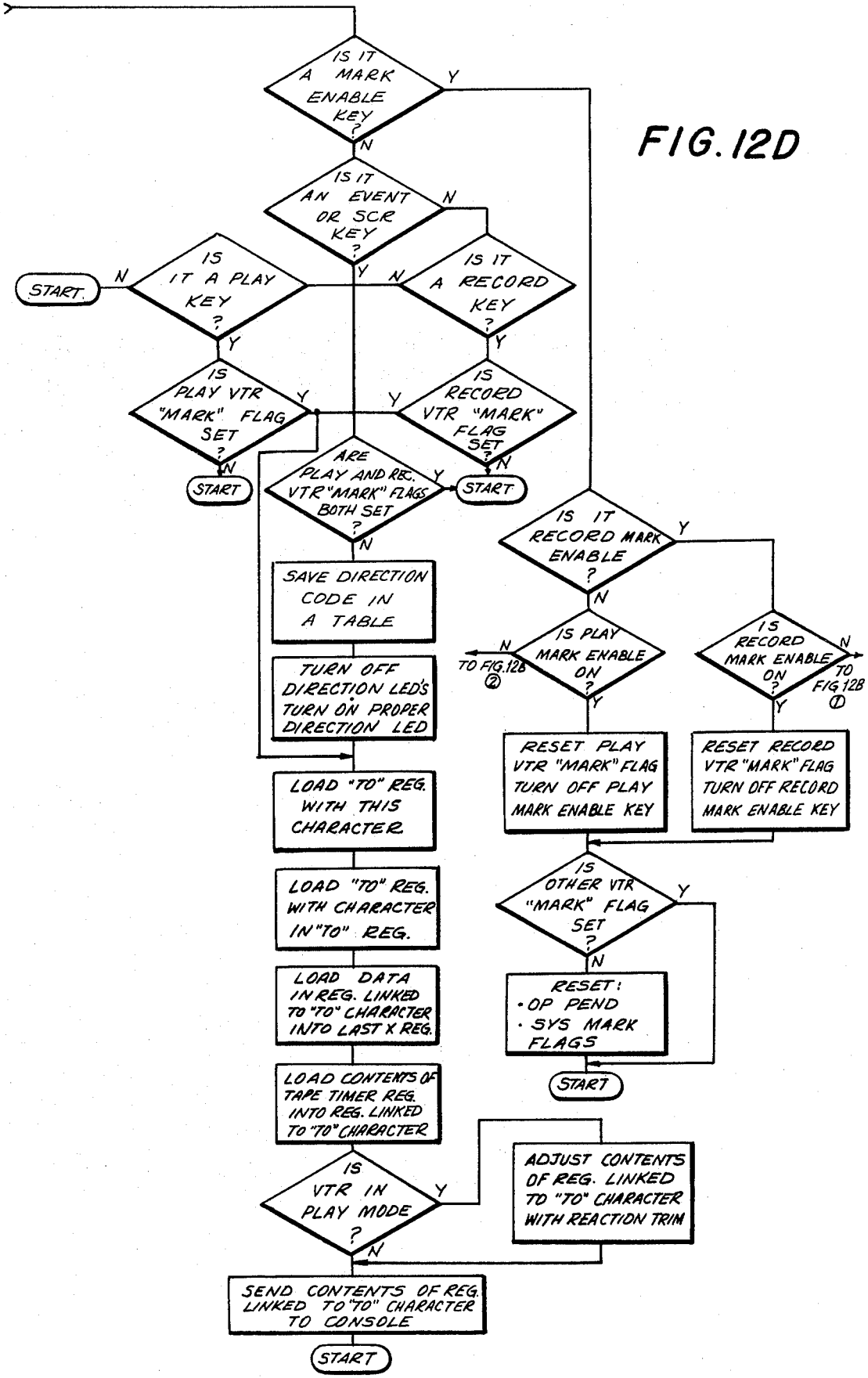

Referring now to FIGS. 12A-12C, there is illustrated a flow chart of the programmed routine carried out by the CPU to control the data which is transmitted therefrom to RAM 424 and thereby control the indications and displays provided on console 10. In the illustrated flow chart, the CPU functions to distinguish between the operation of the agenda-edit control switches (V, A-1 and A-2), the numerical keys provided on keyboard 150, the arithmetic operation control keys ("+" and "—") and the various selector switches associated with display registers.

The flow chart shown in FIGS. 12A-12C will be explained in conjuction with particular operations of the switches provided on console 10. The CPU awaits the arrival of a character representing the operation of a particular switch. If any of the agenda-edit selector switches (V, A-1 or A-2) is operated, an agenda-edit routine, disclosed in copending application Ser. No. 139,448 filed Apr. 11, 1980 is carried out. Let it be assumed, for the present example, that mark enable switch 60 is operated. Hence, on arrival of the character which represents this mark enable switch, transmitted to the CPU by the apparatus disclosed above with respect to FIG. 3, the CPU determines that this character is not an agenda-edit selector switch, it is not a numerical switch, it is not an arithmetic operation switch but is is a register selector switch. The next inquiry is whether this selector switch is the EVENT-1 or EVENT-2 switch. Since it is neither of these switches, the next inquiry is whether the "duration" flag has been set. This flag is set if the character represents the DURATION switch, as will be explained below. In the present case, this inquiry is answered in the negative, and the routine proceeds to inquire if an operation is pending (FIG. 12B). This inquiry is made to determine whether a selector switch has been operated previously or whether this character represents a source switch.

Since an operation is not pending, the next inquiry is whether this character represents that a mark enable switch has been operated as a source switch. In accordance with the present example, it is assumed that this character is a mark enable switch and, moreover, that it is the mark enable switch provided in the playback seciton. Concequently, a "mark" flag associated with mark enable switch 60 is energized. This latter operation is identified as the instruction "energize play mark enable key". That is, the CPU now transmits to the apparatus illustrated in FIGS. 4A and 4B an address word to identify the location in RAM 424 in which the indicator word associated with mark enable switch 60 is stored, this address word being followed by an indicator data word which, when read out of the RAM, causes the indicator associated with mark enable switch 60 to be turned on. The particular indicator word and circuitry which is used to energize this indicator has been discussed above.

In addition to energizing the indicator associated with mark enable switch 60, the operation pending flag is set and the "system mark" flag also is set. The CPU then returns to its START condition awaiting the arrival of the next-follwing character.

Let it be assumed that the operator now operates edit-in switch 52. It is recalled that this operation is carried out in order to transfer the position data displayed in tape timer register 58 to IN register 50. Operation of edit-in switch 52 results in the transmission of the coded representation thereof by the apparatus discussed above with respect to FIG. 3. The CPU receives this character and determines that it is not an agenda-edit selector switch, it is not a numerical switch, it is not an arithmetic operation switch but it is a register selector switch. The CPU further determines that this register selector switch is not an EVENT switch. Since the "duration" flag is not set, the next-following inquiry, which is answered in the affirmative, is whether an operation is pending. It is recalled that the operation pending flag had been set, thus indicating that an operation is pending. It also is recalled that the "system mark" flag had been set. Hence, in accordance with this routine, the next inquiry is whether the character representing the operation of the register selector switch represents a mark enable switch. In accordance with this example, the received character does not represent a mark enable switch. Furthermore, the next inquiry as to whether this character represents an EVENT or SCRX switch also is answered in the negative.

The next-following instruction inquires as to whether the received character represents the operation of a switch in the record section of console 10 (e.g. edit-in switch 82, edit-out switch 86, and the like). In the present example, it is assumed that the received character represents a switch in the play section. Hence, this inquiry is answered in the negative, but the next-following inquiry as to whether this character represents a "play" switch is answered in the affirmative. Also, the next inquiry in the routine, has the playback VTR "mark" flag been set, is answered in the affirmative.

Although not shown specifically herein, the CPU is provided with a separate destination storage register, which may be a particular location in a separate random access memory associated with the CPU, designated as the "TO" register. Since it is determined tha the incoming character represents a selector switch associated with a particular display register, this character (assumed herein to represent edit-in switch 52) is loaded into, or temporarily stored in, the "TO" register.

It is recalled that the editing apparatus of the present invention allows the operator to recall the immediately preceding contents of a particular display register. That is, the contents of a display register that had preceded the last data transfer operation may be recalled, as by operating LAST X switch 154 (FIG. 1). In accordance with the routine illustrated in FIGS. 12A-12C, in order to recall this preceding data, the contents of the display register associated with the selector switch whose representation is stored in the "TO" register must be stored in a separate register. To this effect, the CPU is provided with a "TO'" register, and the character which has been loaded into the "TO" register also is loaded into the "TO'" register. Furthermore, the CPU is provided with a "LAST X" register capable of storing position data therein.

As mentioned above, the CPU is provided with a storage device, such as a random access memory, that is, essentially, a duplicate of RAM 424. That is, the data stored in particular addressed locations in RAM 424 also are stored in, or "copied" into the CPU memory. This means that the position data which is displayed in any display register on console 10 also is stored in a corresponding location in the CPU memory. The position data which is stored in the CPU memory corresponding to the display register which is associated with the selector switch whose character is represented in the "TO'" register now is loaded into the "LAST X" register. In the present example, since edit-in switch 52 has been operated as the destination switch, the character stored in the "TO" register represents this edit-in switch. The "TO'" register now has been loaded with the character representing this edit-in switch. Accordingly, the "LAST X" register is loaded with the position data that had been displayed by IN register 50 prior to this last operation of edit-in switch 52. That is, the position data stored in the CPU memory at a location associated with IN register 50 is loaded into the "LAST X" register.

Now, the new position data which the operator intends to transfer from tape timer register 58 (and which is stored in the CPU memory) into IN register 50 is loaded into that register, or location, of the CPU memory which is linked, or associated, with the character stored in the "TO" register. If the playback VTR is not in its playback mode, the contents of that location in the CPU memory which is associated with the character stored in the "TO" register is transmitted to the apparatus illustrated in FIGS. 4A and 4B. If, however, the VTR is in its playback mode, then the contents of that location in the CPU memory which is associated with the character stored in the "TO" register is adjusted in accordance with the setting of REACTION TRIM switch 36, and this adjusted position data is transmitted from the CPU to the apparatus shown in FIGS. 4A and 4B. This reaction trim adjustment feature has been discussed above. It is appreciated that the data now transmitted by the CPU is constituted by an address word, representing the location in RAM 424 in which the position data displayed by IN register 50 is stored, followed by four successive position data words, these four words representing the two-digit hours information, the two-digit minutes information, the two-digit seconds information and the two-digit frame information. The CPU, after transmitting this position data, which remains stored at the respective locations in the CPU memory, returns to its START condition, awaiting the arrival of the next-following character.

Thus, it is seen that, in response to the operation of a destination selector switch, the CPU loads the "TO" register with the character representing this particular destination switch and, moreover, loads the "LAST X" register with the position data stored in the CPU memory associated with the corresponding destination display register, such that the contents of the "LAST X" register represents the position data that had been displayed previously by this destination register. Then, this location in the CPU memory is supplied with new position data, that is, the position data transferred from the tape timer register, which new position data had been stored in the CPU memory.

Let it be assumed that position data is transferred from, for example, tape timer register 58 to an EVENT register so as to provide an alternate edit-in location, as described above. In accordance with the aforementioned routine, after the mark enable switch had been operated as a source switch, the indicator associated therewith remains energized until the selection of the mark enable switch as a source switch is cleared. This means that the operation pending flag remains set. If, now, EVENT-1 switch 120 is operated, the character representing this EVENT-1 switch arrives at the CPU, and it is determined that this character does not represent an agenda-edit selector switch, nor does it represent a numerical switch, nor does it represent an arithmetic operation switch. Rather, this character is identified as a register selector switch and, moreover, as an EVENT switch. Since this is an EVENT switch, and since it can be operated in conjunction with a split-in or split-out agenda-edit mode, this switch is associated with a "split-in" register and with a "split-out" register. If SPLIT OUT switch 136 is not operated, then the CPU links, or associates, the "SPLIT-IN" register with this character representing the EVENT-1 switch. If SPLIT OUT switch 136 has been operated, then the CPU links the SPLIT-OUT register with this EVENT-1 character. That is, depending upon whether SPLIT OUT switch 136 has been operated, the EVENT-1 character addresses, or is linked with, either the "SPLIT-IN" or the "SPLIT-OUT" register.

Continuing with the routine illustrated in the flow charts of FIGS. 12A–12C, the "duration" flag is not set, an operation is pending (i.e. the operation pending flag remains set), and the "system mark" flag is set. The CPU determines that the received character does not represent a mark enable switch but it does represent an EVENT switch. In response to the next inquiry, it is concluded that the "play VTR mark" and "record VTR mark" flags both are not set. Although both mark enable switch 60 and mark enable switch 90 may be operated as source switches, such an operation is erroneous if an EVENT switch is selected as the destination switch. This is because it cannot be determined if the position data from tape timer register 58 or from tape timer register 88 should be transferred to the associated EVENT register. Thus, if both mark enable switches have been operated as source switches and if an EVENT switch is operated as a destination switch, this operation is ignored, and the CPU returns to its START condition. However, in accordance with the present example, it is assumed that only mark enable switch 60, that is, the play mark enable switch, has been operated as the source switch, and that EVENT-1 switch 120 has been operated as the destination switch.

It is recalled that EVENT register 118 is provided with record (R) and playback (P) indicators. Such indicators are energized to indicate the source (i.e. the recording or playback tape) of the position data. Depending upon the source of this position data, a direction code representing the recording or playback tape is produced when EVENT-1 switch is operated. The CPU is provided with a table to store this direction code when the received character represents an EVENT switch. Thus, by operating EVENT-1 switch 120 as the destination switch, it is appreciated that new position data is to be transferred into associated EVENT register 118. This means that the position data stored in a location in the CPU memory associated with this EVENT register (i.e. the register linked to the EVENT-1 character) is to be updated. As a part of this updating operation, the source, or direction from which this data is transferred, may be changed. In the present instance, position data is to be transferred from tape timer register 58 of the playback section into EVENT register 118. If the position data stored in the location in the CPU memory associated with EVENT register 118 had been transferred thereto from a register disposed in the record section, the direction code will be changed. More particularly, the direction code representing that position data had been transferred from the record section now will be changed to indicate that the position data had been transferred from the playback section. The previous direction code, that is, the data representing that the position data previously stored in EVENT register 118 had been transferred from the record section, is stored in a separate table. Thus, this separate table stores direction data representing whether the position data that had been displayed previously in the EVENT-1 register had been derived from the playback or record section of console 10.

In accordance with the next instruction set out in the flow chart shown in FIG. 12C, and consistent with the present example, the record (R) LED indicator associated with EVENT register 118 is extinguished (because the data now to be displayed by EVENT register 118 is transferred thereto from the playback section) and the playback (P) LED indicator is energized, or turned ON.

Then, the "TO" register is loaded with the character representing the EVENT-1 register, and the "TO'" register also is loaded with the character representing this EVENT-1 register. In accordance with the next step in this routine, the register, or location in the CPU memory, addressed or linked to the character stored in the "TO" register has the contents thereof transferred into the LAST X register. Thus, the position data that had been displayed previously by EVENT register 118 is transferred into the "LAST X" register. Then, the data stored in the CPU memory representing the contents of tape timer register 58 is loaded into that location in the CPU memory which is associated with the EVENT-1 register, i.e., the register associated with the selector switch whose representation is stored in the "TO" register. It is seen that, in the present example, the position data stored in the CPU memory and associated with the EVENT-1 display register is transferred to the "LAST X" register prior to the updating of that position data. Hence, at this time, the "LAST X" register stores the position data which had been displayed previously by EVENT register 118, whereas the location in the CPU memory associated with the EVENT-1 register now stores the tape timer position data which is transferred thereto.

If the playback VTR is in its play mode, the contents of the location in the CPU memory which is linked to the EVENT-1 character stored in the "TO" register is adjusted in accordance with the setting of REACTION TRIM switch 36. If the playback VTR is not in its play mode, this adjustment is not made. In either case, the contents of the location in the CPU memory which is linked to, or associated with, the EVENT-1 character stored in the "TO" register now is transmitted by the CPU to the apparatus illustrated in FIGS. 4A and 4B, whereby this position data is stored in the appropriate locations of RAM 424 to be displayed by EVENT register 118. The CPU then returns to its START condition, awaiting the arrival of the next character.

The foregoing operation is repeated if the mark enable switch in the playback or recording section is operated as the source switch and any of the edit-in, edit-out, EVENT or SCRX switches is operated as the destination switch. When position data is to be transferred into an EVENT or scratchpad register, the direction data which represents the source of the position data prior to such transfer is stored in a separate table. It will be appreciated that, by storing this direction data, the parameters of a preceding edit operation, or the preceding position data which had been displayed by that register, may be reconstructed easily and accurately.

Let it be assumed that the record mark enable switch 90 is operated as the source switch. Upon arrival at the CPU of the character representing this record mark enable switch, the CPU determines that this character is not an agenda-edit selector switch, nor is it a numerical switch or an arithmetic operation switch. This character is detected as a register selector switch and, proceeding with the illustrated flow chart, it is determined that this character is not an EVENT switch. Also, the "duration" flag is not set. Since it has been assumed that record mark enable switch 90 is operated as a source switch, it is recongnized that an operation is not pending. It is concluded, therefore, that this character represents a mark enable switch, and, specifically, that it represents a record mark enable switch. Hence, the "record VTR mark" flag is set, the indicator associated with mark enable switch 90 is energized, and the operation pending flag and "system mark" flag both are set. The CPU then returns to its START condition awaiting the arrival of the next character.

It is assumed that the next character represents the play mark enable switch 60. It is appreciated that this character is identified as a register selector switch, that it is not an EVENT switch, that the "duration"flag is not set, and that an operation is pending and, moreover, that the "system mark" flat is set. The inquiry as to whether this character represents a mark enable switch is answered in the affirmative and, moreover, that this character does not represent a record mark enable switch. Following the routine set out in the flow chart of FIG. 12C, inquiry is made as to whether the "play VTR mark" flag is set. This inquiry is answered in the negative and, as shown in FIG. 12B, the "play VTR mark" flag now is set. Then, the indicator associated with mark enable switch 60 is energized. The "operation pending" and "system mark" flags remain set, and this routine then returns to its START condition.

If, instead of operating the play mark enable switch, the operator had repeated his operation of the record mark enable switch, the answer to the inquiry as to whether the incoming character represents the record mark enable switch would have been answered in the affirmative. Then, according to the flow chart shown in FIG. 12C, since the "record VTR mark" flag has been set, this flag now would be reset and the indicator associated with record mark enable switch 90 would be de-energized. That is, the indication representative of the fact that the record mark enable switch had been operated would be extinguished. Then, since the other "VTR mark" flag had not been set, that is, the "play VTR mark" flag had not been set, the operation pending flag and the "system mark" flag both would be reset. The routine then returns to its START condition, awaiting the arrival of a character from console 10. That is, all of the selector switches and associated indicators now will be reset, or cleared, as if a source switch had not been operated.

Let it be assumed that an operator wishes to transfer position data displayed in EVENT register 118 into IN register 50, but mistakenly operates EVENT-2 switch 128 as the source switch. It is appreciated that, when EVENT-2 switch is operated, the character representing this switch is received by the CPU and is detected as being neither an agenda-edit selector switch, nor a numerical switch, nor an arithmetic operation switch, but as a register selector switch. It is further detected as representing the operation of an EVENT switch and, depending upon whether SPLIT OUT switch 136 had been operated, either the split-in or split-out register (or corresponding location in the CPU memory) is linked or associated with this EVENT character.

The "duration" flag is not set, and since this switch has been operated as a source switch, an operation is not pending. The next inquiry as to whether this character represents a mark enable switch is answered in the negative. It is then determined that this character does not represent the CLEAR switch. Then, in accordance with the flow chart shown in FIG. 12B, the operation pending flag is set and a separate "FROM" register, which may comprise a predetermined location in the CPU memory, is loaded with this character representing the EVENT-2 switch. It may be appreciated that the "FROM" register is similar to the "TO" register and is adapted to store the character representing the source switch. The CPU then transmits an indicator data word, preceded by the appropriate address word, which is effective to flash the indicator associated with EVENT-2 switch 128. That is, the CPU transmits the indicator data word for effecting a flashing indication, which indicator data word is associated with the character then stored in the "FROM" register. It is appreciated that this indicator data word and its preceding address are received by the apparatus discussed above with respect to FIGS. 4A and 4B, and that the indicator data word is stored in the appropriately addressed location in RAM 424. When this location is read out periodically, in the manner discussed above with respect to FIG. 5, the indicator associated with EVENT-2 switch 128 is flashed.

The routine illustrated in FIGS. 12A-12C then returns to its START condition, awaiting the arrival of the next-following character. In the present example, it is assumed that the operator intended to operate EVENT-1 switch 120 as the source switch but, erroneously, has operated EVENT-2 switch 128. This fact is indicated to him by the flashing of the indicator associated with EVENT-2 switch 128. Prior to operating the EVENT-1 switch, this erroneous operation must be cleared. To clear, or extinguish the selection of the EVENT-2 switch as the selected source switch, the operator re-operates this switch. Consequently, the CPU is supplied with the character representing the EVENT-2 switch, and this character is represented as being neither an agenda-edit selector switch, nor a numerical switch, nor an arithmetic operation switch, but as a register selector switch. It is further detected that this character represents an EVENT switch and, depending upon whether SPLIT OUT switch 136 is operated, either the split-in or split-out register is linked, or associated, with this EVENT-2 character. That is, the character representing the EVENT-2 switch is stored either in the split-in register or in the split-out register.

The "duration" flag is not set and the next inquiry as to whether an operation is pending is answered in the affirmative, and the following inquiry as to whether the "system mark" flag has been set is answered in the negative. Furthermore, since the "agenda-edit" flag (described in copending application Ser. No. 139,448 filed Apr. 11, 1980 is not set, the "TO" register is loaded with this EVENT-2 character. The next inquiry, as to whether the arithmetic operation flat is set, is answered in the negative, and then the next-following inquiry as to whether the characters which are stored in the "FROM" and "TO" registers are the same is answered in the affirmative. The CPU then transmits the indicator data word, preceded by the appropriate address word, which serves to de-energize the indicator associated with EVENT-2 switch 128. That is, and in accordance with the flow chart illustrated in FIG. 12C, the indicator associated with the character stored in the "FROM" register is extinguished. Then, the operation pending flag is reset, by clearing the erroneous selection of the EVENT-2 switch as the source switch. The routine then returns to its START condition awaiting the arrival of the next character which, presumably, will be the character which correctly represents the operation of EVENT-1 switch 120. If this switch now is operated, it is appreciated, from the foregoing discussion, that the character representative thereof is recognized as an EVENT character, the operation pending flag is set, the "FROM" register is loaded with this EVENT character and the CPU transmits the indicator data word which, when stored in RAM 424, is effective to flash the indicator associated with EVENT-1 switch 120.

Now it is assumed that the operator operates the record edit-in switch 82 in order to transfer position data from EVENT-1 register 118 into IN register 80. This would establish the transferred position data as the edit-in point for the recording tape, as discussed in detail above.

The character representing the record edit-in switch is received by the CPU and is recognized as being neither an agenda-edit selector switch, nor a numerical switch, nor an arithmetic operation switch, but as a register selector switch. In accordance with the flow chart shown in FIGS. 12A-12C, this character is recognized as not being representative of an EVENT switch. The "duration" flag is not set, and the next-following inquiry as to whether an operation pending is answered in the affirmative. Then, since the "system mark" flag is not set and the agenda edit flag also is not set, the "TO" register is loaded with this character. Thus, the "TO" register now stores the character representing the record edit-in switch.

The following inquiries then are answered in the negative: that the arithmetic operation flag is not set, that the characters tored in the "FROM" and "TO" registers are not the same, and that this character does not represent the CLEAR switch. In view of these negative responses to such inquiries, the "TO'" register is loaded with the character now stored in the "TO" register, i.e. the record edit-in character. Now, the position data which is stored in the location of the CPU memory associated with the character stored in the "TO" register, that is, the position data associated with the record IN register 80 is loaded into the "LAST X" register. It is appreciated that this position data represents the data that had been displayed in display register 80 immediately preceding the data transfer operation then in progress.

The routine then inquires as to whether the character stored in the "TO" or "FROM" registers represents an EVENT or SCRX switch. In the present example, it is assumed that the "FROM" register stores the EVENT-1 character. Consequently, the direction code associated with the position data stored in EVENT-1 register 118 is stored in a separate table. That is, the direction data which represents whether the position data stored in the EVENT-1 register was transferred thereto from the record (R) section or playback (P) section is stored in this table. The next instruction is not significant in the present example. That is, there is no change in the indicator LED's associated with EVENT-1 register 118. Hence, if the record (R) LED indicator had been energized, since there is no change in the source of position data stored in display register 118, the record (R) indicator may be turned off but then is turned on as being a proper direction LED indicator.

The position data stored in the location in the CPU memory which is linked, or associated, with the character in the "FROM" register, that is, the position data stored in the location of the CPU memory which is associated or addressed with the EVENT-1 character stored in the "FROM" register is loaded into the location in the CPU memory that is linked, or associated, with the character stored in the "TO" register. This means that the position data that is stored in the location in the CPU memory addressed by the EVENT-1 character is loaded into that location in the CPU memory which is addressed by the record edit-in character (the character now stored in the "TO" register). This position data now stored in the location in the CPU memory that is linked with the record edit-in character stored in the "TO" register is transmitted to the apparatus shown in FIGS. 4A and 4B, preceded by the appropriate address word, that is, the word identifying the location in RAM 424 into which this position data is written. Then, the CPU transmits the indicator data word which is effective to extinguish, or de-energize, the indicator associated with EVENT-1 switch 120. Finally, the operation pending flag is reset and the routine returns to its START condition awaiting the arrival of the next character.

It is appreciated that the position data words and indicator data words which are transmitted by the CPU to the apparatus illustrated in FIGS. 4A and 4B are stored in the appropriate locations in RAM 424. Accordingly, when the contents of RAM 424 are read out by the apparatus shown in FIG. 5, the indicator associated with EVENT-1 switch 120 no longer is flashed; and the data displayed in record IN register 80 is the position data which has been transferred from EVENT-1 register 118. The position data now displayed in IN register 80 represents the record edit-in location.

It now should be readily apparent that data may be transferred from any display register to any other display register, as desired, merely by operating the selector switch associated with the source register followed by the selector switch associated with the destination register. If an error is made, that is, if a particular selector switch has been operated erroneously as the source switch, this error may be corrected, or cleared, merely by re-operating the very same selector switch.

Let it now be assumed that an operator wishes to adjust the position data in a particular display register by a desired amount. This amount is entered into scratchpad register 142 in the following manner:

The operator operates various ones of the numerical keys of keyboard 150. As each key is operated, the character representative thereof arrives at the CPU. The illustrated routine determines that this character does not represent an agenda-edit selector switch but is a numerical switch. If this is the first digit, that is, the first numerical switch which has been operated, the inquiry is made as to whether too many characters have been selected, for example, whether more than eight characters have been selected. Of course, in the present example, it is assumed that the received character is the first numerical character and, therefore, this inquiry is answered in the negative. The character then is added to a numerical array which forms the multi-digit character in accordance with the operation of keyboard 150. The array of characters is loaded into a "SCRATCH" register, which may be a separate location in the CPU memory, and the contents of this "SCRATCH" register are transmitted to the apparatus illustrated in FIGS. 4A and 4B for storage in RAM 424. As the contents of the RAM are read out in the manner discussed above with respect to FIG. 5, the numerical array which is formed by the operation of keyboard 150 is displayed on scratchpad register 142.

It may be appreciated that, as the operator adds successive digits to the numerical array, the resultant multi-digit number is displayed in the scratchpad register and, additionally, is stored in the "SCRATCH" register. If the operator selects a greater number of numerical keys than can be accommodated by scratchpad register 142, that is, if too many characters have been selected, such additional characters are not added to the numerical array, are not stored in the "SCRATCH" register, are not displayed by scratchpad register 142, and the routine returns to its START condition.

Let it be assumed that the multi-digit number, or numerical array, displayed by scratchpad register 142 is to be added to the position data displayed in play IN register 50. The operator then actuates "+" switch 158, and a character representative of this arithmetic operation switch is transmitted to the CPU. The CPU, in accordance with the illustrated flow chart, determines that this character does not represent an agenda-edit selector switch nor does it represent a numerical switch. Rather, it is identified as an arithmetic operation switch and the arithmetic operation (referred to herein as the "+/−") flag is set. The number flag, which had been set in response to the second and subsequent numerical characters transmitted to the CPU in response to the operation of the numerical switches of keyboard 150, then is reset. The inquiry as to whether an operation is pending is answered in the negative, and then the operation pending flag is set and the "FROM" register is loaded with the character representing the SCRX switch. Then, the indicator associated with the character stored in the "FROM" register, that is, the indicator associated with the SCRX character stored in the "FROM" register is flashed. This is achieved by transmitting the indicator data word representing the flashing of this indicator to the apparatus illustrated in FIGS. 4A and 4B. This indicator data word, which is preceded by the appropriate address word, is stored in that location in RAM 424 which, when the contents of the RAM are read out, serves to energize the indicator associated with the SCRX switch in a flashing manner, as described above. Thus, the operator is apprised that the scratchpad register has been designated as the source register once an arithmetic operation switch has been actuated.

In the present example, it is assumed that the numerical data displayed by scratchpad register 142 is to be added to the position data displayed by play IN register 50. Accordingly, the operator now operates edit-in switch 52. The character representing this edit-in switch is received by the CPU and is identified as a register selector switch. According to the routine represented by the flow charts shown in FIGS. 12A–12C, this character is recognized as not being representative of an EVENT switch and, since the "duration" flag is not set, and since the operation pending flag has been set but the "system mark" flag has not been set, nor has the agenda-edit flag been set, this edit-in character is loaded into the "TO" register.

The inquiry as to whether the "+/−" flag has been set is answered in the affirmative. It is recognized that the character stored in the "TO" register is not representative of the CLEAR switch. Accordingly, the "TO" register is loaded with the character then stored in the "TO" register (i.e. the play edit-in character) and the position data which is stored in the location in the CPU memory that is linked, or associated with the character stored in the "TO" register (i.e. the position data stored in the CPU memory which is addressed by the play edit-in character stored in the "TO" register) is transferred into the "LAST X" register. Hence, as is appreciated, the "LAST X" register stores the position data which have been transferred to play IN register 50 in the last data transfer operation thereto.

The inquiry as to whether the number flag has been set is answered in the negative. Then, the numerical data which is stored in that location in the CPU memory which is linked with the character stored in the "FROM" register, that is, the numerical data stored in the "SCRATCH" register (the "FROM" register had been loaded with the character representing the SCRX switch) is added to the position data which is stored in that location in the CPU memory linked to the character (i.e. the play edit-in character) stored in the "TO" register. The result of this summation is maintained in that location in the CPU memory which is linked to the character stored in the "TO" register. Then, the contents of this location in the CPU memory is transmitted to the apparatus of FIGS. 4A and 4B, preceded by the appropriate address, for storage in RAM 424 at those locations associated with play IN register 50. It is, therefore, seen that when the contents of the RAM are read out therefrom, IN register 50 will be energized to display the summed data, that is, the position data which had been displayed therein previously summed with the numerical data that had been displayed in scratchpad register 142.

After the CPU transmits the summed data stored in that location of the CPU memory which is linked to the play edit-in character stored in the "TO" register, the indicator associated with the SCRX switch (i.e. the indicator associated with that switch which is represented by the character stored in the "FROM") register is extinguished. Then, the operation pending, "+/—" and number flags all are reset. The illustrated routine then is returned to its START condition, awaiting the arrival of the next character.

It is seen that, prior to extinguishing the indicator associated with the switch whose character is identified in the "FROM" register, the inquiry is made as to whether any character which is stored in the "TO" or "FROM" registers is an EVENT or SCRX character. If so, then the direction code (i.e. the code representing that the position data displayed in its associated display register was transferred thereto from the playback or recording tape) is stored in a separate table. It is recalled that, by storing this direction code, although the source of new position data may change, thus changing the energization of the record (R) or playback (P) LED indicator adjacent the associated display register, the preceding energization thereof may be restored if, for example, LAST X switch 154 on console 10 is operated. After storing the direction code for the EVENT or scratchpad registers, the record (R) or playback (P) LED indicator associated with that stored direction code are extinguished, and proper LED indicators based upon the source from which position data is transferred to these registers are energized. It is appreciated that, in the present example, these particular instructions are not significant.

As another example of the use of the arithmetic operation switches, let it be assumed that the position data displayed in one register on console 10 is to be subtracted from the position data displayed in another. More particularly, let it be assumed that the position data displayed in IN register 80 is to be subtracted from that displayed in EVENT register 118. The operator operates edit-in switch 82 such that a character representing this edit-in switch is received by the CPU. In accordance with the routine illustrated in the flow chart of FIGS. 12A–12C, this character is recognized as being neither an agenda-edit selector switch, nor a numerical switch, nor an arithmetic operation switch, but is recognized as a register selector switch. This character does not represent an EVENT switch, the "duration" flag is not set, and an operation is not pending. Furthermore, this character does not represent a mark enable switch, nor does it represent the clear switch. Hence, as shown in FIG. 12B, the operation pending flag is set, and the "FROM" register is loaded with this character representing the record edit-in switch. The CPU then transmits an indicator data word to the apparatus illustrated in FIGS. 4A and 4B so as to flash the indicator associated with the character stored in the "FROM" register. Thus, the indicator associated with the record edit-in switch is flashed.

The operator then operates "—" switch 160 in the data handling section of the console. The apparatus illustrated in FIG. 3 transmits a coded representation of this "—" switch, which is recognized by the CPU as being neither an agenda-edit selector switch nor a numerical switch, but as an arithmetic operation switch. Consequently, the "+/—" flag is set and the number flag is reset (although it is appreciated that, in accordance with the present example, the number flag has not been set previously). The inquiry as to whether an operation is pending is answered in the affirmative, and the indicator associated with the character stored in the "FROM" register, that is, the indicator associated with the record edit-in switch, remains flashing.

To complete the operation of subtracting the position data displayed in record IN register 80 from the position data displayed in EVENT-1 register 118, the operator now operates EVENT-1 switch 120. The character representing this EVENT-1 switch is transmitted to the CPU by the apparatus illustrated in FIG. 3 and is recognized as being neither an agenda-edit selector, nor a numerical switch, nor an arithmetic operation switch, but as a register selector switch. Then, inquiry is made as to whether this character represents an EVENT switch, which inquiry is answered in the affirmative. Depending upon whether SPLIT OUT switch 136 has been operated, the location in the CPU memory which is designated a split-in register or the location in the CPU memory which is designated a split-out register is supplied with is character. In addition, since the "duration" flag is not set, inquiry is made as to whether an operation is pending, and this inquiry is answered in the affirmative. Since the "system mark" flag is not set and the agendat edit flag is not set, the "TO" register is loaded with this character, that is, the "TO" register is loaded with the EVENT-1 character representing that EVENT-1 switch 120 has been operated. The next inquiry as to whether the "+/—" flag has been set is answered in the affirmative, and the next-following inquiry as to whether this character represents the clear switch is answered in the negative. Consequently, and in accordance with the flow chart shown in FIG. 12C, the "TO'" register is loaded with the character then stored in the "TO" register, that is, the "TO'" register is loaded with the EVENT-1 character, and the position data presently stored in that location of the CPU memory which is linked with, or addressed by, the character stored in the "TO" reigster, that is, the position data stored in that that location of the CPU memory which is linked with the EVENT-1 character, is loaded into the "LAST X" register.

Since the number flag is not set, the position data stored in that location in the CPU memory which is linked to the record edit-in character stored in the "FROM" register is subtracted from the position data which is stored in that location in the CPU memory linked to the EVENT-1 character stored in the "TO" register. Thus, the position data stored in the CPU memory which is to be displayed by EVENT-1 register 118 is reduced by the amount displayed by the record IN register 80. This reduced position data stored in that location of the CPU memory which is linked with the EVENT-1 character stored in the "TO" register is transmitted from the CPU to the apparatus illustrated in FIGS. 4A and 4B, with the proper preceding address word, such that this position data is stored in the appropriate location in RAM 424 from which it is read out periodically to energize EVENT-1 register 118.

Since the character stored in the "TO" register represents the EVENT-1 switch, the direction code associated with the EVENT-1 register is stored in a separate table. For example, if the position data which has been displayed by EVENT-1 register 118 had been derived from the playback tape, playback LED indicator 124 would have been energized, and the direction code associated with the EVENT-1 character would indicate that the position data had been derived from the playback tape. This direction code is stored in a separate table. Then, the playback LED indicator is de-energized, and the proper LED indicator, that is, record LED indicator 122 is turned on. This, of course, represents that the position data now displayed in EVENT-1 register 118 was derived from the record section of the console.

Then, the CPU transmits an indicator data word, preceded by the appropriate address, to RAM 424, whereby the flashing indicator associated with the character stored in the "FROM" register is extinguished. That is, the flashing indicator associated with record edit-in switch 82 is extinguished. The operation pending, "+/−" and number flags then are all reset; and the programmed routine returns to its START condition to await the arrival of the next character.

It has been described above that, when a selector switch has been operated erroneously as a source switch, this erroneous operation may be cleared by re-operating that very same selector switch. If an erroneous entry has been made into scratchpad register 142 by operating the numerical switches of keyboard 150, this entry may be cleared by operating CLEAR switch 162. Let it be assumed that two digits have been entered into scratchpad register 142, which digits constitute the array that has been loaded into the "SCRATCH" register, discussed hereinabove in conjunction with FIG. 12A wherein the inquiry as to whether an incoming character represents a numerical switch has been answered in the affirmative. To clear the data displayed by scratchpad register 142, CLEAR switch 172 is operated and the apparatus illustrated in FIG. 3 transmits a character representing this CLEAR switch to the CPU. This character is recognized as being a register selector switch or CLEAR switch, and is further recognized as not being an EVENT switch. It has been assumed that only numerical digits have been entered into the "SCRATCH" register and, therefore, an operation is not pending. In accordance with the flow chart shown in FIG. 12B, the character is recognized as not being a mark enable switch but as being the CLEAR switch. Accordingly, the inquiry as to whether this character represents the CLEAR switch is answered in the affirmative, and the illustrated routine enters the "reset SCRATCH register" routine. Thus, the contents of the "SCRATCH" register are reset to zero, and the CPU transmits these reset contents of the "SCRATCH" register to the apparatus illustrated in FIGS. 4A and 4B. Such contents are transmitted as numerical data, comparable to position data, and are stored in appropriate locations of RAM 424. When the contents of the RAM are read out, in the manner discussed above, scratchpad register 142 is energized to provide a zero display.

After the CPU transmits the contents of the "SCRATCH" register to the electronics for controlling the display of console 10, the "+/−" flag and the number flag both are reset. The routine then returns to its START condition to await the arrival of the next character.

Figure 13:
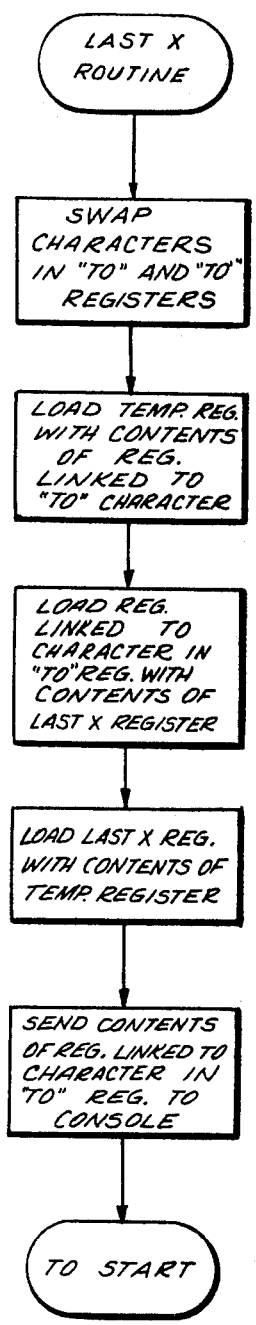
FIG. 13 is a flow chart representing a particular routine carried out by the central processing unit.

Let it be assumed that, after position data has been transferred to a particular display register, the operator wishes to observe the position data which had been displayed by that register immediately prior to this data transfer. For example, in setting up an edit operation, one particular edit-in location may be displayed by IN register 50 and another edit-in location may be displayed by EVENT-1 register 118. In comparing these edit-in points for the purpose of selecting one of them, the operator may transfer the edit-in point displayed by EVENT-1 register 118 into IN register 50 and then preview this edit-in point. The operator then may wish to preview the edit-in point which previously had been displayed by IN register 50. To achieve this, it is necessary to restore that preceding edit-in point to this IN register. Such restoration of the preceding edit-in location is achieved by operating LAST X switch 154 of encoder 150. The character representing this LAST X switch is received by the CPU and is recognized as being neither an agenda-edit selector switch, nor a numerical switch, nor an arithmetic operation switch, nor a register selector switch, nor the CLEAR switch, but as the LAST X switch. In recognition of this character, the so-called LAST X routine, shown in FIG. 13 is carried out.

To effect this LAST X routine, the CPU memory is provided with a separate location designated as the "TEMPORARY" register. For a ready understanding of this LAST X routine, and the use of the "TEMPORARY" register in implementing it, the following explanation is made with reference to the specific example wherein IN register 50 is controlled to display its preceding contents.

Let it be assumed that the character representing edit-in switch 52 (or IN register 50) is stored in the "TO" register of the CPU memory. Upon sensing that the incoming character received by the CPU represents the LAST X switch, the contents of the "TO'" register are loaded into the "TO" register, and the contents of the "TO" register are loaded into the "TO'" register. That is, the characters in the "TO" and "TO'" registers are swapped Then, the "TEMPORARY" register is loaded with the contents of those locations in the CPU memory which are liked to the character now stored in the "TO" register. In the present example, this means that that position data linked to the edit-in character is loaded into the "TEMPORARY" register.

Now, in accordance with the next-following step in this routine, the contents of the "LAST X" register, which represent the immediately preceding position data which had been displayed previously by IN register 50, are loaded into that location of the CPU memory which is linked with the character now stored in the "TO" register. That is, the immediately preceding position data now is loaded from the "LAST X" register into that location in the CPU memory which is linked to the edit-in character stored in the "TO" register.

In accordance with the next step in the LAST X routine, the position data which have been loaded into the "TEMPORARY" register now are transferred into the "LAST X" register. Thus, it is appreciated that the "LAST X" register stores the latest position data displayed by IN register 50, whereas that location in the CPU memory which is linked with the edit-in character stored in the "TO" register represents the immediately preceding position data. That is, the storage locations in the CPU of the immediately preceding position data and the latest position data are interchanged. Next, the position data stored in that location of the CPU memory which is linked with the edit-in character stored in the "TO" register is transmitted to the console control electronics by the CPU for display by IN register 50. The routine then returns to its START condition awaiting the arrival of the next character.

From the foregoing operation of the LAST X routine, it may be appreciated that, by operating LAST X switch 154 on console 10, the data displayed by the display register which has been the last-designated destination register will be changed to the immediately preceding data previously displayed thereby. That is, by operating the LAST X swtich, the destination register will display its previous data rather than the data which has just been transferred thereto. If the LAST X switch is operated once agian, then this latest data is displayed. Thus, by successive operations of the LAST X switch, the display provided by the destination register alternates between preceding and latest position data.

If the destination register is an EVENT or a scratch-pad register, then, in addition to displaying its previously-displayed data by operating the LAST X switch, the appropriate record (R) or playback (P) LED indicator associated with that previously-displayed data also is energized. That is, when the character stored in the "TO"' register is exchanged with the character stored in the "TO" register, the direction code stored in the separate table also is exchanged. This direction code is transmitted by the CPU to the console control electronics as an indicator data word with, of course, the appropriate preceding address, such that the record (R) or playback (P) LED indicator is suitably energized.

Let it be assumed that DURATION switch 164 is operated. In the manner described above, a duration character representative of the operation of this switch is transmitted to the CPU. The character is detected as not being representative of a video or audio switch, not being representative of a numeric switch, nor is it detected as being representative of an arithmetic operation swtich. Furthermore, since this character does not represent a register selector switch or the CLEAR switch, nor does it represent the LAST X switch, the inquiry as to whether this character represents the duration switch is answered in the affirmative. Consequently, the "duration" flag is set, and the CPU advances to its duration routine.

The duration routine is not described in detail herein. As mentioned above, the operation of the DURATION switch, and, therefore, the result of the duration routine, is to determine the respective duration of the edit operations on the respective playback and recording tapes, as selected by the play and record edit points. Thus, the position data displayed in play IN register 50, and representing the play edit-in point, is subtracted from the position data displayed in play OUT register 54, and representing the play-out point, this difference, or duration data, being displayed in tape timer register 58. Also, the position data displayed in record IN register 80, and representing the record edit-in point, is subtracted from the position data displayed in record OUT register 84, and representing the record edit-out point. The resultant difference, or duration data, is displayed in tape timer register 88. Thus, the duration of the so-called play edit and the duration of the record edit are displayed. In addition to displaying this duration data in the respective tape timer registers, it is appreciated that those locations in the CPU memory corresponding to such tape timer registers store the respective duration data.

As mentioned above, DURATION switch 164 preferably is a push-button switch which, when maintained in its operative, or depressed condition, enables the duration routine to be carried out. That is, when this switch is released, the duration data no longer is displayed in the respective tape timer registers, and the current tape position data is displayed therein once again.

For the proper performanee of an edit operation, the edit-in and edit-out points on each of the playback and recording tapes should be designated. However, even if only three of these four edit points are specified, the operation can, nevertheless, be carried out. This is because both tapes are driven in synchronism such that when an edit point on one is reached, a corresponding edit point on the other also is reached. However, if only three of the four edit points are known, thus enabling the edit operation to be carried out, the operator often wishes to be cognizant of the fourth edit point. This information is helpful to him in selecting alternative points, adjusting the designated edit points, and the like. In accordance with one aspect of the present invention, the "missing" edit point is derived as a function of the three edit points which are designated. The manner in which the missing edit point is determined now will be described.

If one of the play or record edit points is unknown, or is to be verified, the operator depresses DURATION switch 164 and then, while maintaining this switch in its depressed condition, operates the register selector switch associated with that one edit point. As mentioned above, when the duration character is received by the CPU in response to the operation of the DURATION switch, the "duration" flag is set and the duration routine is carried out. Now, the register selector character, which may be the play-IN, play-OUT, record-IN or record-OUT character, is received by the CPU in response to the operation of the register selector switch. As shown in FIG. 12A, this character is recognized as not being representative of the video or audio switches, nor of the numeric switches, nor of the arithmetic switch. Rather, it is recognized as being a register selector switch. The next inquiry as to whether this character represents an EVENT switch is answered in zhe negative. The next-following inquiry as to whether the "duration" flag is set is answered in the affirmative; and the CPU advances the routine illustrated in FIG. 14A.

Figure 14A:
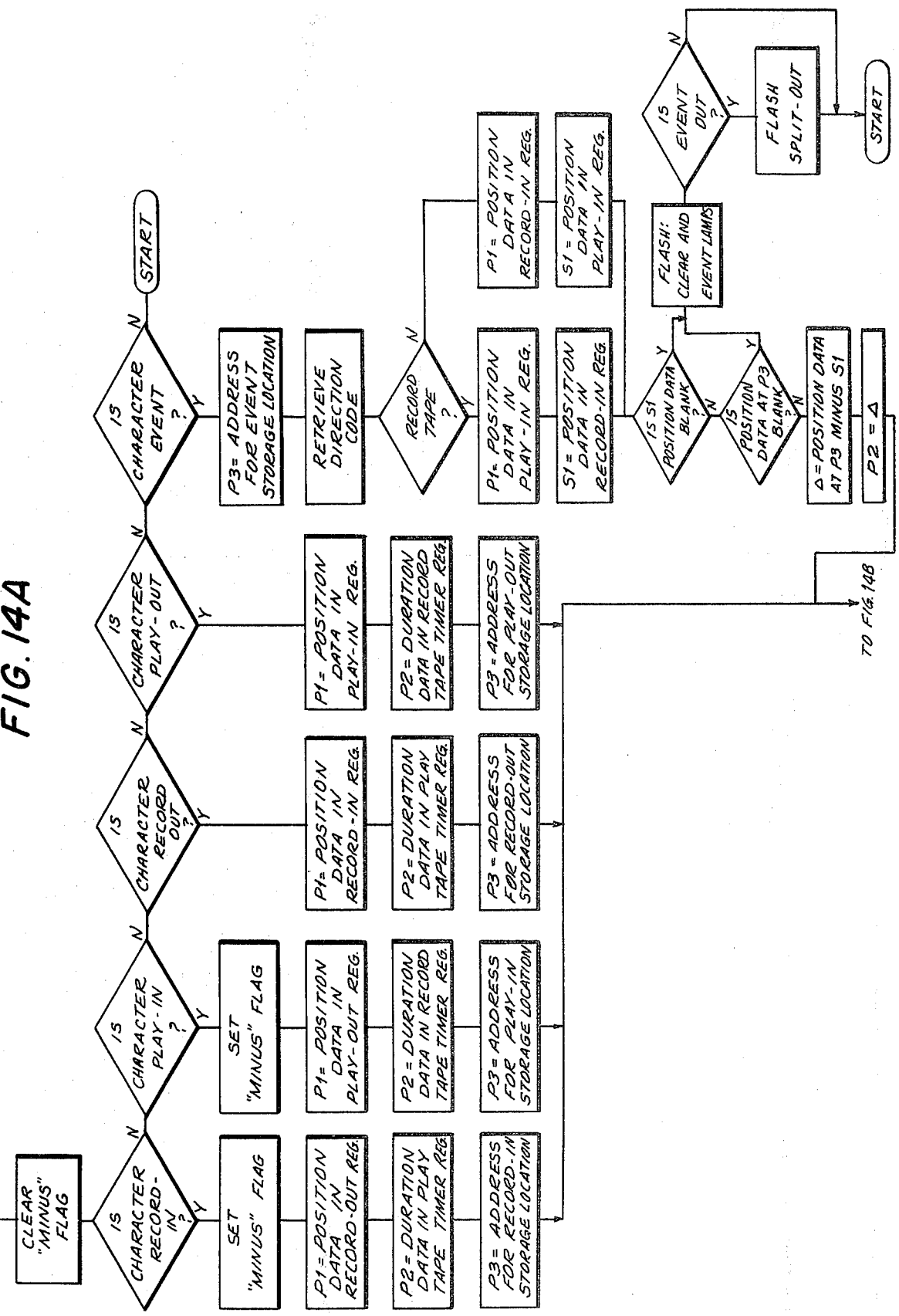

As illustrated in FIG. 14A, the "−" flag first is cleared. Although not described above, when carrying out the duration routine in response to the operation of the DURATION switch, the "−" flag in connection with obtaining the duration data that is displayed in tape timer registers 58 and 88. Now, however, this "−" flag is cleared. Then, inquiry is made as to whether the received character represents the record-in register. If so, the "−" flag now is set. The reason for this will be described below.

If the received character does not represent the record-In register, inquiry is made as to whether it represents the play-IN register. If so, the "−" flag is set. But if this character does not represent the play-IN register, inquiry is made as to whether it represents the record-OUT register. If so, the "−" flag is not set, but the routine advances to carry out instructions which will be described. However, if this character is recognized as not representing the record-OUT register, inquiry is made as to whether it represents the play-OUT register. If the answer to this inquiry is in the affirmative, particular instructions, to be described, are carried out. But if the answer to this inquiry is in the negative, the CPU determines whether the received character represents an EVENT register.

In the present example, it is assumed that the received character represents any one of the record-IN, play-IN, record-OUT or play-OUT registers. As shown in FIG. 14A, if the character represents an IN register, the "−" flag is set. This flag is not set if the character represents an OUT register. After the "−" flag is selectively set, the following steps are similar, regardless of the particular register which is represented by the received character.

First, a P1 character is obtained. This character is the position data that is displayed in the other register of that section of the console from which the received character is derived. More particularly, if the received character represents the record-IN register, then the P1 character is equal to the position data displayed in the record-OUT register. If the received character represents the play-IN register, then the P1 character is equal to the position data displayed in the play-OUT register. If the received character represents the record-OUT register, then the P1 character is equal to the position data displayed in the record-IN register. Finally, if the received character represents the play-OUT register, then the P1 character is equal to the position data displayed in the play-IN register. It may be appreciated that the P1 character is obtained by reading out that location in the CPU memory which is associated wiht the appropriate display register.

Then, a P2 is obtained. This P2 character is equal to the duration data that is displayed in the tape timer register included in that section of console 10 which differs from the section in which the register selector switch, represented by the received character, is provided. For example, if the received character represents the record-IN or record-OUT register, then the P2 character is equal to the duration data displayed in play tape timer register 58. Conversely, if the received character represents the play-IN or play-OUT register, then the P2 character is equal to the duration data displayed in record tape timer register 88. It is recognized that this duration data may be read out from that location in the CPU memory associated with the appropriate tape timer register.

Next, a P3 address is obtained. This P3 address identifies that storage location in the CPU memory in which the position data which is to be displayed by the register represented by the received character is to be displayed. That is, if the received character represents the record-IN register, then the P3 address identifies the record-IN storage location in the CPU memory; if the received character represents the play-IN register, then the P3 address identifies the play-IN storage location in the CPU memory; if the received character represents the record-OUT register, then the P3 address identifies the record-OUT storage location in the CPU memory; and if the received character represents the play-OUT register, then the P3 address identifies the play-OUT storage location.

It should be appreciated that the P1 and P2 characters, as well as the P3 address, may be obtained, or derived, in any order desired. It is intended not to limit the present invention to the aforedescribed order in which the P1 and P2 characters and the P3 address are produced.

Once the aforementioned P1, P2 and P3 representations are obtained, the routine proceeds to FIG. 14B. Inquiry first is made as to whether the P1 character is blank. That is, it is determined whether this P1 position data has been cleared from the display register with which it is associated. If this P1 character is blank, or cleared, only two of the four edit points are designated, thus making it impossible to determine the missing edit point. Hence, if the P1 character is blank, an error indication thereof is provided by flashing the CLEAR lamp and the lamp associated with the display register which displays this blank P1 character. The operator thus is apprised of this error condition. (For a greater detailed description of error detecting and indicating apparatus which can be used with the present invention, the disclosure of copending application Ser. No. 139,747 filed Apr. 11, 1980, is incorporated herein by reference).

If it is determined that the P1 character is not blank, inquiry is made as to whether the P2 character is blank. The reason for this inquiry is the same as that for the inquiry regarding the possible blanking of the P1 character. If this P2 character, which is equal to the duration data that represents the duration of the edit operation for the other tape, is blank, an error indication is provided by flashing the CLEAR lamp and the lamp associated with the tape timer register which displays this blank P2 duration data. The CPU returns to its START condition in response to either of the aforementioned error conditions.

However, if it is determined that neither the P1 nor the P2 characters are blank, the position data presently stored at the P3 address in the CPU memory is retained for use in a possible LAST X routine. The retention of the contents of the P3 location in the CPU memory has been discussed above with reference to FIG. 12C. Then, inquiry is made as to whether the "−" flag has been set. It is recalled that this flag is set only if the received character represents an IN register. If the "−" flag has been set, then the subtraction operation P1−P2 is carried out and the resultant difference data is loaded into the P3 location of the CPU memory. If the "−" flag is not set, then the summation operation P1+P2 is carried out, and the summed data is loaded into the P3 location of the CPU memory.

The difference data, which is equal to the position data displayed in an OUT register minus the duration data which represents the duration of the edit operation on the other tape, thus is equal to position data which represents the missing edit-in point. The summation signal is equal to the position data of the edit-in point on one tape plus the duration data which represents the duration of the edit operation on the other tape, and thus is equal to position data representing the missing edit-out point on said one tape. After the position data representing the missing edit point has been obtained and loaded into the P3 address of the CPU memory, inquiry is made as to whether this address represents an EVENT location. That is, the CPU inquires as to whether the P3 address is associated with either of the EVENT registers. In the present example, it has been assumed that the received character represents either a record-IN, a play-IN, a record-OUT or a play-OUT register. Consequently, this inquiry is answered in the negative.

Then, the contents of the P3 location in the CPU memory are transmitted to the console. That is, the position data representing the missing edit point is transmitted to the console and displayed in the appropriate register. The CPU then returns to its START condition.

The foregoing has described the flow charts shown in FIGS. 14A and 14B when the received character represents an IN or OUT register. From FIG. 14A, it is seen that if the received character does not represent such an IN or OUT register, inquiry is made as to whether this character represents one of the EVENT registers. If the answer to this inquiry is in the negative, the CPU returns to its START condition. However, if the received character is recognized as being representative of an EVENT register, then the P3 address, representing the storage location in the CPU memory associated with this EVENT register, is produced.

It is recalled that, since the position data displayed in an EVENT register may be derived either from the playback or recording tape, suitable direction data accompanies the EVENT character to indicate the direction, or source, of the position data displayed in that EVENT register. As mentioned above, this direction data is stored in a separate table. In accordance with the flow chart shown in FIG. 14A, the direction code associated with this received EVENT character is retrieved. That is, the direction code indicating whether the position data now displayed in the EVENT character has been derived from the playback or recording tape is retrieved. Inquiry then is made as to whether this position data now displayed in the EVENT character has been derived from the recording tape. If the answer to this inquiry is in the affirmative, thus representing that the position data displayed in the EVENT register and correspondingly stored at the P3 address of the CPU memory has been derived from the recording tape, then the P1 character is produced, this P1 character being equal to the position data displayed in the play-IN register. Then, an S1 character is produced, this S1 character being equal to the position data displayed in the record-IN register.

If it is determined that the position data displayed in the EVENT register has been derived from the playback tape, the P1 character is made equal to the position data displayed in the record-IN register and the S1 character is made equal to the position data displayed in the play-IN register.

Once the P1 and S1 characters are obtained, inquiry is made as to whether the S1 character is blank. If so, the position data displayed in the selected EVENT register can be converted to a corresponding edit point along the other tape. Hence, an error condition is present, and an error indication is provided by flashing the CLEAR lamp and the lamp associated with this selected EVENT register.

If the S1 character is not blank, inquiry is made as to whether the position data stored at the P3 address is blank. That is, a determination is made as to whether the selected EVENT register is blanked. If the answer to this inquiry is in the affirmative, thus representing that the operator is attempting to convert blank position data, an indication of the error condition is provided by flashing both the CLEAR and EVENT lamps. Furthermore, when either of the aforementioned error conditions is detected, inquiry is made as to whether the selected EVENT register is associated with a split-in or a split-out mode. That is, inquiry is made as to whether SPLIT-OUT switch 136 has been operated. If so, that is, if this selected EVENT register displays position data (blank or otherwise) representing an edit-out point, the lamp associated with SPLIT OUT switch 136 also is flashed. Of course, this lamp is not flashed if the selected EVENT register displays position data representing an edit-in point. In either event, after detecting and indicating the error condition, the CPU returns to its START condition.

If it has been determined that the S1 character is not blanked and, moreover, that the position data stored at the P3 location in the CPU memory also is not blanked, a difference signal $\Delta$ is produced. This difference signal $\Delta$ is equal to the difference between the position data stored at the P3 location (i.e. the position data displayed in the selected EVENT register) and the S1 character (i.e. the position data representing the edit-in point along the same type as the edit point represented by the position data in the selected EVENT register). The P2 character then is made equal to this difference signal. The programmed routine then proceeds to the flow chart shown in FIG. 14B, with the P1 and P2 characters and P3 address which have been produced.

As before, inquiry is made as to whether the P1 character is blanked. If so, an appropriate error indication thereof is provided. If the P1 character is not blanked, the inquiry is made as to whether the P2 character is blank. This P2 character will be blank if the position data stored in the P3 location, that is, the position data displayed in the selected EVENT register, is equal to the S1 character, i.e. the position data displayed in the IN register which is associated with the same type as the position data displayed in the EVENT register. If the P2 character is blank, an error indication thereof is produced. However, if neither the P1 nor the P2 characters are blanked, the position data at the P3 location in the CPU memory is stored for the LAST X routine, described above. Then, inquiry is made as to whether the "—" flag has been set. If the received character represents an EVENT register, it is seen, from FIG. 14A, that the "—" flag will not be set. Hence, the P1 and P2 characters are summed, and the resultant summation data is loaded into the P3 location of the CPU memory. This summation data represents an edit point which will be reached on one tape when the other tape reaches the edit point that previously had been displayed in the EVENT register. That is, this summation data represents the conversion of the position data displayed in the EVENT register from an edit point along one tape to the corresponding edit point along the other tape.

After loading the summation data into the P3 location of the CPU memory, inquiry is made as to whether this location is associated with an EVENT register. Of course, in the present example, this P3 address identifies such an EVENT location. Hence, the direction code associated with this EVENT register is "swapped", or reversed. That is, if the position data which previously had been displayed in this EVENT register had been derived from the playback tape, it is appreciated that the position data now to be displayed therein has been converted to a corresponding edit point along the recording tape. It is, therefore, necessary, to change the direction code associated with this EVENT register from a representation of the playback tape to a representation of the recording tape. With this change in direction code, the indicator LED's associated with this EVENT register must be suitably energized. That is, if the playback (P) LED had been energized previously, it now is necessary to extinguish this LED and to energize the recording (R) LED. Of course, if the edit point previously displayed in this EVENT register had been derived from the recording tape, then the reverse of the foregoing LED energization is carried out.

Finally, the contents of the P3 location in the CPU memory, that is, the converted position data now stored therein, are transmitted to the console; and the CPU returns to its START condition. Thus, the EVENT register now displays an edit point along the other tape which corresponds to the edit point which had been displayed therein previously, both edit points being reached simultaneously during an edit operation.

As typical examples of the manner in which a "missing" edit point is displayed, let it be assumed that the operator depresses DURATION switch 164, resulting in the setting of the "duration" flag, and the carrying out of the duration routine. It is recalled that, when this duration routine is performed, duration data is stored in the respective tape timer registers. More particularly, the duration displayed in tape timer register 58 represents the difference between the play-OUT and play-IN position data; and the duration data displayed in tape timer register 88 represents the difference between the record-OUT and record-IN position data. Furthermore, in obtaining such duration data, the "−" flag is set.

Let it be assumed that the record-IN position data is missing, that is, it is not displayed in record-IN register 80. To ascertain this edit-in point along the recording tape, the operator actuates edit-in switch 82. This results in transmitting the record-IN character to the CPU, resulting in the clearing of the "−" flag. This record-IN character is recognized, as shown in FIG. 14A, whereupon the "−" flag is set. Also, the P1 character is produced, this character being equal to the position data displayed in the record-OUT register. The P2 character also is produced, which character is equal to the duration data displayed in tape timer register 58 of the playback section of console 10. Thus, the P2 character represents the duration of the edit operation.

The P3 address is produced, this address identifying the record-IN storage location in the CPU memory.

It is assumed that neither the P1 nor the P2 characters are blanked, as shown in FIG. 14B. Accordingly, the position data stored at the P3 location is retained for a LAST X operation. Then, since the "−" flag had been set, the difference P1−P2 data is loaded into this P3 location. Since the P3 location does not represent an EVENT location, the contents thereof are transmitted to the console. It is appreciated that these contents are equal to the difference between the record-OUT position data (equal to the P1 character) and the edit duration. Thus, the contents of the P3 location represent the record-IN position data.

If the missing edit-in point is the play-IN point, then the received character would be the play-IN character. The operation described above would be repeated, and the P1 and P2 characters and the P3 address would be as shown in FIG. 14A.

If the missing edit point is the record-OUT point, the operator actuates edit-out switch 86, resulting in transmitting the record-OUT character to the CPU. As shown in FIG. 14A, when this character is recognized, the P1 character is made equal to the position data displayed in the record-IN register and the P2 character is made equal to the duration data displayed in the tape timer register. The P3 address identifies the location in the CPU memory at which record-OUT position data is stored.

Then, advancing to the flow chart shown in FIG. 14B, assuming that neither the P1 nor P2 characters are blank, the position data presently stored at the P3 location is retained for a LAST X operation. Since the "−" flag is not set in response to the received record-OUT character, the P1 and P2 characters are summed. This summation is equal to the record-IN position data plus the edit duration, resulting in the record-OUT position data. This resultant record-OUT position data is loaded into the P3 address and, since this address does not identify an EVENT location, the record-OUT position data is transmitted to the console and displayed in record-OUT register 84.

If the missing edit point is the play-OUT point, the operator actuates edit-out switch 56, whereby the play-OUT character is transmitted to the CPU. The aforedescribed routine is repeated, and the P1 and P2 characters and the P3 address are established in accordance with the flow chart shown in FIG. 14A.

Let it now be assumed that the position data displayed in, for example, EVENT-1 register 118, represents an intermediate edit point along the playback tape. If the operator wishes to determine the corresponding edit point along the recording tape, EVENT-1 switch 120 is operated. This transmits the EVENT character to the CPU which, if the "duration" flag is set, is detected by the flow chart shown in FIG. 14A. Initially, the "−" flag is cleared, as described above. Once this EVENT character is recognized, the P3 address identifies the EVENT-1 storage location in the CPU memory. The playback direction code associated with the position data now displayed in EVENT-1 register 118 is retrieved, which direction code has been assumed to represent the playback tape. Hence, inquiry as to whether this direction code represents the recording tape is answered in the negative.

Proceeding with the flow chart shown in FIG. 14A, the P1 character now is made equal to the position data displayed in the record-IN register and the S1 character is made equal to the position data displayed in the play-IN register. It is assumed that the S1 character is not blank and, moreover, that EVENT-1 register 118 presently displays position data. Consequently, the position data stored at the P3 address also is not blank. Then, the difference signal is produced by subtracting the S1 character (i.e. the play-IN edit point) from the position data presently displayed in the EVENT-1 register (i.e. representing an edit point along the playback tape).

The character P2 is made equal to this difference signal, and then the routine proceeds to the flow chart shown in FIG. 14B, and described above. It is, therefore, appreciated that, in accordance with this flow chart, the summed data P1+P2 is loaded into the storage location of the CPU memory identified by the P3 address, thereby loading into this location position data which is equal to the record-IN edit point plus the quantity which represents the duration between the play-IN edit point and the edit point along the playback tape which had been displayed in the EVENT-1 register. This new position data which is loaded into the P3 location of the CPU memory is seen to represent the corresponding edit point along the recording tape which will be reached when the playback tape reaches the edit point which had previously been displayed in the EVENT-1 register.

Since the P3 address identifies an EVENT location in the CPU memory, the direction code now associated with this location, that is, the direction code now associated with the position data which is stored in this P3 address, is changed from a playback code to the recording code. This, of course, represents that the position data in the P3 location represents an edit point along the recording tape. Then, the LED indicators adjacent the EVENT-1 register on console 10 are properly energized, and the position data stored at the P3 location of the CPU memory is transmitted to the console.

Thus, from the foregoing, it is seen that when duration and EVENT switches are operated concurrently, the edit point which is displayed in the selected EVENT register is converted from an edit point along one tape to a corresponding point along the other.

While the present invention has been particularly shown and described with reference to a preferred embodiment thereof, it should be readily apparent to those of ordinary skill in the art that various changes and modifications in form and details may be made without departing from the spirit and scope of the invention. For example, the present invention need not be limited solely for use with a video editing system, although this application is particularly advantageous. Furthermore, when used with a video editing system, the recording media need not be confined solely to magnetic tape. As discussed above, the recording medium used with this invention may, in addition to magnetic tape, comprise magnetic disks, magnetic drums, and the like. Also, CPU 208 may be formed of discrete electronic circuity, in the form of integrated circuits or otherwise, rather than as a programmed microprocessor or other computer device. Such a solid-state or hard wired version of the CPU nevertheless should perform the functions (or equivalents thereof) described above with respect to FIGS. 12–19. In addition, and as mentioned above, in the flow charts of FIGS. 14A–14B, the characters P1, P2, P3 and S1 may be obtained in any convenient order. Moreover, it should be understood that, in carrying out the "missing" edit point determination on the data conversion operations, described with reference to FIGS. 14A and 14B, these operations may be initiated by any suitable enabling switch other than the DURATION switch. That is, the present invention is not limited to initiating these operations only when the DURATION switch and a respective register selector switch are operated concurrently.

It is intended that the appended claims be interpreted as including various changes and modifications.

What is claimed is:

1. Editing apparatus for controlling the transfer of signals from a playback medium to a recording medium, said apparatus comprising a console including a plurality of display registers, including a play IN register for displaying play IN position data representing an edit-in point along said playback medium, a record IN register for displaying record IN position data representing an edit-in point along said recording medium, a play OUT register for displaying play OUT position data representing an edit-out point along said playback medium and a record OUT register for displaying record OUT position data representing an edit-out point along said recording medium, a plurality of register selector switches, each associated with and adjacent a respective one of said display registers and operable to select the display register associated therewith, and enable means manually operable to enable position data to be displayed in a selected one of said play In, record IN, play OUT and record OUT registers as a function of the position data displayed in the remainder of said registers; and central processing means responsive to the operation of said enable means and a selected one of said register selector switches to obtain data representing the duration between the edit-in and edit-out points as represented by the position data displayed in two of said registers, neither of which is associated with said selected register switch, to combine the duration data with the position data displayed in a third register, which third register is not associated with said selected register switch, to produce resultant position data, and to cause said resultant position data to be displayed in the register associated with said register selector switch.

2. The apparatus of claim 1 wherein said selected register selector switch is associated with said record IN register; and wherein said central processing means comprises means for obtaining duration data representing the difference between the position data displayed in said play OUT and play IN registers, means for subtracting said duration data from the position data displayed in said record OUT register to produce position data representing an edit-in point along said recording medium, and means for causing said produced position data to be displayed in said record IN register.

3. The apparatus of claim 1 wherein said selected register selector switch is associated with said play IN register; and wherein said central processing means comprises means for obtaining duration data representing the difference between the position data displayed in said record OUT and record IN registers, means for subtracting said duration data from the position data displayed in said play OUT register to produce position data representing an edit-in point along said playback medium, and means for causing said produced position data to be displayed in said play IN register.

4. The apparatus of claim 1 wherein said selected register selector switch is associated with said record OUT register; and wherein said central processing means comprises means for obtaining duration data representing the difference between the position data displayed in said play OUT and play IN registers, means for adding said duration data to the position data displayed in said record IN register to produce position data representing an edit-out point along said recording medium, and means for causing said produced position data to be displayed in said record OUT register.

5. The apparatus of claim 1 wherein said selected register selector switch is associated with said play OUT register; and wherein said central processing means comprises means for obtaining duration data representing the difference between the position data displayed in said record OUT and record IN registers, means for adding said duration data to the position data displayed in said play IN register to produce position data representing an edit-out point along said playback medium, and means for causing said produced position data to be displayed in said play OUT register.

6. The apparatus of claim 1 wherein said display registers further include an additional register for displaying position data selectively representing an additional edit-in or edit-out point along said playback or recording medium; wherein said register selector switches include a register selector switch associated with and adjacent said additional register; and wherein said central processing means is responsive to the operation of said enable means and said register selector switch associated with said additional register to convert the position data displayed in said additional register from a representation of an edit point on one medium to a representation of a corresponding edit point on the other medium.

7. The apparatus of claim 6 wherein said central processing means comprises means for determining the particular medium having the additional edit point represented by the position data displayed in said additional register; means for subtracting the position data displayed in said additional register from the position data displayed in one of said play IN and record IN registers, depending upon said particular medium to produce a difference signal, means for adding said difference signal to the position data displayed in the other of said play IN and record IN registers to produce converted position data; and means for causing said converted position data to be displayed in said additional register.

8. Editing apparatus for controlling the transfer of video signals from a playback medium to a recording medium, said apparatus comprising a console having a plurality of display registers, including a play IN register associated with the playback medium for displaying play IN position data representing an edit-in point along said playback medium, a record IN register associated with the recording medium for displaying record IN position data representing an edit-in point along said recording medium, an play OUT register associated with the playback medium for displaying play OUT position data representing an edit-out point along said playback medium, a record OUT register associated with the recording medium for displaying record OUT position data representing an edit-out point along said recording medium, and at least one additional register selectively associated with the playback recording medium for displaying position data selectively representing an intermediate edit-in or edit-out point along said playback or recording medium, a plurality of register selector switches, each associated with and adjacent a respective one of said display registers and operable to select it associated register; and central processing means operable in a selected mode and including means for sensing the particular register selected by the operation of a register selector switch; means for establishing a P1 character equal to: (a) the position data representing the edit-in point along the same medium as that with which said selected register is associated if said selected register is the play OUT or record OUT register, (b) the position data representing the edit-out point along the same medium as that with which said selected register is associated if said selected register is the play IN or record IN register, and (c) the position data representing the edit-in point along the medium which is other than that with which said selected register is associated if said selected register is the additional register; means for establishing a P2 character equal to: (a) the difference between the edit-out and edit-in points for the medium which is other than that with which said selected register is associated if said selected register is the play IN, record IN, play OUT or record OUT register, and (b) the difference between the intermediate edit and the edit-in points for the same medium as that with which said selected register is associated if said selected register is the additional register; means for producing resultant position data equal to P1+P2 is neither said play IN nor said record IN register is selected; means for producing resultant position data equal to P1−P2 is either said play IN or said record IN register is selected; and means for displaying said resultant position data in said selected register.

9. In editing apparatus of the type which controls the transfer of video signals from a playback meduium to a recording medium, and which includes a console having a plurality of display registers, including a play IN register associated with the playback medium for displaying play IN position data representing an edit-in point along said playback medium, a record IN register associated with the recording medium for displaying record IN position data representing an edit-in point along said recording medium, a play OUT register associated with the playback medium for displaying play OUT position data representing an edit-out point along said playback medium, a record OUT register associated with the recording medium for displaying record OUT position data representing an edit-out point along said recording medium, and at least one additional register selectively associated with the playback or recording medium for displaying position data selectively representing an intermediate edit-in or edit-out point along said playback or recording medium, a plurality of register selector switches, each associated with and adjacent a respective one of said display registers and operable to select it associated register; the method comprising the steps of sensing the particular register selected by the operation of a register selector switch; establishing a P1 character equal to: (a) the position data representing the edit-in point along the same medium as that with which said selected register is associated if said selected register is the play OUT or record OUT register, (b) the position data representing the edit-out point along the same medium as that with which said selected register is associated if said selected register is the play IN or record IN register, and (c) the position data representing the edit-in point along the medium which is other than that with which said selected register is associated if said selected register is the additional register; establishing a P2 character equal to: (a) the difference between the edit-out and edit-in points for the medium which is other than that with which said selected register is associated if said selected register is the play IN, record IN, play OUT Or record OUT register, and (b) the difference between the intermediate edit and the edit-in points for the same medium as that with which said selected register is associated if that selected register is the additional register; producing resultant position data equal to P1+P2 if neither said play IN or said record IN register is selected; producing resultant position data equal to P1−P2 if either said play IN or said record IN register is selected; and displaying said resultant position data in said selected register.

* * * * *